(12) United States Patent
Matsuura et al.

(10) Patent No.: US 10,591,036 B2
(45) Date of Patent: Mar. 17, 2020

(54) TRANSAXLE

(71) Applicant: KANZAKI KOKYUKOKI MFG. CO., LTD., Amagasaki-shi, Hyogo (JP)

(72) Inventors: Jun Matsuura, Amagasaki (JP); Koji Iwaki, Amagasaki (JP); Yasuhito Nakai, Amagasaki (JP); Masaru Iida, Amagasaki (JP)

(73) Assignee: KANZAKI KOKYUKOKI MFG. CO., LTD., Amagasaki-Shi, Hyogo (JP)

( * ) Notice: Subject to any disclaimer, the term of this patent is extended or adjusted under 35 U.S.C. 154(b) by 161 days.

(21) Appl. No.: 15/658,972

(22) Filed: Jul. 25, 2017

(65) Prior Publication Data

US 2018/0031097 A1     Feb. 1, 2018

(30) Foreign Application Priority Data

Jul. 27, 2016   (JP) .................. 2016-147620

(51) Int. Cl.
*F16H 37/08*     (2006.01)
*F16H 3/00*      (2006.01)
(Continued)

(52) U.S. Cl.
CPC ......... *F16H 37/0813* (2013.01); *B60K 17/16* (2013.01); *F16H 3/006* (2013.01); *F16H 57/031* (2013.01); *F16H 57/037* (2013.01); *F16H 57/038* (2013.01); *B60K 17/08* (2013.01); *B60K 17/34* (2013.01); *B60K 2005/003* (2013.01);
(Continued)

(58) Field of Classification Search
CPC .... F16H 37/0813; F16H 3/006; F16H 57/031; F16H 57/037; F16H 57/038; F16H 57/043; F16H 57/0435; F16H 57/0441; F16H 57/0473; F16H 3/093; B60K 17/16; B60K 17/08; B60K 17/34; B60K 17/2005; B60K 17/003; B60Y 2200/20
See application file for complete search history.

(56) References Cited

U.S. PATENT DOCUMENTS 7,357,210 B2 * 4/2008 Ima .................. B60K 17/08
                                                180/233
7,455,145 B2 * 11/2008 Irikura ............. B60K 17/105
                                                180/242
(Continued)

FOREIGN PATENT DOCUMENTS

JP      2014070650 A    4/2014
JP         5869459 B2   2/2016

*Primary Examiner* — Tinh Dang
(74) *Attorney, Agent, or Firm* — Cantor Colburn LLP

(57) ABSTRACT

A compact transaxle is provided with a multi-speed transmission mechanism having transmission shafts extended in a longitudinal direction so that the transaxle can be combined with an engine having a crankshaft in the longitudinal direction. A bevel gear serving as an output member of the multi-speed transmission mechanism having the transmission shafts meshes with a bevel gear provided on a speed-reduction intermediate shaft extended parallel to a pair of differential yoke shafts of a differential mechanism extended in a lateral direction. A single transaxle casing incorporates the multi-speed transmission mechanism, the differential mechanism, and a speed-reduction mechanism including the speed-reduction intermediate shaft, thereby constituting the transaxle.

3 Claims, 22 Drawing Sheets

(51) Int. Cl.
    *F16H 57/031*     (2012.01)
    *F16H 57/037*     (2012.01)
    *F16H 57/038*     (2012.01)
    *B60K 17/08*     (2006.01)
    *B60K 17/34*     (2006.01)
    *B60K 5/00*     (2006.01)
    *B60K 17/16*     (2006.01)
    *F16H 57/04*     (2010.01)

(52) U.S. Cl.
    CPC ......... *B60Y 2200/20* (2013.01); *F16H 57/043* (2013.01); *F16H 57/0435* (2013.01); *F16H 57/0441* (2013.01); *F16H 57/0473* (2013.01)

(56) References Cited

U.S. PATENT DOCUMENTS

| | | | |
|---|---|---|---|
| 7,559,865 B2 * | 7/2009 | Ishii | B60K 17/28 |
| | | | 180/242 |
| 7,617,892 B2 * | 11/2009 | Nishimoto | B60K 17/08 |
| | | | 180/305 |
| 7,845,453 B2 * | 12/2010 | Nishimoto | B60K 17/34 |
| | | | 180/233 |
| 8,105,203 B2 * | 1/2012 | Ishii | F16H 3/006 |
| | | | 477/127 |
| 9,027,430 B2 | 5/2015 | Mitsubori et al. | |
| 9,487,085 B2 * | 11/2016 | Matsuura | B60K 17/3462 |
| 9,511,666 B2 * | 12/2016 | Downs | F16H 48/22 |
| 9,669,711 B2 * | 6/2017 | Nishimoto | B60K 23/08 |
| 2014/0083228 A1 | 3/2014 | Mitsubori et al. | |
| 2015/0068824 A1 * | 3/2015 | Matsuura | B60K 17/105 |
| | | | 180/53.4 |

* cited by examiner

TRANSAXLE

CROSS-REFERENCE TO RELATED APPLICATIONS

The present invention claims priority under 35 U.S.C. § 119 to Japanese Patent Application No. 2016-147620, filed on Jul. 27, 2016, the entire contents of which are incorporated herein by reference.

FIELD

At least one embodiment of the present invention relates to a transaxle, especially, to a transaxle equipped with a multi-speed transmission mechanism corresponding to an engine that is mounted on a vehicle so as to have a crankshaft whose axis is oriented along the longitudinal direction of the vehicle.

BACKGROUND

Conventionally, as disclosed in, for example, Japanese Patent No. 5869459 (hereinafter referred to as "459"), a vehicle having a dual clutch type transmission gear mechanism as a multi-speed transmission mechanism is known. In a vehicle of '459', an engine (a so-called vertical engine) is mounted so that the axis of the crankshaft is disposed along the longitudinal direction of the vehicle. This engine and a transmission case housing a dual clutch type transmission gear mechanism are combined to form a power unit, which is disposed at the front and rear center of the machine body.

A front transaxle having a differential mechanism for driving the front wheels is disposed in front of the power unit and a rear transaxle having a differential mechanism for driving the rear wheels is disposed behind the power unit Has been done. The output shaft of the multi-speed transmission mechanism of the power unit extends in the front and rear direction and between the front end of the output shaft and the front transaxle and between the rear end of the output shaft and the rear transaxle, Each of the front and rear wheels is driven by interposing a transmission shaft with a universal joint and distributing the output of the dual clutch transmission gear mechanism to the front and rear transaxle units.

The dual clutch multistage transmission gear mechanism applied to the power unit described above corresponds to a vertically mounted engine and has an axial core extending in the longitudinal direction of the vehicle as a gear shaft and a clutch shaft (this state is hereinafter referred to as "longitudinal extension Shaped" transmission shafts) are arranged side by side.

In response to such a vertically mounted engine, a multi-speed transmission mechanism comprising a dual clutch transmission gear mechanism having a plurality of longitudinally stretched gear shafts and clutch shafts arranged side by side is used as the left and right differential yoke shafts for driving the wheels There is an industrial demand to construct a transaxle as one unit in combination with a supported differential mechanism and a speed-reduction mechanism for transmitting power from the multi-speed transmission mechanism to the differential mechanism.

When configuring such a transaxle, the gear shaft and the clutch shaft constituting the multi-speed transmission mechanism are in the longitudinal (front-rear) direction, while the differential yoke shaft of the differential mechanism has an axis extending in the lateral (left-right) direction of the vehicle (Hereinafter, this state is referred to as "laterally extended"), and when a differential mechanism and a multi-speed transmission mechanism are combined, it is interposed between the output section of the multi-speed transmission mechanism and the input section of the differential mechanism It is desired that the structure of the differential mechanism becomes complicated and the entire transaxle is compact.

SUMMARY

An transaxle of the present application comprises a multi-speed transmission that includes a plurality of transmission shafts having respective axes extending in a longitudinal direction of an applicable vehicle, a differential mechanism that includes a pair of differential yoke shafts having respective axes extending in a lateral direction of the applied vehicle, and a speed-reduction mechanism configured to transmit power from an output member of the multi-speed transmission mechanism to an input member of the differential mechanism.

In the transaxle, the output member of the multi-speed transmission mechanism is a first bevel gear, and the speed-reduction mechanism includes a speed-reduction intermediate shaft parallel to the pair of differential yoke shafts, and includes a second bevel gear provided on the speed-reduction intermediate shaft to mesh with the first bevel gear. The single transaxle casing incorporates the multi-speed transmission mechanism, the differential mechanism and the speed-reduction mechanism.

In addition, the speed-reduction intermediate shaft is disposed at a position higher than the pair of differential yoke shafts.

In addition, the transaxle casing includes a main housing, a first lid, and a second lid. The main housing is formed integrally with a first housing part and a second housing part adjacent to each other. The first lid has a joint surface along a first phantom plane perpendicularly intersecting with the plurality of transmission shafts. The joint surface of the first lid is detachably joined to an end surface of the first housing part so that the first lid and the first housing part joined to each other define a first chamber therein. The multi-speed transmission mechanism is disposed in the first chamber. The second lid has a joint surface along a second phantom plane perpendicularly intersecting with one of the pair of differential yoke shafts. The joint surface of the second lid is detachably joined to an end surface of the second housing part so that the second lid and the second housing part joined to each other define a second chamber therein. The speed-reduction mechanism and the differential mechanism are disposed in the second chamber.

Effect of the transaxle will be described.

The transaxle drivingly connects the multi-speed transmission mechanism and the differential mechanism to each other via the speed-reduction mechanism so that the multi-speed transmission mechanism, the speed-reduction mechanism and the differential mechanism serve as a single power train. The single transaxle casing incorporates the single power train, including the multi-speed transmission mechanism, the speed-reduction mechanism and the differential mechanism drivingly connected to one another, so that the single power train and the single transaxle casing incorporating the single power train are configured as a single unit. Therefore, in a case where a dual clutch transmission gear mechanism serves as the multi-speed transmission mechanism, the transaxle is configured as a unit by combining the dual clutch transmission gear mechanism and the differential mechanism, thereby satisfying the above-mentioned industrial desires.

Here, if there is no speed-reduction intermediate shaft, a bevel gear serves as a bull gear of a differential mechanism having a left and right deflection yoke shafts, and directly meshes with another bevel gear serving as an output member of the multi-speed transmission mechanism provided on an output shaft of the multi-speed transmission mechanism extended in a longitudinal direction of a vehicle. However, to ensure a sufficient speed-reduction ratio between the output shaft and the differential mechanism, the bull gear of the differential mechanism has to be very diametrically large to expand the transaxle in a radial direction of the differential yoke shafts and to increase costs.

On the contrary, in the transaxle according to the embodiment of the present application, the speed-reduction intermediate shaft is interposed between the output member of the multi-speed transmission mechanism and the differential mechanism, and the first bevel gear serving as the output member of the multi-speed transmission mechanism and the second bevel gear provided on the speed-reduction intermediate shaft directly mesh with each other to have some speed-reduction ratio such as to reduce the speed-reduction ratio of a gear train (including spur gears) interposed between the speed-reduction intermediate shaft and the differential mechanism, thereby preventing the bull gear of the differential mechanism from having an excessively large diameter, and thereby ensuring a desirable compactness of the portion of the transaxle surrounding the differential yoke shafts in the radial direction of the differential yoke shafts.

In the case where a speed-reduction intermediate shaft is provided, the speed-reduction intermediate shaft is made to extend in the longitudinal (front-rear) direction, the linkage with the output shaft of the multi-speed transmission mechanism is caused by the meshing of the spur gears, and the linkage with the differential mechanism is caused by meshing of the bevel gears In this case, the transaxle expands in the longitudinal direction of the applicable vehicle due to the axial core length of the speed-reduction intermediate shaft.

In this regard, the transaxle according to the present invention has the speed-reduction intermediate shaft disposed parallel to the pair of differential yoke shafts, so that the compactness of the transaxle in the longitudinal (front-rear) direction of the applicable vehicle is secured.

In addition, by disposing the speed-reduction intermediate shaft in parallel to the pair of differential yoke shafts and arranging the speed-reduction intermediate shaft at a position higher than the pair of differential yoke shafts (for example, obliquely above the differential yoke shaft) The front and rear width of the speed-reduction mechanism interposed between the multi-speed transmission mechanism and the differential mechanism is further reduced and further contributes to the compactification of the transaxle in the longitudinal direction of the applicable vehicle.

Therefore, a vehicle to be equipped with such a compact transaxle can be minimized and a space in the vehicle around the transaxle used for arrangement of other members and portions can be expanded.

Further, in the case where the transaxle casing includes the main housing, the first lid and the second lid as described above, the plurality of longitudinally extended transmission shafts of the multi-speed transmission mechanism can be pulled in and out in the longitudinal (axial) direction along with the joining and separating operation of the first lid to and from the first housing part of the main housing at their joint surfaces along the first phantom plane, thereby facilitating assembling and disassembling of the multi-speed transmission mechanism.

On the other hand, along with the joining and separating operation of the second cover to and from the second housing part of the main housing at their joining surfaces along the second phantom plane, the left and right differential yoke shafts of the differential mechanism and the speed-reduction intermediate shaft of a speed-reduction mechanism can be pulled in and out in the lateral (axial) direction, thereby facilitating assembling and disassembling of the differential mechanism and the speed-reduction mechanism.

Therefore, the assembling and disassembling of the multi-speed transmission mechanism in the first chamber formed inside the first housing part of the main housing and the first cover joined to the first housing part can be independent of the assembling and disassembling of the speed-reduction mechanism and the differential mechanism in the second chamber formed in the second housing part of the main housing and the second lid joined to the second housing part, thereby facilitating assembling of the transaxle as a single unit, and improving maintenance of the transaxle.

The above and other features and effects of the transaxle according to the present application will become more apparent from the following detailed description with reference to the accompanying drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
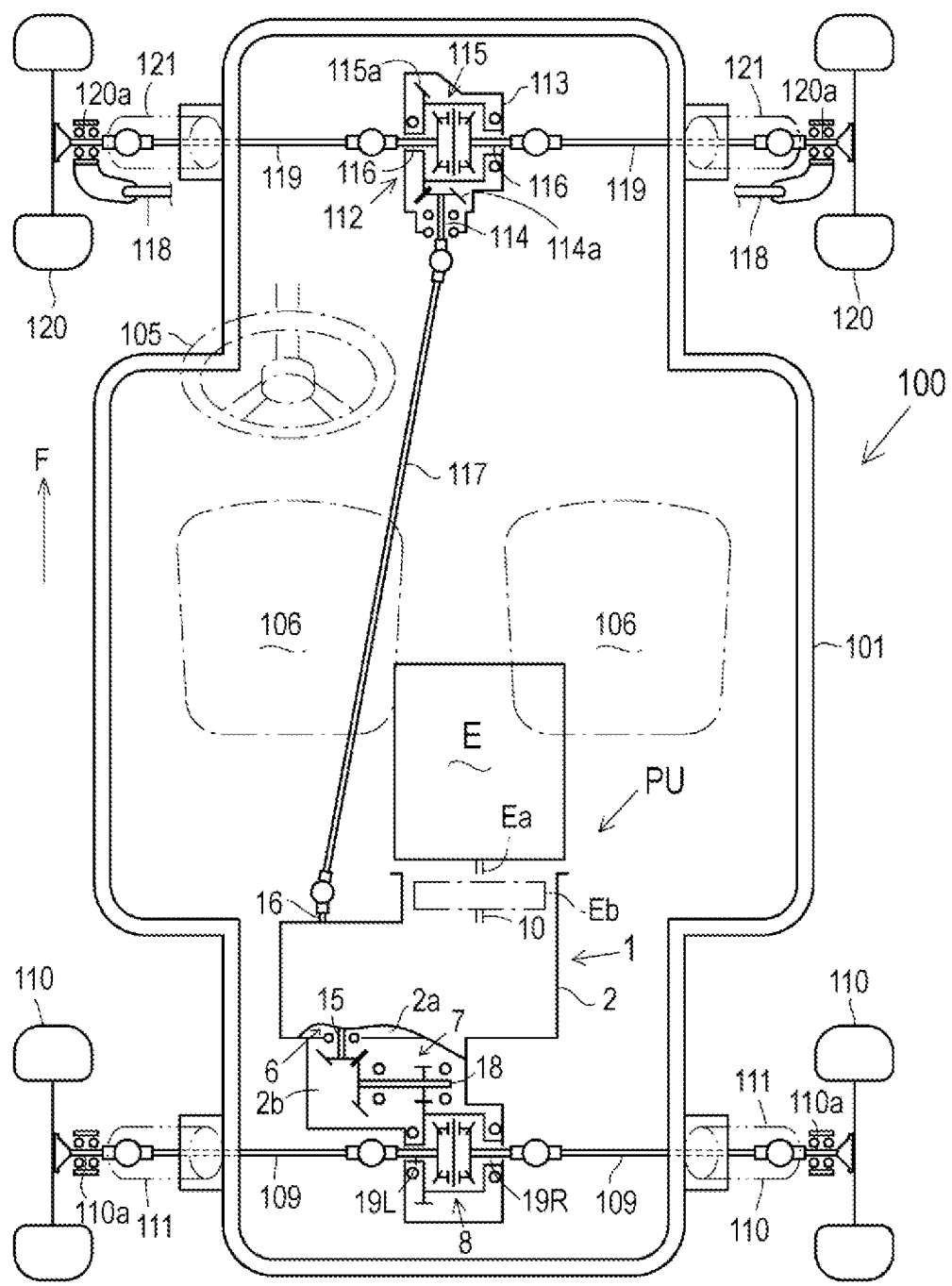
FIG. 1 is a schematic plan view of a UTV 100 as an example of a work vehicle having a transaxle 1.
Figure 2:
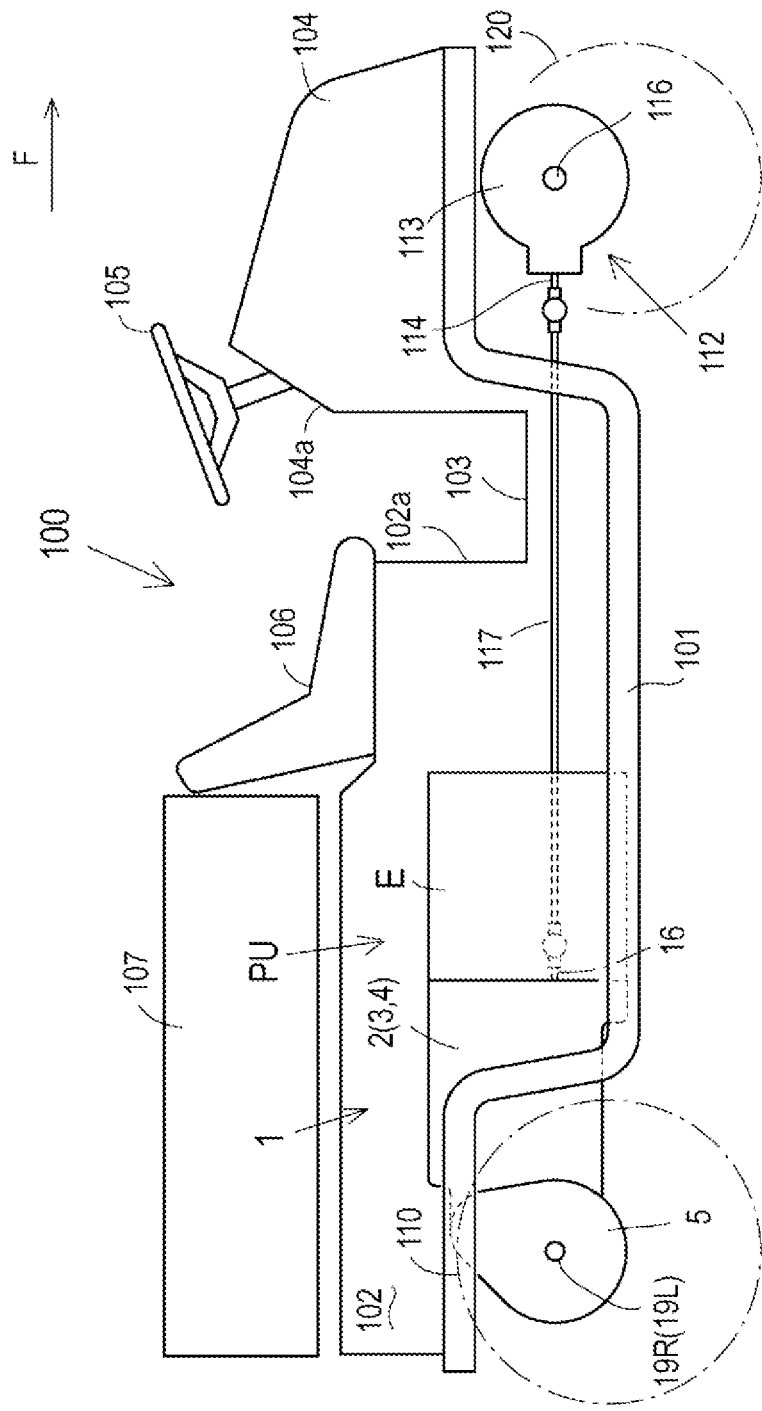
FIG. 2 is a schematic side view of the UTV 100.

A utility vehicle (hereinafter, referred to as "UTV") 100 as an embodiment of a work vehicle on which the transaxle 1 is mounted as shown in FIGS. 1 and 2 will be described.

Arrows F shown in FIGS. 1, 2, and other drawings are directed forward of the UTV 100. In the following description, devices and members are defined in position and direction as those viewed in the direction of the arrow F directed forward of the UTV 100.

The UTV 100 is provided with a vehicle body frame (chassis) 101 extending in the longitudinal (front-rear) direction from the front end to the rear end. A loading platform mounting frame 102 is formed at the rear portion of the vehicle body frame 101, and a loading platform 107 is mounted on the loading platform mounting frame 102 so as to be rotatable upward.

A seat base 102a is formed in the front portion of the loading platform mounting frame 102, and a seat 106 (a pair of left and right seats 106 as a driver's seat and a front passenger seat in the present embodiment) is mounted on the seat base 102a.

Just before the seat base 102a, a platform 103 is laid on the vehicle body frame 101.

A bonnet 104 is provided at a front portion of the vehicle body frame 101 in front of the platform 103. A front column 104a is formed at a rear end portion of the bonnet 104. A steering handle 105 is provided at an upper portion of the front column 104a.

On the rear portion of the vehicle body frame 101, the left and right rear wheels 110 are suspended via the respective suspensions 111. On the other hand, at the front portion of the vehicle body frame 101, the left and right front wheels 120 are suspended via suspensions 121.

The vehicle body frame 101 supports a power unit PU within the loading platform mounting frame 102. The power unit PU includes an engine E and a rear transaxle 1. The engine E is disposed so as to have a crankshaft whose axis extends along the longitudinal (front-rear) direction of the UTV 100. The rear transaxle 1 is disposed continuously rearward from the engine E so as to drive the rear wheels 110 of UTV 100.

As described later in detail, a multi-speed transmission mechanism 6 is accommodated in a speed-change gear chamber (first chamber) 2a formed in a front portion of a transaxle casing 2 which is a housing of the rear transaxle 1. A speed-reduction gear mechanism 7 and a differential mechanism 8 are housed in a speed-reduction/differential gear chamber (second chamber) 2b formed in a rear part of the transaxle casing 2.

The engine E has a rearwardly projecting engine output shaft Ea having an axis extending along a longitudinal (front-rear) direction of the UTV 100 (hereinafter this state will be referred to as "longitudinally extended"), and a flywheel Eb are provided on a rear end of the engine output shaft Ea. On the other hand, the multi-speed transmission mechanism 6 has a longitudinally extended input shaft 10, and a front end of the input shaft 10 is connected to a rear end of the engine output shaft Ea via the flywheel Eb.

As described later, the multi-speed transmission mechanism 6 has a plurality of longitudinally extended transmission shafts (clutch shafts and gear shafts) arranged in parallel in the speed-change gear chamber 2a. A rear end of an output shaft 15 of the multi-speed transmission mechanism 6 extends from the speed-change gear chamber 2a to the speed-reduction/differential gear chamber 2b, and is drivingly connected to the speed-reduction mechanism 7.

The differential mechanism 8 in the speed-reduction/differential gear chamber 2b includes a pair of left and right differential yoke shafts 19L and 10R serving as an output shaft of the rear transaxle 1. Each of the differential yoke shafts 19L and 19R has an axis extended in a lateral (left-right) direction of the UTV 100 (hereinafter, this state is referred to as "laterally extended").

The left and right differential yoke shafts 19L and 19R protrude leftwardly and rightwardly outward from the transaxle casing 2 and are connected to axles 110a of the respective rear wheels 110 via respective propeller shafts 109 each of which has universal joints at both ends thereof.

Thus, in the rear transaxle 1, the multi-speed transmission mechanism 6 is driven by the power of the engine E via the longitudinally extended input shaft 10, and its output is transmitted via the speed-reduction mechanism 7 to the differential mechanism 8 and is further distributed to the pair of left and right deflection yoke shafts 19L and 19R via the differential mechanism 8, and transmitted to the left and right rear wheels 110.

Further, the rear transaxle 1 is provided with a longitudinally (front-rear) extended front wheel drive PTO shaft 16 protruding forward from a portion of the transaxle casing 2 offset from the portion of the transaxle casing 2 connected to the engine E in the lateral direction (leftward in this embodiment).

The front wheel drive PTO shaft 16 is driven by the output of the multi-speed transmission mechanism 6. In other words, the output of the multi-speed transmission mechanism 6 (rotational force of the output shaft 15) is distributed to the rear wheel drive speed-reduction mechanism 7 and the front wheel drive PTO shaft 16.

A front transaxle 112 for driving the front wheels 120 is supported at a front portion of the vehicle body frame 101. A typical bevel gear type differential mechanism 115 is housed in a transaxle casing 113 which is a housing of the front transaxle 112.

The differential mechanism 115 has a pair of left and right differential yoke shafts 116. Distal end portions of the respective differential yoke shafts 116 protrude leftwardly and rightwardly outward from the transaxle casing 113 so as to be connected to respective axles 120a of front wheels 120 via respective propeller shafts 119 each of which has universal joints at both ends thereof.

The left and right front wheels 120 are steerable wheels, which are connected to each other by a tie rod 118. According to a turning operation of the steering handle 105, both the front wheels 120 turn left or right simultaneously, thereby turning the UTV 100.

The front transaxle 112 has an input shaft 114 extended in the longitudinal (front-rear) horizontal direction. The input shaft 114 is journalled by the rear portion of the transaxle casing 113, and in the transaxle casing 113, a bevel gear 114a is fixed (or formed) on the front end of the input shaft 114 and meshes with a bevel gear serving as an input gear 115a of the differential mechanism 115.

Hereinafter, each of bevel gears is referred to as "bevel gear", and each of spur gears is simply referred to as "gear". In addition, hereinafter, each of gears expressed as being "fixed" on a shaft may be "formed" on the shaft, and each of gears expressed as being "formed" on a shaft may be "fixed" on the shaft.

A rear end of the input shaft 114 protrudes rearward from the transaxle casing 113. A propeller shaft 117 having universal joints on both ends thereof is interposed between the rear end of the input shaft 114 and a front end of the above-mentioned front wheel drive PTO shaft 16 of the rear transaxle 1.

Thus, the output of the rear transaxle 1 is transmitted to the differential mechanism 115 of the front transaxle 112 via the front wheel drive PTO shaft 16 and the propeller shaft 117, and is distributed to the left and right front wheels 120 via the left and right differential yoke shafts 116.

A configuration of the rear transaxle 1 (hereinafter simply referred to as "transaxle 1") will be described with reference to FIGS. 3 to 22.

As shown in FIGS. 3, 4, 5, 8, etc., the transaxle 1 has a single transaxle casing 2. The transaxle casing 2 is formed by combining a main housing 3, a front cover (first cover) 4, and a rear side cover (second cover) 5.

Figure 4:
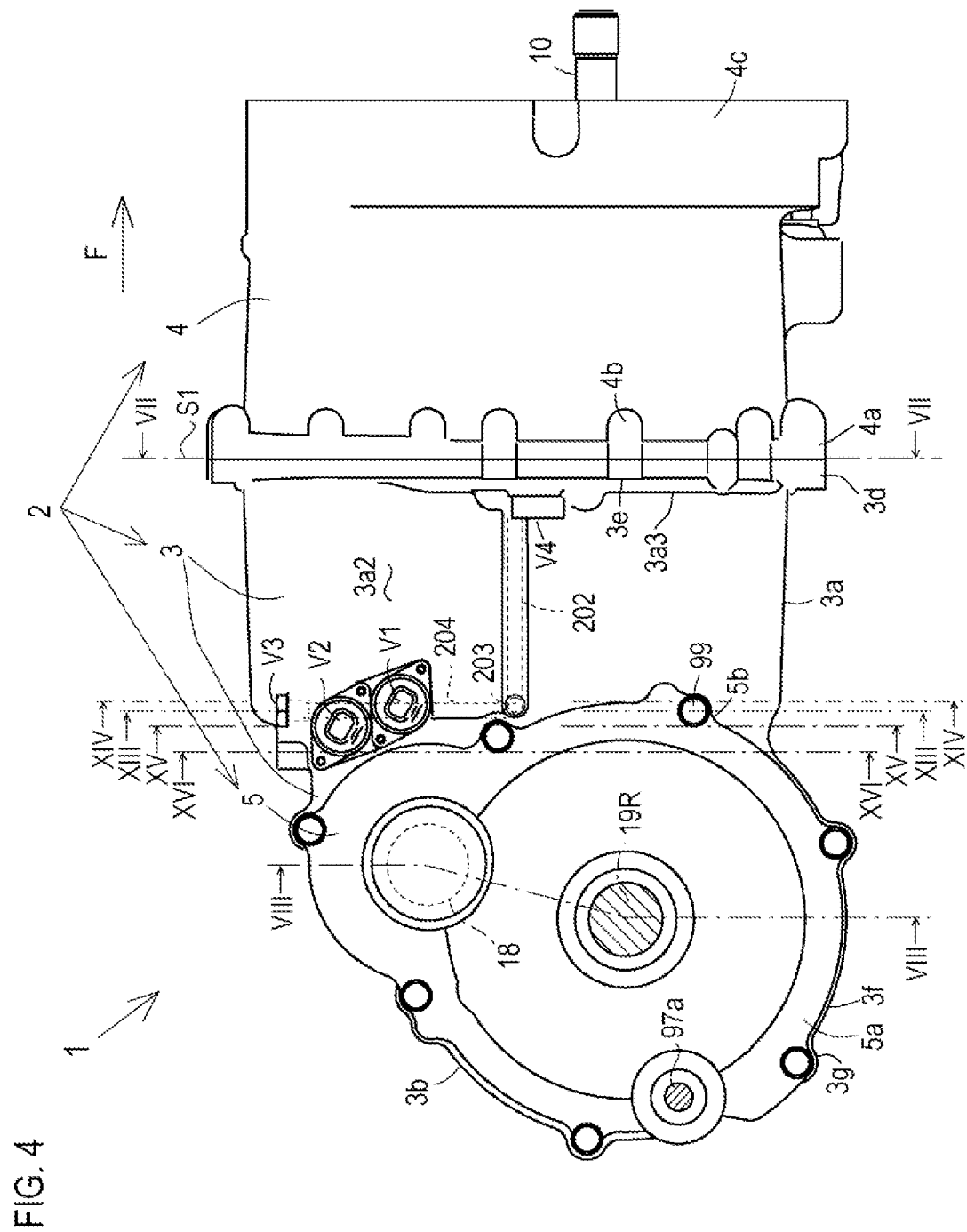
FIG. 4 is a side view of the transaxle 1.
Figure 5:
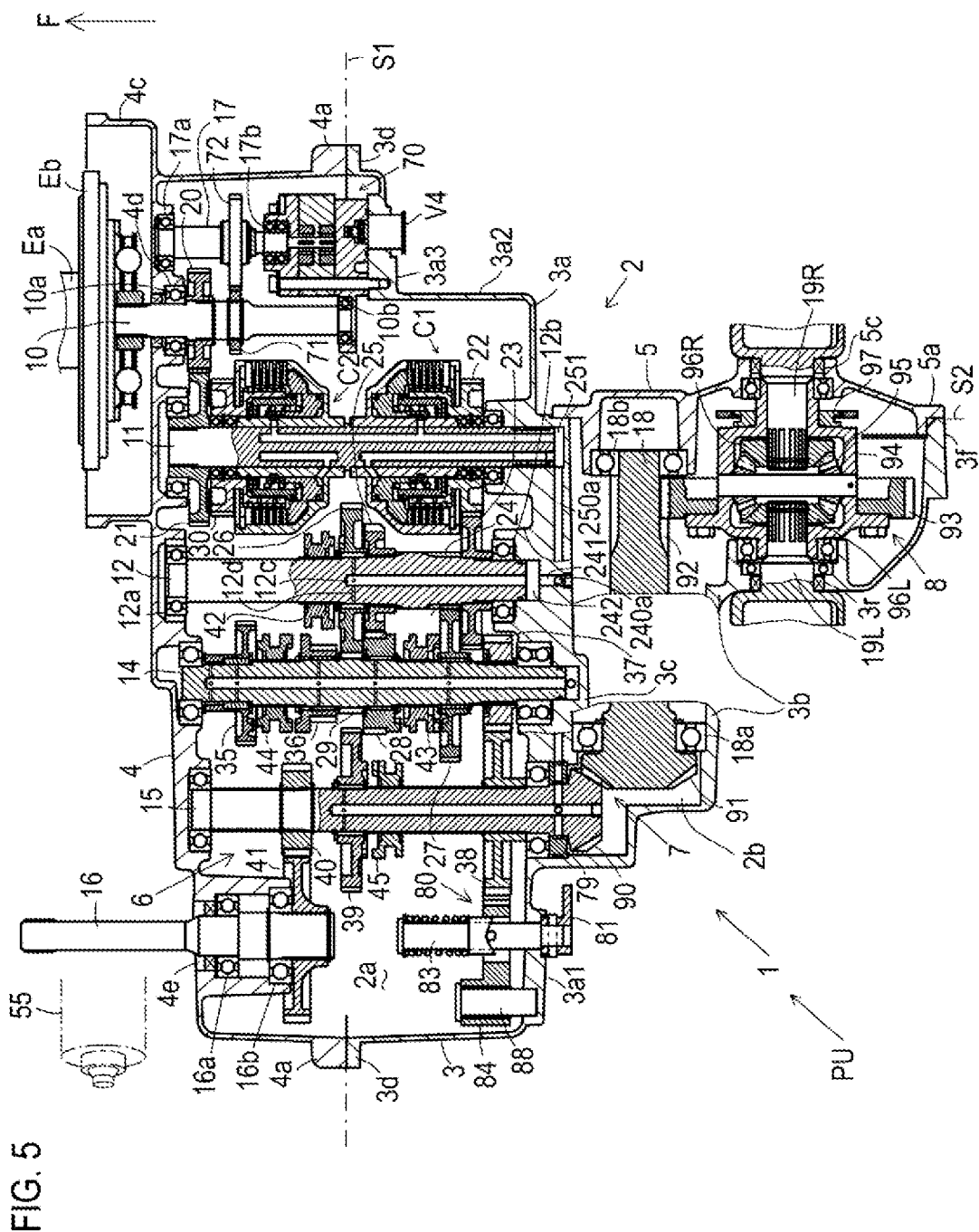
FIG. 5 is a plane development cross-sectional view of the transaxle 1.
Figure 8:
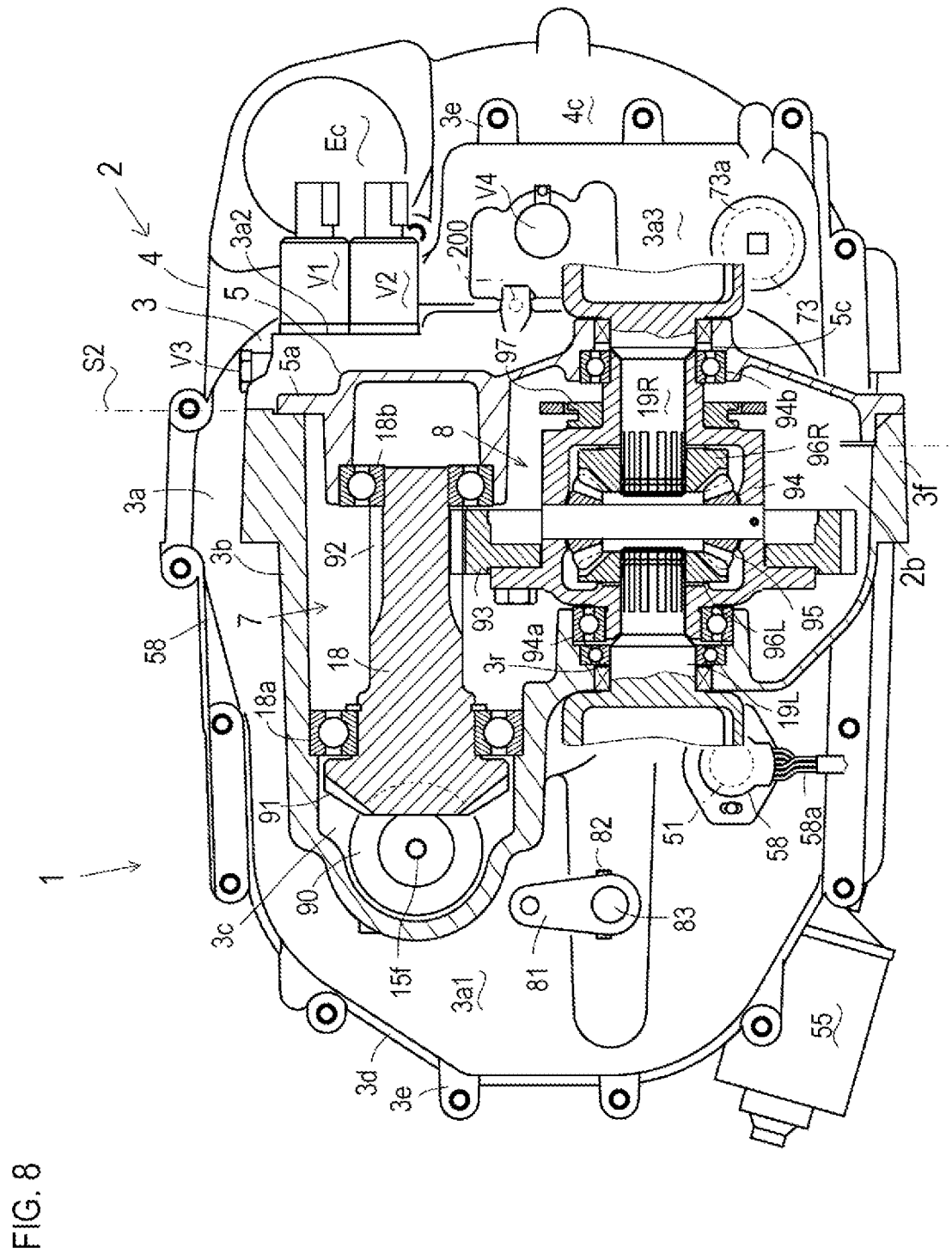
FIG. 8 is a rear cross-sectional view of the transaxle 1 taken along the line VIII-VIII in FIG. 4, showing a speed-reduction mechanism 7 and a differential mechanism 8.

As understood from FIGS. 4, 5, 8, etc., the main housing 3 is formed integrally with a front half portion serving as a first housing part 3a, having a large lateral width, and with a rear half portion thereof serving as a second housing part 3b, having a small lateral width.

The first housing part 3a and the second housing part 3b adjoin each other. The main housing 3 is formed therein with a substantially vertical partition wall 3c extended in the lateral direction of the UTV 100 (hereinafter simply referred to as "laterally" or "lateral") and defined as a boundary portion between a rear end of the first housing part 3a and a front end of the second housing part 3b.

Figure 3:
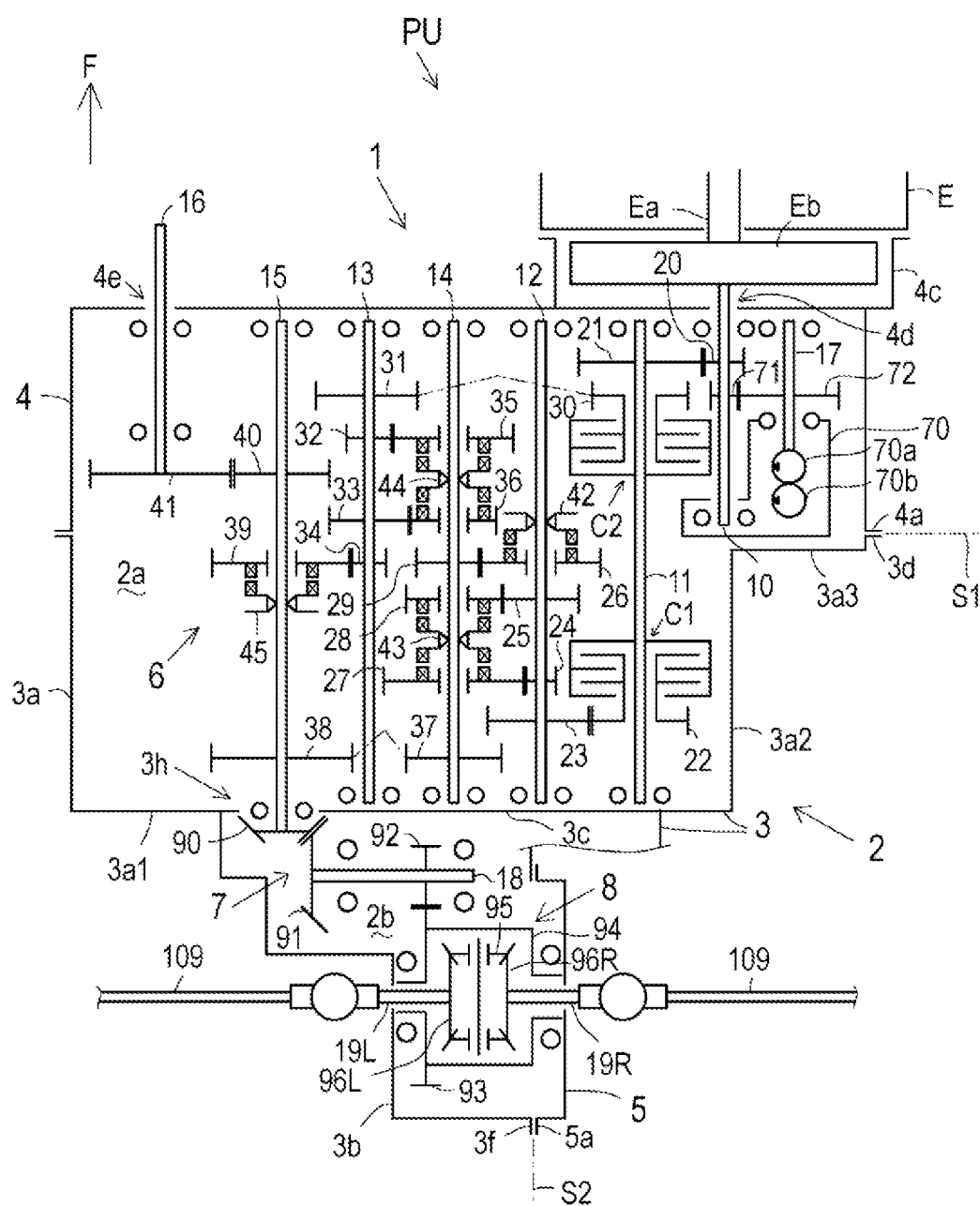
FIG. 3 is a skeleton diagram of the transaxle 1.

The first housing part 3a has a front end opening, and is formed with a flange-shaped peripheral edge portion 3d surrounding the front end opening and having a laterally extended vertical front end surface serving as a joint surface joined to the front cover 4, and this joint surface is placed along a first phantom plane S1 extended laterally as shown in FIGS. 3, 4, and 5.

The front cover 4 has a rear end opening, and is formed with a flange-shaped peripheral edge portion 4a surrounding the rear end opening and having a laterally extended vertical rear end surface serving as a joint surface joined to the first housing part 3a of the main housing 3, and this joint surface is placed along the first phantom plane S1 so as to contact the front end surface of the flange-shaped peripheral edge portion 3d.

Figure 7:
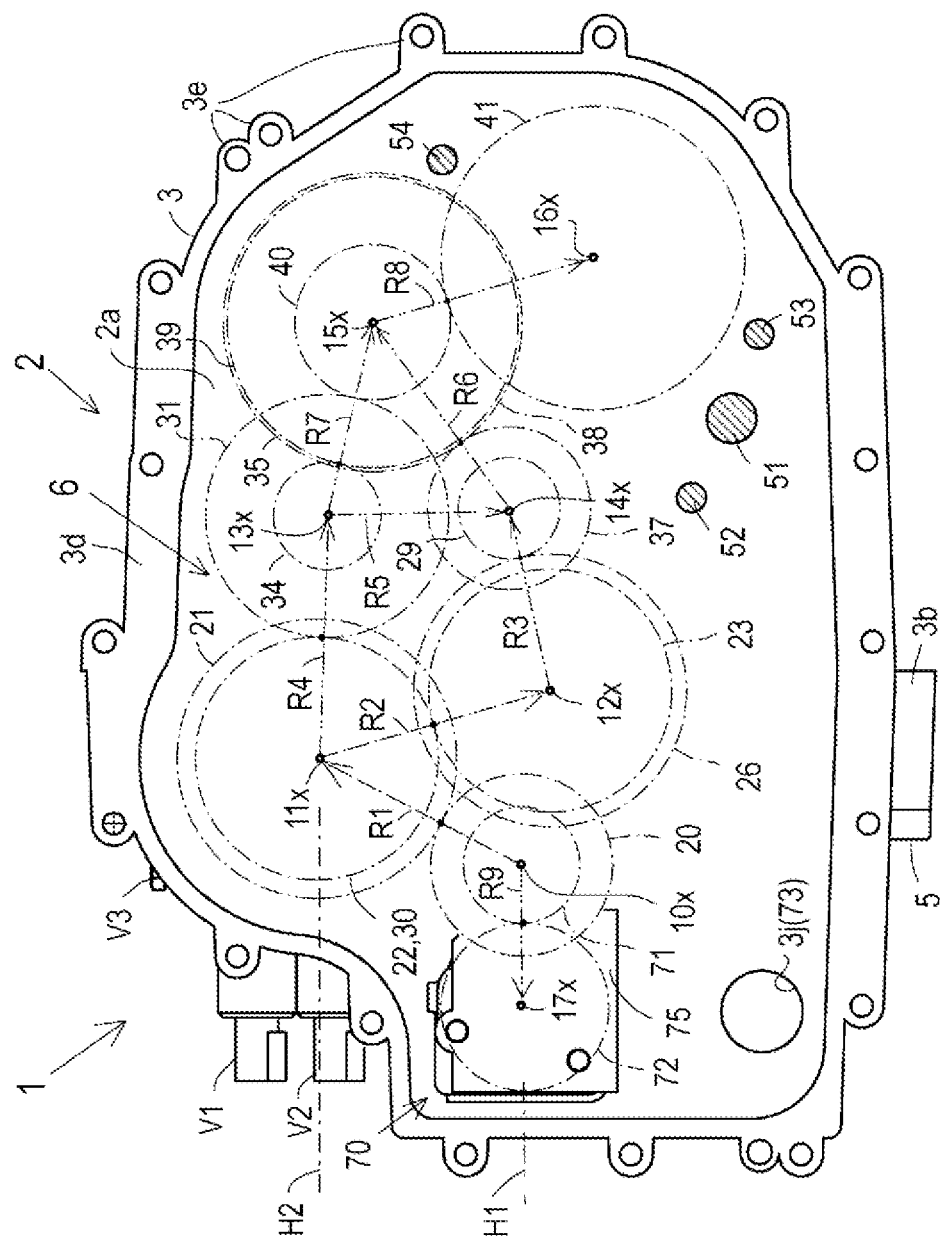
FIG. 7 is a sectional front view of the transaxle 1 taken along the line VII-VII in FIG. 4, showing a layout of gear shafts of the multi-speed transmission mechanism 6.

As understood from FIGS. 4, 7, 8 and so on, the flange-shaped peripheral edge portion 3d of the main housing 3 is formed with a plurality of bolt bosses 3e, and the flange-shaped peripheral edge portion 4a of the front cover 4 is also formed with bolt bosses 4b (see FIG. 4) corresponding to the respective bolt bosses 3e.

By bringing the flange-shaped peripheral edge portions 3d and 4a into contact with each other, bolt holes in the respective bolt bosses 3e are aligned with bolt holes of the respective bolt bosses 4b, and by screwing bolts into these bolt holes, the front cover 4 and the first housing part 3a of the main housing 3 are fastened together.

The first housing part 3a of the main housing 3 and the front cover 4 joined mutually as mentioned above define a speed-change gear chamber 2a therein forward from the partition wall 3c. A multi-speed transmission mechanism 6 having a plurality of longitudinally extended transmission shafts (i.e., clutch shafts and gear shafts) are accommodated in the speed-change gear chamber 2a as described in detail later. Therefore, the first phantom plane S1 is defined as a plane perpendicularly intersecting the transmission shafts of the multi-speed transmission mechanism 6.

Further, as shown in FIG. 8 and so on, due to the difference in lateral width between the first housing part 3a and the second housing part 3b, the laterally extended partition wall 3c of the main housing 3 is extended further leftward from the front end portion of the second housing part 3b so as to be defined as a substantially vertical rear end wall of a left portion of the first housing part 3a. This rear end wall has a rear end surface serving as a first stepped surface 3a1.

On the other hand, as shown in FIGS. 4, 8 and so on, on the right side of the front end portion of the second housing part 3b, the first housing part 3a has a forwardly extended vertical right side surface 3a2. A substantially vertical surface extends laterally along the flange-shaped peripheral edge portion 3d.

On the right side of the second housing part 3b, the first housing part 3a has a laterally extended portion disposed forward by a step from the first stepped surface 3a1 on the left side of the second housing part 3b via the longitudinally extended right side surface 3a2. This laterally extended portion of the first housing part 3a has a substantially vertical surface serving as a second stepped surface 3a3.

The first stepped surface 3a1, the right side surface 3a2, and the second stepped surface 3a3, which are outer surfaces of the first housing parts 3a, are used as mounting surfaces for mounting a gearshift control mechanism, a gear-lubricating mechanism and so on for the multi-speed transmission mechanism 6 in the speed-change gear chamber 2a and relevant members.

In this regard, a rotational position sensor 58 of a later-described shifter control mechanism 9 and a brake arm 81 of a later-described brake unit 80 are arranged on the first stepped surface 3a1. The right side surface 3a2 is used for mounting electromagnetic proportional valves V1 and V2 for first and second clutches C1 and C2 serving as dual clutches as described later. The second stepped surface 3a3 is used for mounting an unloader valve V4 and a filter 73 for a hydraulic pump unit 70 as described later.

As understood from FIG. 3, 4, 5, 8, etc., the second housing part 3b of the main housing 3 has a right end opening, and is formed with a flange-shaped peripheral edge portion 3f surrounding the right end opening so as to have a vertical right end surface extending in the longitudinal (front-rear) direction of the UTV 100 (hereinafter simply referred to as "longitudinal" or "longitudinally").

The right end surface of the flange-shaped peripheral edge portion 3f serves as a joint surface joined to the rear side cover 5, and is arranged along a longitudinally vertical second phantom plane S2 as shown in FIGS. 5 and 8.

The rear side cover 5 is formed with a substantially vertical flange-shaped peripheral edge portion 5a that is extended longitudinally and has a left end surface serving as a joint surface joined to the second housing part 3b of the main housing 3. Therefore, the left end surface of the flange-shaped peripheral edge portion 5a is disposed along the second phantom plane S2 so as to contact the right end surface of the flange-shaped peripheral edge portion 3f of the second housing part 3b.

As understood from FIG. 4, a plurality of bolt bosses 3g are formed on the flange-shaped peripheral edge portion 3f of the main housing 3, and a plurality of bolt bosses 5b are formed on the flange-shaped peripheral edge portion 5a of the rear side cover 5 so as to correspond to the respective bolt bosses 3g.

By bringing the flange-shaped peripheral edge portions 3f and 5a into contact with each other, and by screwing bolts 99 into bolt holes in the bolt bosses 3g and 5b, the rear side cover 5 is fastened to the second housing part 3b of the main housing 3.

In this way, the second housing part 3b of the main housing 3 and the rear side cover 5 are joined to each other so as to form a speed-reduction/differential gear chamber 2b therein rearward from the partition wall 3c.

As described in detail later, a speed-reduction mechanism 7, having a laterally extended speed-reduction intermediate shaft 18, and a differential mechanism 8, having left and right differential yoke shafts 19L and 19R extended laterally, are accommodated in the speed-reduction/differential gear chamber 2b. The second phantom plane S2 is a surface that perpendicularly intersects with the right deflection yoke axis 19R of the shafts of the speed-reduction mechanism 7 and the differential mechanism 8.

A shaft hole 4d through which the input shaft 10 is inserted is bored in the front end wall of the front cover 4 corresponding to the front end wall of the transaxle casing 2. The front cover 4 is formed with a flywheel housing portion 4c that houses a front end portion of the input shaft 10 projecting forward from the shaft hole 4d.

In the construction of the power unit PU by combining the engine E and the transaxle 1 as described above, a flywheel Eb on a rear end of the engine output shaft Ea is disposed in the flywheel housing portion 4c, and the front end of the input shaft 10 is connected to the flywheel Eb.

A starter motor Ec of the engine E is attached to an upper rear end surface of the flywheel housing portion 4c as shown in FIG. 8 and so on.

As shown in FIG. 5, a shaft hole 4e is formed in the front end wall of the front cover 4 leftward from the flywheel housing portion 4c. A front wheel drive PTO shaft 16 is extended through the shaft hole 4e so that a front end portion of the front wheel drive PTO shaft 16 protrudes forward from the left front end of the transaxle casing 2 via the shaft hole 4e.

The front end portion of the front wheel drive PTO shaft 16 is connected to the input shaft 114 of the front transaxle 112 for driving the front wheels 120 via the propeller shaft 117 disposed on the left side of the engine E of the power unit PU.

As shown in FIGS. 5 and 8, a shaft hole 3r is formed in the left end wall of the second housing part 3b of the main housing 3, and the left differential yoke shaft 19L is extended through the shaft hole 3r. A distal end portion (left end portion) of the left differential yoke shaft 19L protrudes leftward from the rear portion of the transaxle casing 2 via the shaft hole 3r. The left end portion of the left differential yoke shaft 19L is connected to the axle 110a of the left rear wheel 110 via the left propeller shaft 109.

On the other hand, a shaft hole 5c through which the right differential yoke shaft 19R is inserted is formed in a right end wall of the rear cover 5 bilaterally symmetrically with the shaft hole 3r of the second housing part 3b. The right differential yoke shaft 19R is extended through the shaft hole 5c so that a distal (right) end portion of the right differential yoke shaft 19R protrudes rightward from the rear portion of the transaxle casing 2 via the shaft hole 5c. The right end portion of this right differential yoke shaft 19R is connected to the axle 110a of the right rear wheel 110 via the right propeller shaft 109.

In the present embodiment, a dual clutch transmission gear mechanism is used as the multi-speed transmission mechanism 6 disposed in the speed-change gear chamber 2a. This configuration will be described with reference to FIGS. 3, 5 to 8, and so on.

The multi-speed transmission mechanism 6 includes a plurality of transmission shafts for transmitting the output of the engine E to the rear wheel drive speed-reduction mechanism 7. The plurality of transmission shafts, including an input shaft 10 extended in the longitudinal (front-rear) direction that is the same direction as the engine output shaft Ea, a dual clutch A shaft 11, an odd-numbered speed drive gear shaft 12, an even-numbered speed drive gear shaft 13, a speed-change driven gear shaft 14, and an output shaft 15, are disposed in the speed-change gear chamber 2a and are extended parallel to one another.

Further, in the speed-change gear chamber 2a, as transmission shafts drivingly connected to the multi-speed transmission mechanism 6, the front wheel drive PTO shaft 16 for transmitting the rotational power of the output shaft 15 of the multi-speed transmission mechanism 6 to the front wheels 120, and a pump drive shaft 17 for driving a first hydraulic pump 70a and a second hydraulic pump 70b as charge pumps in the later-described hydraulic pump unit 70 for supplying fluid to the first and second clutches C1 and C2 serving as the dual clutch, are extended longitudinally parallel to the transmission shafts 10, 11, 12, 13, 14, 15 of the multi-speed transmission mechanism 6.

As shown in FIG. 5 and so on, the front portion of the input shaft 10 is journaled through a bearing 10a in the shaft hole 4d, and its front end portion projects forward from the shaft hole 4d as described above. A front end of a pump drive shaft 17 extending in parallel to the input shaft 10 is journaled via a bearing 17*a* by a front wall portion of the front cover 4 defined as a front end wall of the speed-change gear chamber 2*a*.

On the other hand, as shown in FIG. 5 and so on, in the speed-change gear chamber 2*a*, a later-described hydraulic pump unit 70 is attached to the wall portion (hereinafter referred to as "wall portion 3*a*3") that is extended laterally to form the second stepped surface 3*a*3 of the main housing 3.

A later-described valve block 77 serves as a rear end portion of the hydraulic pump unit 70, and a portion of the valve block 77 is extended perpendicular to the axial direction of the input shaft 10 and so on. A rear end of the input shaft 10 is journalled by the extended portion of the valve block 77 via a bearing 10*b*. Also, a rear end of the pump drive shaft 17 is journalled by a front end portion (a later-described bearing block 75) of the hydraulic pump unit 70 via a bearing 17*b*.

Figure 6:
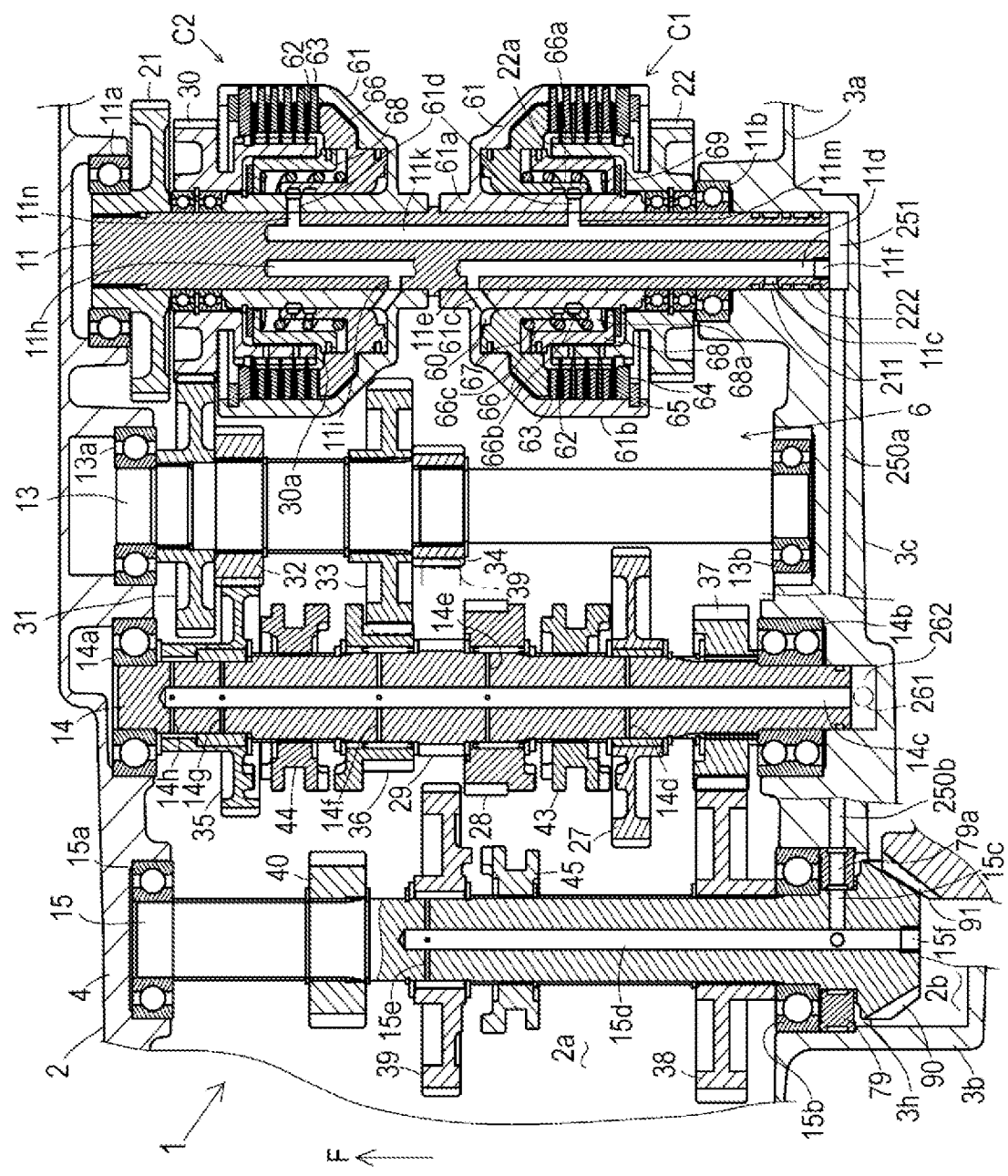
FIG. 6 is an enlarged fragmentary development cross-sectional plan view of the transaxle 1 showing a main part of a multi-speed transmission mechanism 6.

As shown in FIGS. 5 and 6, the dual clutch shaft 11, the odd-numbered speed drive gear shaft 12, the even-numbered speed drive gear shaft 13, the speed-change driven gear shaft 14 and the output shaft 15 (i.e., the transmission shafts (clutch shafts and gear shafts) 11, 12, 13, 14, 15 of the multi-speed transmission mechanism 6) are connected at respective front ends thereof via respective bearings 11*a*, 12*a*, 13*a*, 14*a*, 15*a* by the front wall of the front cover 4 defined as the front end wall of the speed-change gear chamber 2*a*. On the other hand, the transmission shafts 11, 12, 13, 14, 15 of the multi-speed transmission mechanism 6 are connected at respective rear portions thereof via respective bearings 11*b*, 12*b*, 13*b*, 14*b*, 15*b* by the partition wall 3*c* between the speed-change gear chamber 2*a* and the speed-reduction/differential gear chamber 2*b*.

In order to simplify and clarify the drawing, the odd-numbered speed drive gear shaft 12 is shown and the even-numbered speed drive gear shaft 13 is omitted in FIG. 5 as a developed cross-sectional plan view of the transaxle 1. On the other hand, the odd-numbered speed drive gear shaft 12 is omitted and the even-numbered speed drive gear shaft 13 is shown in FIG. 6 as a developed cross-sectional plan view of the multi-speed transmission mechanism 6.

As understood from FIGS. 3, 5, 6, and 8, the rear ends of the dual clutch shaft 11, the odd-numbered speed driving gear shaft 12 and the even-numbered speed driving gear shaft 13 are disposed in the partition wall 3*c*, while the rear end of the output shaft 15 protrudes into the speed-reduction/differential gear chamber 2*b* rearward from the partition wall 3*c* via a shaft hole 3*h* formed in the partition wall 3*c*, and connected to the speed-reduction mechanism 7 in the speed-reduction/differential gear chamber 2*b*.

As shown in FIGS. 5 and 6, a gear 20 is fixed on the input shaft 10 along the front wall of the front cover 4 defined as the front end wall of the speed-change gear chamber 2*a*, and meshes with a gear 21 fixed on the dual clutch shaft 11.

In FIG. 7, a flow of power from the input shaft 10 to the dual clutch shaft 11 by meshing of the gears 20 and 21 is indicated by an arrow R1.

Further, a gear 71 fixed on a longitudinally intermediate portion of the input shaft 10 meshes with a gear 72 fixed on the pump drive shaft 17. Therefore, a rotational force of the input shaft 10 driven by the engine output shaft Ea is distributed to the dual clutch shaft 11 and the pump drive shaft 17.

In FIG. 7, a flow of power from the input shaft 10 to the pump drive shaft 17 by meshing of the gears 71 and 72 is indicated by an arrow R9.

The dual clutch shaft 11 is provided thereon with a first clutch C1 and a second clutch C2 serving as dual clutches. The first clutch C1 for setting forward odd-numbered speeds (i.e., first speed, third speed, and fifth speed) is provided on a rear portion of the dual clutch shaft 11. The second clutch C2 for setting forward traveling even speeds (that is, second speed and fourth speed) and reverse traveling is provided on a front portion of the dual clutch shaft 11 forward from the first clutch C1.

A multi-friction plate type hydraulic clutch unit is used as each of the first and second clutches C1 and C2. Each of the hydraulic clutch units is an assembly including a clutch case 61, a clutch gear, clutch plates (i.e., steel plates 62 and friction plates 63), a reception plate 64, a retaining ring 65, a piston 66, a spring 67, a centrifugal hydraulic pressure canceller (hereinafter simply referred to as "canceller") 68, and a lubricating fluid guide plate 68. The clutch case 61 is fixed onto the dual clutch shaft 11. The clutch gear is fitted on the dual clutch shaft 11 rotatably relative to the dual clutch shaft 11. The clutch plates (steel plates 62 and friction plates 63) are disposed in the clutch case 61 and interposed between the clutch case 61 and the clutch gear.

As understood from FIGS. 3 and 5, the clutch gear 22 for the first clutch C1 directly meshes with an intermediate gear 23 fixed on a portion of the odd-numbered speed drive gear shaft 12 close to the rear end of the odd-numbered speed drive gear shaft 12. Therefore, by engaging the first clutch C1, a rotational force of the dual clutch shaft 11 driven by the input shaft 10 via the gears 20 and 21 is transmitted to the odd-numbered speed drive gear shaft 12 via the gears 22 and 23.

In FIG. 7, a flow of power from the dual clutch shaft 11 to the odd-numbered speed drive gear shaft 12 by meshing of the gears 22 and 23 is indicated by an arrow R2.

Conversely, by disengaging the first clutch C1, the odd-numbered speed drive gear shaft 12 is isolated from the rotational force of the dual clutch shaft 11.

As shown in FIG. 5 and so on, a first speed (minimum speed) drive gear 24 is formed on an outer peripheral portion of the odd numbered speed drive gear shaft 12 immediately forward from the intermediate gear 23. A third speed drive gear 25 is fixed on a longitudinally intermediate portion of the odd-numbered speed drive gear shaft 12 forward from the first speed drive gear 24. A fifth speed (maximum speed) drive gear 26 is fitted on the odd numbered speed drive gear shaft 12 immediately forward from the third speed drive gear 25 so as to be rotatable relative to the odd numbered speed drive gear shaft 12.

A first speed driven gear 27 is fitted on a rear portion of the speed-change driven gear shaft 14 rotatably relative to the speed-change driven gear shaft 14 and directly meshes with the first speed drive gear 24. A third speed driven gear 28 is fitted on a portion of the speed-change driven gear shaft 14 forward from the first speed driven gear 27 so as to be rotatable relative to the speed-change driven gear shaft 14, and directly meshes with the third speed drive gear 25. A fifth speed (maximum speed) driven gear 29 is formed on an outer peripheral portion of the speed-change driven gear shaft 14 immediately forward from the third speed driven gear 28, and directly meshes with the first speed drive gear 26.

In this manner, forward odd-numbered speed gear trains, i.e., a first speed (minimum speed) gear train consisting of gears 24 and 27, a third speed gear train consisting of gears 25 and 28, and a fifth speed (maximum speed) gear train consisting of gears 26 and 29, are interposed parallel to one another between the odd-numbered speed drive gear shaft 12 and the speed-change driven gear shaft 14.

In FIG. 7, only the fifth speed gear train (gears 26 and 29) is shown as a representative of the first speed, the third speed, and the fifth speed gear trains.

As shown in FIGS. 3 and 5, a shifter 42 is fitted on the odd-numbered speed drive gear shaft 12 immediately forward from the fifth speed (maximum speed) drive gear 26 so as to be axially slidable and unrotatable relative to the odd-numbered speed drive gear shaft 12. By sliding the shifter 42 along the odd-numbered speed drive gear shaft 12, the shifter 42 is switched between two positions, i.e., a fifth speed setting position as its rearmost slide position and a neutral position as its foremost slide position.

When the shifter 42 is disposed at the fifth speed setting position, clutch teeth formed on a rear end of the shifter 42 mesh with clutch teeth formed on a front end of the fifth speed drive gear 26, and the fifth speed drive gear 26 relatively rotatably fitted on the odd-numbered speed drive gear shaft 12 is engaged with the odd-numbered speed drive gear shaft 12 via the shifter 42 so as to be unrotatable relative to the odd-numbered speed drive gear shaft 12.

Therefore, when the first clutch C1 is engaged, the power from the dual clutch shaft 11 received by the odd-numbered speed drive gear shaft 12 via the gears 22 and 23 is transmitted to the speed change driven gear shaft 14 via the fifth speed drive gear train (gears 26 and 29).

On the other hand, when the shifter 42 is disposed at the neutral position, the clutch teeth of the shifter 42 disengage from the clutch teeth of the fifth speed drive gear 26, and the rotational power of the odd numbered speed drive gear shaft 12 is not transmitted to the fifth speed gear train.

As shown in FIGS. 3, 5 and 6, a shifter 43 is fitted on the speed-change driven gear shaft 14 between the first-speed driven gear 27 and the third-speed driven gear 28 so as to be axially slidable and unrotatable relative to the speed-change driven gear shaft 14.

By sliding the shifter 43 along the speed-change driven gear shaft 14, the shifter 43 is shiftable among three positions, i.e., a first speed setting position at its rearmost slide position, a third speed setting position at its foremost slide position, and a neutral position between the first speed setting position and the third speed setting position.

When the shifter 43 is disposed at the first speed setting position, clutch teeth of the shifter 43 mesh with clutch teeth of the first speed driven gear 27, so that the first speed driven gear 27 is engaged with the speed-change driven gear shaft 14 via the shifter 43 so as to be unrotatable relative to the speed-change driven gear shaft 14, thereby allowing power to be transmitted therethrough.

When the shifter 43 is disposed at the third speed setting position, clutch teeth of the shifter 43 mesh with clutch teeth of the third speed driven gear 28, so that the third speed driven gear 28 is engaged with the speed-change driven gear shaft 14 so as to be unrotatable relative to the speed-change driven gear shaft 14, thereby allowing power to be transmitted therethrough.

When the shifter 43 is disposed at the neutral position, the shifter 43 disengages from both the first speed driven gear 27 and the third speed driven gear 28, so as not transmit power to the speed-change driven gear shaft 14.

A flow of power from the odd-numbered speed drive gear shaft 12 to the speed-change driven gear shaft 14 via any one of the above-described first, third and fifth speed gear trains is shown in FIG. 7 by an arrow R3.

On the other hand, as understood from FIGS. 3 and 6, the clutch gear 30 for the second clutch C2 directly meshes with the intermediate gear 31 fixed on a portion of the even-numbered speed drive gear shaft 13 close to the front end of the even-numbered speed drive gear shaft 13. Therefore, by engaging the second clutch C2, the rotational force of the dual clutch shaft 11 driven by the input shaft 10 is transmitted to the even-numbered speed drive gear shaft 13 via the gears 30 and 31.

In FIG. 7, a flow of power from the dual clutch shaft 11 to the even-numbered speed drive gear shaft 13 by meshing of the gears 30 and 31 is indicated by an arrow R4.

Conversely, by disconnecting the second clutch C2, the even-numbered speed drive gear shaft 13 is isolated from the rotational force of the dual clutch shaft 11.

As shown in FIG. 6 and so on, a second speed drive gear 32 is fixed on an outer peripheral portion of the even-numbered speed drive gear shaft 13 immediately rearward from the intermediate gear 31. A fourth speed drive gear 33 is fixed on the even-numbered speed drive gear shaft 13 rearward from the second speed drive gear 32. Further, a reverse drive gear 34 is fixed on a longitudinally intermediate portion of the even-numbered speed drive gear shaft 13 immediately rearward from the fourth speed drive gear 33.

As shown in FIGS. 3, 5, and 6, a second speed driven gear 35 is fitted on a front portion of the speed-change driven gear shaft 14 and directly meshes with the second speed drive gear 32. A fourth speed driven gear 36 is fitted on the speed-change driven gear shaft 14 rearward from the second speed driven gear 35 so as to be rotatable relative to the speed-change driven gear shaft 14, and directly meshes with the fourth speed drive gear 33. Incidentally, the fourth speed driven gear 29 formed on the speed-change driven gear shaft 14 immediately forward from the third speed driven gear 28 is disposed immediately rearward from the fourth speed driven gear 36.

In this manner, a second speed gear train consisting of the gears 32 and 35 and a fourth speed gear train consisting of the gears 33 and 36 are interposed parallel to each other between the even-numbered speed drive gear shaft 13 and the speed-change driven gear shaft 14.

In FIG. 7, neither the second speed gear train nor the fourth speed gear train is shown, however, a later-described reverse gear train (gears 34 and 39) interposed between the even-numbered speed drive gear shaft 13 and the output shaft 15 is illustrated.

As shown in FIGS. 3, 5, and 6, a shifter 44 is fitted on the speed-change driven gear shaft 14 between the second speed driven gear 35 and the fourth speed driven gear 36 so as to axially slidable and unrotatable relative to the speed-change driven gear shaft 14.

By sliding the shifter 44 along the speed-change driven gear shaft 14, the shifter 44 is shiftable a second speed setting portion as its foremost slide position, a fourth speed setting position as a rearmost slide position, and a neutral position between the second speed setting position and the fourth speed setting position.

When the shifter 44 is disposed at the second speed setting position, clutch teeth of the shifter 43 mesh with clutch teeth of the second speed driven gear 35, so that the second speed driven gear 35 is engaged with the speed-change driven gear shaft 14 via the shifter 44 so as to be unrotatable relative to the speed-change driven gear shaft 14, thereby allowing power to be transmitted therethrough.

When the shifter 44 is disposed at the fourth speed setting position, clutch teeth of the shifter 44 mesh with clutch teeth of the fourth speed driven gear 36, so that the fourth speed driven gear 36 is engaged with the speed-change driven gear shaft 14 so as to be unrotatable relative to the speed-change driven gear shaft 14, thereby allowing power to be transmitted therethrough.

When the shifter 44 is disposed at the neutral position, the shifter 44 is disengaged from both the second speed driven gear 35 and the fourth speed driven gear 36, so as not to transmit power to the speed-change driven gear shaft 14.

A flow of power from the even-numbered speed drive gear shaft 13 to the speed-change driven gear shaft 14 via either the second speed gear train or the fourth speed gear train is indicated by an arrow R5 in FIG. 7.

As shown in FIGS. 3, 5, 6, and so on, a gear 37 is fixed on the speed change driven gear shaft 14 along the rear end of the speed-change gear chamber 2a, and a gear 38 is fixed on the output shaft 15 and directly meshes with the gear 37.

When the speed change driven gear shaft 14 is driven, the gears 37 and 38 transmit the rotational force of the speed-change driven gear shaft 14 to the output shaft 15 so as to rotate the output shaft 15 in a direction to forwardly rotate the differential yoke shafts 19L and 19R. In other words, the gears 37 and 38 constitute a forward gear train for transmitting the forward-traveling drive force to the output shaft 15.

When the first clutch C1 is engaged, the speed-change driven gear shaft 14 is driven by receiving the rotational force from the dual clutch shaft 11 via the odd-numbered speed drive gear shaft 12 and any one of the first, third and fifth speed gear trains. On the other hand, when the second clutch C2 is engaged, the speed-change driven gear shaft 14 is driven by receiving the rotational force from the dual clutch shaft 11 via the even-numbered speed drive gear shaft 13 and either the second or fourth speed gear train.

In FIG. 7, a flow of a vehicle forward traveling drive power from the speed-change driven gear shaft 14 to the output shaft 15 via the forward gear train (gears 37 and 38) is indicated by an arrow R6.

On the other hand, as shown in FIGS. 3, 5, and 6, a reverse driven gear 39 is fitted on a longitudinally intermediate portion of the output shaft 15 rotatably relative to the output shaft 15, and directly meshes with the above-mentioned reverse drive shaft 34 fixed on the even-numbered speed drive gear shaft 13.

Therefore, the power can be transmitted from the even-numbered speed drive gear shaft 13 to the output shaft 15 via the gears 34 and 39 serving as the reverse gear train without via the speed-change driven gear shaft 14.

In FIG. 7, a flow of power from the even-numbered speed drive gear shaft 13 to the output shaft 15 via the reverse gear train (gears 34 and 39) is indicated by an arrow R7.

As understood from FIGS. 3, 5 and 6, a shifter 45 is fitted on the output shaft 15 immediately rearward from the reverse driven gear 39 so as to be axially slidable and unrotatable relative to the output shaft 15. By sliding the shifter 45 along the output shaft 15, the shifter 45 is shiftable between two positions, i.e., a neutral position as its rearmost slide position and a reverse-travel setting position.

When the shifter 45 is disposed at the neutral position, clutch teeth of the shifter 45 are disengaged from clutch teeth formed on a rear end of the reverse driven gear 39. Therefore, even when the rotational power is transmitted from the dual clutch shaft 11 to the even-numbered speed drive gear shaft 13 via the gears 30 and 31, the rotational force of the even-numbered speed drive gear shaft 13 is not transmitted to the output shaft 15 via the reverse gear train.

On the other hand, when the shifter 45 is disposed at the reverse setting position, the clutch teeth of the reverse driven gear 39 mesh with the clutch teeth of the reverse driven gear 39 so that the reverse driven gear 39 fitted on the output shaft 15 rotatably relative to the output shaft 15 is engaged with the output shaft 15 via the shifter 45 so as to be unrotatable relative to the output shaft 15.

As a result, when the second clutch C2 is engaged, the power from the dual clutch shaft 11 received by the even-numbered speed drive gear shaft 13 via the gears 30 and 31 is outputted to the output shaft 15 via the reverse gear train (gears 34 and 39).

Therefore, by engaging the second clutch C2 and placing the shifter 44 at the reverse-travel setting position (to clutch-engage with the reverse driven gear 39), the rotational force of the dual clutch shaft 11 is transmitted to the output shaft 15 via the gears 30 and 31, the even-numbered speed drive gear shaft 13 and the gears 34 and 39 serving as the reverse gear train, so that the output shaft 15 rotates in the direction to reversely rotate the differential yoke shafts 19L and 19R.

Incidentally, when the shifter 45 is disposed at the reverse-travel setting position, the forward-traveling even-numbered speed setting shifter 44 is set at the neutral position, and the first clutch C1 is disengaged so as to prevent the speed-change driven gear shaft 14 from rotating, thereby preventing power from being transmitted to the output shaft 15.

In this way, the output shaft 15 is rotated in the forward-traveling direction when receiving power via the gears 37 and 38 serving as the forward gear train (see the arrow R6 in FIG. 7), and is rotated in the reverse-traveling direction when receiving power via the gears 34 and 39 serving as the reverse gear train (see the arrow R7 in FIG. 7). The rotational force of the output shaft 15 is distributed to the front-wheel driving PTO shaft 16 disposed in the speed-change gear chamber 2a and the reduction intermediate shaft 18 of the rear-wheel driving reduction mechanism 7 in the speed-reduction/differential gear chamber 2b.

As shown in FIGS. 3 and 5, in the speed-change gear chamber 2a, the longitudinally extended PTO shaft 16 for driving the front wheels is journalled by bearings 16a and 16b in a shaft hole 4e formed in the front wall portion of the front cover 4. A gear 41 is fixed on a rear end of the PTO shaft 16. A gear 40 is fixed on the output shaft 15 and meshes with the gear 41 forward from the reverse driven gear 39, thereby transmitting power from the output shaft 15 to the front-wheel driving PTO shaft 16 parallel to the output shaft 15.

In FIG. 7, a flow of power from the output shaft 15 to the front-wheel driving PTO shaft 16 via the gears 40 and 41 is indicated by an arrow R8.

On the other hand, as shown in FIGS. 3, 5, and 6, the output shaft 15 penetrates the partition wall 3c through a shaft hole 3h formed in the partition wall 3c, and the rear end of the output shaft 15 is disposed in the speed-reduction/differential gear chamber 2b rearward from the partition wall 3c.

As shown in FIGS. 5, 6, and 8, a bevel gear 90 is formed on a rear end portion of the output shaft 15 so as to serve as an output member of the multi-speed transmission mechanism 6.

The speed-reduction mechanism 7 and the differential mechanism 8 configured in the speed-reduction/differential gear chamber 2b will be described with reference to FIGS. 3, 5, 6, and 8.

In the speed-reduction/differential gear chamber 2b, a left portion of the laterally extended speed-reduction intermediate shaft 18 is journalled by the second housing part 3b of the main housing 3 via a bearing 18a, and a right end portion of the speed-reduction intermediate shaft 18 is journaled by the rear side cover 5 via a bearing 18b.

A bevel gear 91 is formed on a left end portion of the speed-reduction intermediate shaft 18. The bevel gears 90 and 91 mesh with each other so as to transmit power from the output shaft 15 to the speed-reduction intermediate shaft 18 perpendicular to the output shaft 15.

An intermediate gear 92 is formed on a right portion of the speed-reduction intermediate shaft 18. A bull gear 93 serving as an input gear of the differential mechanism 8, which is accommodated together with the speed-reduction mechanism 7 in the speed-reduction/differential gear chamber 2b, meshes with the intermediate gear 92.

The bevel gear 91 is larger in diameter than the bevel gear 90, and the bull gear 93 is larger in diameter than the intermediate gear 92, so that the gears 90, 91, 92 and 93 serve as a speed-reduction gear train from the output shaft 15 to the differential mechanism 8.

Here, instead of the speed-reduction intermediate shaft 18, it may be conceivable that a bevel gear is used as the bull gear 93 of the differential mechanism 8 to directly mesh with the bevel gear 90 on the rear end of the output shaft 15 of the multi-speed transmission mechanism 6, and only the gears 90 and 93 constitute a speed reduction gear train from the output shaft 15 to the differential mechanism 8. However, in this case, it is necessary to increase the diameter of the bull gear 93 in order to secure a sufficient speed-reduction gear ratio, and the rear portion of the transaxle casing 2 accommodating the differential mechanism 8 is also expanded in the radial direction of the bull gear 93 (i.e., the radial direction of the differential yoke shafts 19L and 19R).

In this respect, in the speed-reduction mechanism 7 of the transaxle 1, by providing the speed-reduction intermediate shaft 18, a first speed-reduction gear train consisting of the bevel gears 90 and 91 and a second speed-reduction gear train consisting of the gear 92 and the bull gear 93 ensures a required speed reduction ratio of the differential mechanism 8 to the output shaft 15. Therefore, the speed-reduction ratio of the first speed-reduction gear train keeps the small speed-reduction ratio of the second speed-reduction gear train so as to keep the small diameter of the bull gear 93. Therefore, the rear portion of the transaxle casing 2 accommodating the differential mechanism 8 can also be made compact without expanding in the radial direction of the differential yoke shafts 19L and 19R (the bull gear 93).

Further, it may be conceivable that the speed-reduction intermediate shaft is extended longitudinally so as to be drivingly connected to the output shaft 15 of the multi-speed transmission mechanism 6 via spur gears and so as to be drivingly connected to the differential mechanism 8 via bevel gears. However, in this case, the axial length of the speed-reduction intermediate shaft is increased to longitudinally expand the transaxle.

In this respect, in this embodiment, the speed-reduction intermediate shaft 18 is extended laterally parallel to the pair of the differential yoke shafts 19L and 19R, thereby ensuring longitudinal compactness of the transaxle 1.

The differential mechanism 8, including the bull gear 93, is a typical bevel gear type differential gear mechanism, including a differential case 94 fixed to the bull gear 93, at least one differential pinion 95 pivotally supported in the differential case 94, and left and right differential side gears 96L and 96R fixed on the respective differential yoke shafts 19L and 19R.

The left and right differential yoke shafts 19L and 19R are disposed coaxially to each other and parallel to the speed-reduction intermediate shaft 18. Left and right end portions of the differential case 94 are fitted to the outer peripheral surfaces of the left and right differential yoke shafts 19L and 19R.

As shown in FIG. 8, the left differential yoke shaft 19L is inserted through the shaft hole 3r formed in the rear portion of the second housing part 3b of the main housing 3, and is journalled by the second housing part 3b of the main housing 3 via a left end portion of the differential case 94 and a bearing 94a. On the other hand, the right differential yoke shaft 19R is inserted through the shaft hole 5c formed in the rear side cover 5 and journalled by the rear side cover 5 via a right end portion of the differential case 94 and a bearing 94b.

In the differential case 94, the at least one differential pinion 95, which is a bevel gear having a pivot perpendicular to the axes of the differential yoke shafts 19L and 19R, is disposed between a proximal end of the left differential yoke shaft 19L and a proximal end of the right differential yoke shaft 19R.

In the differential case 94, bevel gears serving as the left and right differential side gears 96L and 96R are spline-fitted on the respective proximal ends of the left and right differential yoke shafts 19L and 19R, and the left and right differential side gears 96L and 96R mesh with the at least one differential pinion 95 arranged therebetween.

The second phantom plane S2 along the mutually joined surfaces of the flange-shaped peripheral edge portion 3f of the second housing part 3b of the main housing 3 and the flange-shaped peripheral edge portion 5a of the rear side cover 5 is perpendicular to the laterally extended left and right differential yoke shafts 19 L and 19 R. More specifically, in the present embodiment, the second phantom plane S2 intersects the right differential yoke axis 19R.

A layout of the shafts of the multi-speed transmission mechanism 6 in the speed-change gear chamber 2a and the shafts of the speed-reduction mechanism 7 and the differential mechanism 8 in the speed-reduction/differential gear chamber, especially, their vertically positional relationship, will be described with reference to FIGS. 7, 8 and so on.

In FIG. 7, the axes 10x, 11x, 12x, 13x, 14x, 15x, 16x and 17x of the respective shafts 10, 11, 12, 13, 14, 15, 16, 17 (including the transmission shafts of the multi-speed transmission mechanism 6) in the speed-change gear chamber 2a are illustrated to indicate positions of the respective shafts.

As shown in FIG. 7, in the speed-change gear chamber 2a, as seen in the longitudinal direction, i.e., the axial direction of the transmission shafts of the multi-speed transmission mechanism 6, these transmission shafts are arranged in two upper and lower rows, and in each of the upper and lower rows, they are laterally juxtaposed.

Here, the axis 10x of the input shaft 10 is limited in its vertical position because it needs to be disposed coaxially to the engine output shaft Ea. The axis 10x is located at a height H1 that is a vertically middle position in the speed-change gear chamber 2a.

On the other hand, later-described hydraulic clutch units (see FIG. 6) are used as the first clutch C1 and the second clutch C2 on the dual clutch shaft 11. Regarding the supply of hydraulic fluid as described above, fine engagement Since the control of the pressure is required, the electromagnetic proportional valves V1 and V2 are used for hydraulic fluid supply to the first and second clutches C1 and C2 because the hydraulic clutch units require fine hydraulic pressure control.

These electromagnetic proportional valves V1 and V2 are desired to be arranged in the vicinity of the first and second clutches C1 and C2 as their control targets. On the other hand, if the electromagnetic proportional valves V1 and V2 are located lower than the input shaft 10 disposed at the above-mentioned considerably low position, their solenoid coils may be exposed to muddy water.

Therefore, as shown in FIG. 7, in the speed-change gear chamber 2a, the axis 11x of the dual clutch shaft 11 is disposed at a height H2 higher than the above-mentioned height H1, so that the dual clutch shaft 11 is disposed at an upper side of the input shaft 10.

As understood from FIGS. 4, 7, and so on, the electromagnetic proportional valve V1 for controlling the hydraulic fluid supply to the first clutch C1 and the electromagnetic proportional valve V2 for controlling the hydraulic fluid supply to the second clutch C2 are mounted on an upper portion of the right side surface 3a2 of the first housing part 3a of the main housing 3 immediately rightward from the dual clutch shaft 11, so that their solenoids protrude rightwardly outward from the upper portion of the right side surface 3a2.

In this regard, the electromagnetic proportional valves V1 and V2 are arranged at a high position such as the upper portion of the right side surface 3a2 so as to reduce possibility of their solenoid coils exposed to muddy water. On the other hand, the dual clutch shaft 11 is disposed at a desirable height for the electromagnetic proportional valves V1 and V2.

In a vertical middle portion of the speed-change gear chamber 2a, the input shaft 10, the odd-numbered speed drive gear shaft 12, and the speed-change driven gear shaft 14 are juxtaposed in a lateral row so that the odd-numbered speed drive gear shaft 12 is disposed between the input shaft 10 and the speed-change driven gear shaft 14.

Further, in the vertical middle portion of the speed-change gear chamber 2a, the pump drive shaft 17 is disposed laterally opposite the odd-numbered speed drive shaft 12 with respect to the input shaft 10, i.e., rightward from the input shaft 10. Also, in the vertical middle portion of the speed-change gear chamber 2a, the front-wheel driving PTO shaft 16 is disposed laterally opposite the odd-numbered speed drive shaft 12 with respect to the speed-change driven gear shaft 14, i.e., leftward from the speed change driven gear shaft 14.

In this way, in the vertical middle portion of the speed-change gear chamber 2a, the axes 17x, 12x, 14x and 16x are arranged at substantially the same height as the height H1 of the axis 10x of the input shaft 10.

On the other hand, in an upper portion of the speed-change gear chamber 2a, the dual clutch shaft 11, the even-numbered speed drive gear shaft 13, and the output shaft 15 are juxtaposed in a lateral row so that the even-numbered speed drive gear shaft 13 is disposed between the dual clutch shaft 11 and the output shaft 15.

In this way, in the upper portion of the speed-change gear chamber 2a, the axes 13x and 15x are arranged at substantially the same height as the height H2 of the axis 11x of the dual clutch shaft 11.

In this manner, in the speed change gear chamber 2a, the transmission shafts of the multi-speed transmission mechanism 6 and the relevant transmission shafts have their respective axes distributed in the upper row of the height H1 and the lower row of the height H2. There is no transmission shaft greatly higher than the height H1 or greatly lower than the height H2. Therefore, the speed-change gear chamber 2a incorporating these shafts and gears and clutches on these shafts is prevented from expanding in its vertical width, thereby ensuring the required vertical compactness of the transaxle casing 2 of the transaxle 1.

The dual clutch shaft 11 is drivingly connected to the adjacent odd-numbered speed drive gear shaft 12 via the gears 22 and 23, and is drivingly connected to the adjacent even-numbered drive gear shaft 13 via the gears 30 and 31 provided parallel to the gears 22 and 23. In this situation, the odd-numbered speed drive gear shaft 12 is located below the dual clutch shaft 11, and the even-numbered speed drive gear shaft 13 is located laterally sideward (rightward in FIG. 7) from the dual clutch shaft 11 and substantially at the same height (H2) as the dual clutch shaft 11.

In addition, the speed-change driven gear shaft 14 is drivingly connected to the adjacent odd-numbered speed drive gear shaft 12 via the odd-numbered speed gear train (only the representative fifth speed gear train (the gears 26 and 29) is shown in FIG. 7), and is drivingly connected to the adjacent even-numbered speed drive gear shaft 13 via the even-numbered speed gear train (not shown in FIG. 7) provided parallel to the odd-numbered speed gear train. In this situation, the odd-numbered speed drive gear shaft 12 is disposed laterally sideward (leftward in FIG. 7) from the speed-change driven gear shaft 14 at substantially the same height (H1), and the even-numbered speed drive gear shaft 13 is disposed above the speed-change driven gear shaft 14.

Further, the output shaft 15 is drivingly connected to the adjacent speed-change driven gear shaft 14 via the forward gear train (the gears 37 and 38), and is drivingly connected to the adjacent even-numbered speed drive gear shaft 13 via the reverse gear train (the gears 34 and 39) arranged parallel to the forward gear train (the gears 37 and 38). In this situation, the even-numbered speed drive gear shaft 13 is disposed laterally sideward (leftward in FIG. 7) from the output shaft 15 and at substantially the same height (H2) as the output shaft 15, and the speed-change driven gear shaft 14 is disposed below the even-numbered speed drive gear shaft 13 and laterally slantwise downward (leftwardly downward in FIG. 7) from the output shaft 15.

As described above, in the case where one transmission shaft is drivingly connected to two adjacent transmission shafts via respective gear trains parallel to each other, one of the two adjacent transmission shafts is arranged laterally sidewise from the one transmission shaft and at substantially the same height as the one transmission shaft, and the other of the two adjacent transmission shafts is arranged upward or downward (at a different height) from the one transmission. Therefore, the speed-change gear chamber 2a incorporating these shafts and gears and clutches on these shafts is prevented from expanding in its vertical width as described above, and from expanding in its lateral width, thereby ensuring the required vertical and lateral compactness of the transaxle casing 2 of the transaxle 1.

The axis 16x of the front-wheel driving PTO shaft 16 drivingly connected to the output shaft 15 via the gears 40 and 41 is disposed in an effective space ensured in the portion of the speed-change gear chamber 2a having the height H2 for arranging the axes of the transmission shafts 10, 12 and 14 below the output shaft 15. Therefore, the gear 41 on the front-wheel driving PTO shaft 16 does not greatly deviate laterally outward from outer peripheral edges of the gears 38 and 39 on the output shaft 15 thereabove. This arrangement of the front-wheel driving PTO shaft 16 also prevents the speed-change gear chamber 2a from expanding in its lateral width, thereby ensuring the required lateral compactness of the transaxle casing 2.

In addition, although the input shaft 10 and the odd-numbered speed drive gear shaft 12 are juxtaposed in a lateral row at substantially the same height H1, they are not drivingly connected to each other via gears. However, as described above, the gear 20 on the input shaft 10 is disposed in the vicinity of the front end of the speed-change gear chamber 2a, while the gear 23 on the odd-numbered speed drive gear shaft 12 and the odd-numbered speed (first speed, third speed, and fifth speed) drive gears 24, 25 and 26 (only the fifth speed drive gear 26 is representatively shown in FIG. 7) are disposed at the rear part of the speed-change gear chamber 2a.

In this way, the gears on the left and right adjacent shafts 10 and 12 are distributed front and rear so that the gear on the shaft 10 is disposed forward or rearward from the gear on the other shaft 12. When viewed in the axial direction, a part (right part in FIG. 7) of the gear 20 and a part (left part in FIG. 7) of the odd-numbered speed drive gear overlap in the longitudinal (front-rear) direction.

As a result, a distance between the axis 10x of the input shaft 10 and the axis 12x of the odd-numbered speed drive gear shaft 12 arranged side by side is reduced. This arrangement of the shafts 10 and 12 also prevents the speed-change gear chamber 2a from expanding in its lateral width, thereby ensuring the required lateral compactness of the transaxle casing 2.

As described above, the upper and lower heights H1 and H2 are set for arrangement of the axes of the transmission shafts, and the speed-change gear chamber 2a is set to have a sufficient vertical width for ensuring the upper and lower heights H1 and H2. Therefore, the speed-reduction/differential gear chamber 2b can have a margin space in its vertical width such as to be involved in the vertical width of the speed-change gear chamber 2a.

As shown in FIG. 8, the margin space of the speed-reduction/differential gear chamber 2b in its vertical width is utilized to locate the speed-reduction intermediate shaft 18 constituting the speed-reduction mechanism 7 at a position higher than the differential yoke shafts 19L and 19R, more specifically, above the differential mechanism 8.

Therefore, the speed-reduction mechanism 7 and the differential mechanism 8 overlap each other vertically so as to prevent the speed-reduction/differential gear chamber 2b accommodating these mechanism 7 and 8 from expanding in its longitudinal width, i.e., so as to prevent the second housing part 3b of the main housing 3 rearward from the partition wall 3c from expanding rearward, thereby ensuring the required longitudinal compactness of the transaxle casing 2.

Incidentally, in the present embodiment, as shown in FIG. 4, the speed-reduction intermediate shaft 18 is disposed forwardly upward slantwise from the differential mechanism 8. Furthermore, if the margin of the vertical width of the speed-reduction/differential gear chamber 2b is sufficient, the speed-reduction intermediate shaft 18 can be disposed directly above the differential mechanism 8 so that the axis of the speed-reduction intermediate shaft 18 and the differential mechanism 8 are aligned vertically on a vertical line, thereby minimizing the longitudinal width of the speed-reduction/differential gear chamber 2b, i.e., the longitudinal width of the second housing part 3b of the main housing 3.

The shifter control mechanism 9 for sliding the shifters 42, 43, 44, and 45 will now be described with reference to FIGS. 7, 9, 10, and so on.

Although not shown in FIGS. 3 to 6, a longitudinally extended fork drum shaft 51 and a longitudinally extended fork sliding guide shafts 52, 53, 54 (collectively referred to as fork shafts 51, 52, 53 and 54) are disposed in the speed-change gear chamber 2a.

The shifter control mechanism 9 is an assembly including the fork shafts 51, 52, 53 and 54, a drum 51a, forks 46, 47, 48 and 49, an electric actuator 55, gears 56 and 57, and a rotational position sensor 58.

As understood from FIG. 7, the fork shafts 51, 52 and 53 are disposed in a lower portion of the speed-change gear chamber 2a (lower than the above-mentioned height H1).

Here, as described above, the front-wheel driving PTO shaft 16 has its axis 16x disposed at substantially the same height H1 as the axis 12x of the odd-numbered speed drive gear shaft 12 and the axis 14x of the speed-change driven gear shaft 14 and is juxtaposed in the lateral row with these shafts 12 and 14. Although the axis 16x is as high as the axes 12x and 14x, a lower end of the diametrically large gear 41 on the front-wheel driving PTO shaft 16 protrudes downward from a lower end of the driven gear having the maximum diameter (corresponding to the first speed driven gear 27 that is not shown in FIG. 7) on the speed-change driven gear shaft 14.

Due to the difference in height between the lower end portions of these gears 27 and 41, a dead space is created below the speed-change driven gear shaft 14 and the driven gear on the speed-change driven gear shaft 14. The fork drum shaft 51 and the left and right fork sliding guide shafts 52 and 53 disposed close to the fork drum shaft 51 are disposed in this dead space in the lower portion of the speed-change gear chamber 2a.

Further, the fork sliding guide shaft 54 is disposed at a height (between the heights H1 and H2) in the speed-change gear chamber 2a slightly higher than the vertical middle portion of the speed-change gear chamber 2a.

Here, the gear 41 on the front-wheel driving PTO shaft 16 and the gears 38 and 39 on the output shaft 15 above the front-wheel driving PTO shaft 16 are offset in the longitudinal direction. Therefore, when viewed in the longitudinal direction, as shown in FIG. 7, lower portions of the gears 38 and 39 and an upper portion of the gear 41 overlap so as to have a dead space at left and right adjacent sides of these overlapping portions. This dead space is used to have the fork sliding guide shaft 54 therein.

Figure 9:
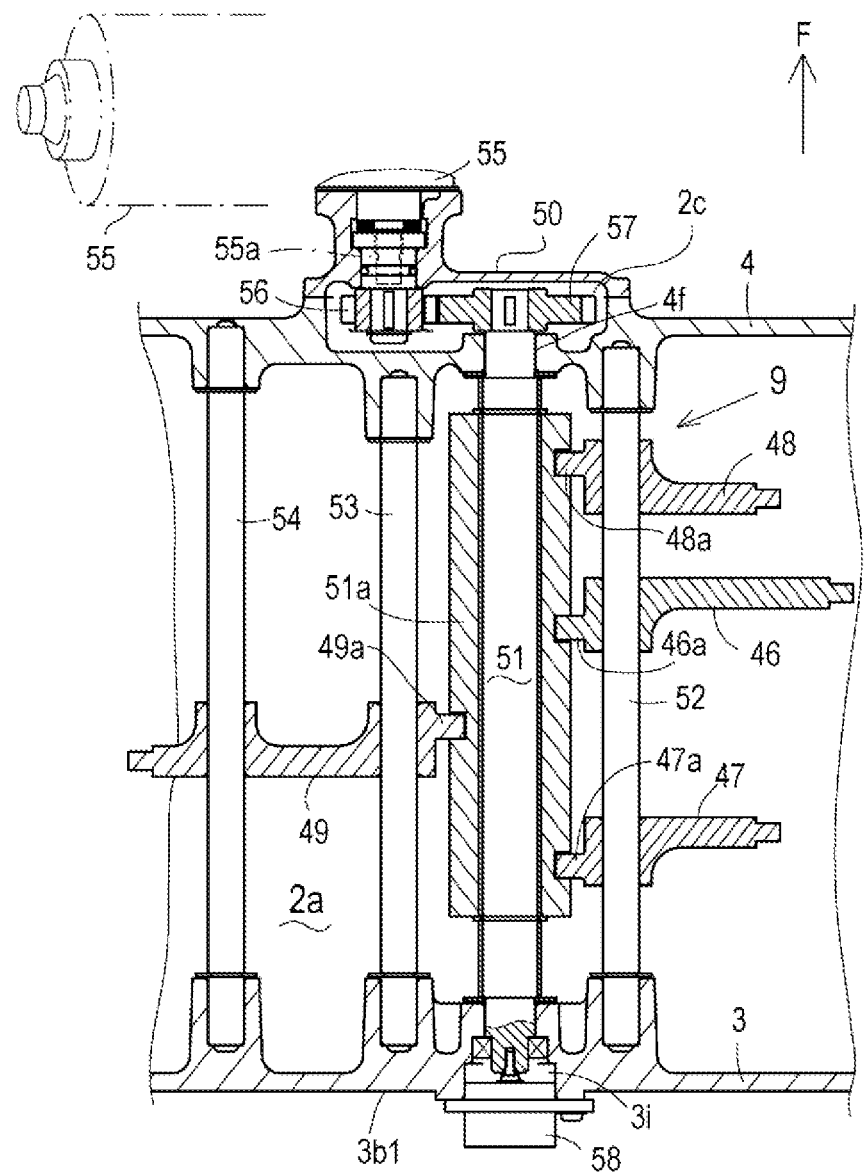
FIG. 9 is a fragmentary development cross-sectional plan view of the transaxle 1, showing a shifter control mechanism 9 of the multi-speed transmission mechanism 6.

As shown in FIG. 9, the fork drum shaft 51 and the fork sliding guide shafts 52, 53 and 54 are supported at front ends thereof by the front wall portion of the front cover 4. A cover 50 is attached to the front end wall of the front cover 4, whereby a gear chamber 2c surrounded by the front end wall of the front cover 4 and the cover 50 is formed. A front end portion of the fork drum shaft 51 penetrating the front end wall of the front cover 4 is disposed in the gear chamber 2c so as to have a gear 57 fixed thereon.

The rotary electric actuator 55 is mounted in front of the cover 50. An output spindle shaft 55a of the electric actuator 55 extends rearward so that its rear end is disposed in the gear chamber 2c and so as to have the gear 56 fixed thereon. The gears 56 and 57 mesh with each other so that the fork drum shaft 51 is rotated by the electric actuator 55 via the gears 56 and 57.

The fork drum shaft 51 and the fork sliding guide shafts 52, 53 and 54 are supported at rear ends thereof by the laterally extended vertical wall portion of the main housing 3 having the first stepped surface 3a1 (hereinafter, this wall portion is referred to as "wall portion 3a1"). The wall portion 3a1 is formed therethrough with a longitudinally extended shaft hole 3i. The rear end portion of the fork drum shaft 51 is passed through the shaft hole 3i, and is journalled via a bearing in the shaft hole 3i.

Further, the rotational position sensor (potentiometer) 58 is attached to a rear surface of the wall portion 3a1 of the main housing 3. The rear end portion of the fork drum shaft 51 passed through the shaft hole 3*i* protrudes rearward from the wall portion 3*a*1 of the main housing 3, and is fitted into the rotation position sensor 58. A harness 58*a* extends from the rotational position sensor 58 to a controller (not shown).

In this manner, the rotational position sensor 58 detects the rotational position (rotational angle) of the fork drum shaft 51, and transmits a detection signal as a feedback signal to a controller which controls the on-off state and rotational direction of an electric motor attached to the electric actuator 55.

In the speed-change gear chamber 2*a*, the drum 51*a* is provided around the fork drum shaft 51. The drum 51*a* is formed on an outer peripheral surface thereof with spiral grooves into which respective engaging pins 46*a*, 47*a*, 48*a* and 49*a* formed on basal end portions of the respective forks 46, 47, 48 and 49 are fitted.

The fork sliding guide shaft 52 is disposed at one of left and right sides (left side in FIG. 7) of the fork drum shaft 51 and is extended along the fork drum shaft 51. The basal ends of the forks 46, 47 and 48 are axially (longitudinally) slidably fitted on the fork sliding guide shaft 52.

A bifurcated semicircular fork claw is formed at a tip portion of each of the forks 46, 47, 48 and 49. The fork 46 is fitted to the forward-travel fifth speed selection shifter 42. The fork 47 is fitted to the forward-travel first/third speed selection shifter 43. The fork 48 is fitted to the forward-travel second/fourth speed selection shifter 44.

The fork 49 is axially (longitudinally) slidably fitted at a basal end portion thereof on the fork sliding guide shaft 53 disposed at the other of left and right adjacent sides (right side in FIG. 7) of the fork drum shaft 51, and at an intermediate portion thereof on the fork sliding guide shaft 54. The fork 49 is fitted to the reverse-travel selection shifter 45.

The UTV 100 is provided with a gearshift operation device (not shown), such as a pedal or a lever, and a controller. Based on an operation position of the operation device, the controller sends a command signal concerning the rotation amount and the rotation direction of the output spindle shaft 55*a* to the electric actuator 55.

Based on this command signal, the output spindle shaft 55*a* of the electric actuator 55 is driven so as to rotate the fork drum shaft 51 and the drum 51*a* via the gears 56 and 57, and so as to slide the forks 46, 47, 48 and 49 along the fork sliding guide shafts 52, 53 and 54, thereby controlling positions of the shifters 42, 43, 44 and 45.

Gearshift patterns of the multi-speed transmission mechanism 6 based on the on-off control of the first clutch C1 and the second clutch C2 serving as dual clutches and the position control of the shifters 42, 43, 44 and 45 will be described.

The multi-speed transmission mechanism 6, configured as a dual clutch gear transmission mechanism, is advantageous in its smooth forward-traveling speed shift because each of the friction plate type hydraulic clutch units serving as the first and second clutches C1 and C2 can be set in a half-clutch state by controlling a hydraulic pressure as its clutch-engagement pressure, and because the respective forward-travel speed gear trains are divided into the odd-numbered (first, third and fifth) speed gear trains for power transmission during engagement of the first clutch C1 and the even-numbered (second and fourth) speed gear trains for power transmission during engagement of the second clutch C2.

For example, in a state where the shifter 43 is engaged with the first speed driven gear 27, and simultaneously, the shifter 43 is engaged with the second speed driven gear 35 (the other shifters 42, 44 and 45 are disposed at their neutral positions), by engaging the first clutch C1 and disengaging the second clutch C2, the speed-change driven gear shaft 14 is driven via the gears 24 and 27 of the first speed gear train so as to have a rotational speed set at the first speed, and by engaging the second clutch C2 and disengaging the first clutch C1, the speed-change driven gear shaft 14 is driven via the gears 32 and 35 of the second speed gear train so as to have a rotational speed set at the second speed.

Therefore, when shifting up the rotational speed of the speed-change driven gear shaft 14 from the first speed to the second speed, the clutch-engagement pressure of the first clutch C1 is gradually decreased, while the clutch-engagement pressure of the second clutch C2 is gradually increased, so that on the midway of the shift-up process, both the first clutch C1 and the second clutch C2 are in the half-clutch states so as to smoothen the change of rotational speed of the speed-change driven gear shaft 14 in the shift-up process, thereby reducing a shock in the gearshift process.

Here, a configuration of the multi-friction plate type hydraulic clutch unit used as each of the first and second clutches C1 and C2 will be described in detail with reference to FIG. 6 and so on.

The hydraulic clutch unit has a clutch case 61 formed integrally with a central boss portion 61*a*, which is fixed on an outer peripheral surface of the dual clutch shaft 11, and an outer peripheral portion 61*b* surrounding the central boss portion 61*a*.

A space between the central boss portion 61*a* and the outer peripheral portion 61*b* in each clutch case 61 is referred to as an internal space of the clutch case 61. Hereinafter, the axial (longitudinal) direction of the dual clutch shaft 11 approaching the clutch gear 22 or 30 is defined as "outward", and the axial direction of the dual clutch shaft 11 opposite the clutch gear 22 or 30 is defined as "inward". The above-mentioned definition of "outward" and "inward" is limited to the following description of the configuration of the hydraulic clutch unit serving as each of the first and second clutches C1 and C2, such as description of layout of components in the inside space of the clutch case 61.

Each of the clutch gears 22 and 30 is formed with a sleeve portion 22*a* or 30*a* extended axially inward so that each of the sleeve portions 22*a* and 30*a* is disposed in the inner space of the clutch case 61.

In the inner space of each clutch case 61, the plurality of steel plates 62 are aligned in the longitudinal direction and are fitted at inner peripheral edges thereof to the sleeve portion 22*a* or 30*a* of each of the clutch gears 22 and 30 so as to be unrotatable relative to the sleeve portion 22*a* or 30*a* and axially (longitudinally) slidable. The plurality of friction plates 63 are aligned in the longitudinal direction and are fitted at outer peripheral edges thereof to the outer peripheral portion 61*b* of the clutch case 61 around the inner space of the clutch case 61.

The steel plate 62 and the friction plate 63 are aligned alternately in the longitudinal direction, and these are referred to as clutch plates 62 and 63. The reception plate 64 is arranged adjacent to the outermost clutch plate of the clutch plates 62 and 63 and is engaged with the outer peripheral portion 61*b* of the clutch case 61 unrotatably relative to the clutch case 61. The retaining ring 65 retains the reception plate 64 so as to prevent the reception plate 64 from moving in the axial direction.

In the inner space of the clutch case 61, a piston 66 is disposed inward from the clutch plates 62 and 63 so as to be axially (longitudinally) slidable along the central boss portion 61a. A portion of the internal space of the clutch case 61 further inward from the piston 66 (forward from the piston 66 in the first clutch C1 or rearward from the piston 66 in the second clutch C2) is defined as a hydraulic fluid chamber 60.

The central boss portion 61a of the clutch case 61 is bored therethrough by a fluid hole 61c between an inner peripheral surface thereof and an outer peripheral surface thereof. At the outer peripheral surface of the central boss portion 61a, an end of the fluid hole 61c is constantly open to the portion of the inner space of the clutch case 61 defined as the hydraulic fluid chamber 60. At the inner peripheral surface of the central boss portion 61a, another end of the fluid hole 61c is open so as to be connected to a later-described hydraulic fluid passage (hole) in the dual clutch shaft 11.

The hydraulic pump unit 70 for supplying hydraulic fluid to the hydraulic fluid chamber 60 is disposed in the speed-change gear chamber 2a of the transaxle casing 2. The electromagnetic proportional valves V1 and V2 for controlling supply and discharge of fluid to and from the hydraulic fluid chambers 60 of the respective first and second clutches C1 and C2 are fitted into a sidewall of the transaxle casing 2 (more specifically, the main housing 3).

Fluid passages are formed in walls of the transaxle casing 2 (main housing 3). These fluid passages are provided for supplying fluid delivered from the hydraulic pump unit 70 to the hydraulic fluid chambers 60 of the respective first and second clutches C1 and C2, and for supplying lubricating fluid to the first and second clutches C1 and C2 and the shifters 42, 43, 44 and 45 and so on. The structure of the fluid passages in the walls of the main housing 3 will be described in detail later.

On the other hand, as understood from FIG. 6, 10 and so on, the dual clutch shaft 11 is bored therein with axially extended fluid holes 11d, 11h and 11k parallel to each other. The axial fluid hole 11d is a hydraulic fluid supply hole fluidly connected to the hydraulic fluid chamber 60 of the first clutch C1. The axial fluid hole 11h is a hydraulic fluid supply hole fluidly connected to the hydraulic fluid chamber 60 of the second clutch C2. The axial fluid hole 11k is a lubricating fluid supply hole fluidly connected to both the first and second clutches C1 and C2.

The hydraulic fluid supply holes and lubricating fluid supply holes in the dual clutch shaft 11 are fluidly connected to later-described hydraulic fluid passages and lubricating fluid passages formed in walls of the main housing 3 to extend from hydraulic fluid ports of respective electromagnetic proportional valves V1 and V2, respectively.

As hydraulic fluid supplied to the hydraulic fluid chamber 60 of each of the first and second clutches C1 and C2 from the corresponding electromagnetic proportional valve V1 or V2 is increased, each of the first and second clutches C1 and C2 is engaged.

Conversely, when hydraulic fluid is released from the hydraulic fluid chamber 60, due to the spring 67, each of the first and second clutches C1 and C2 is disengaged.

The piston 66 is formed with a central boss portion 66a that is slidably fitted on the outer peripheral surface of the central boss portion 61a of the clutch case 61. On the other hand, the inner space of the clutch case 61 has a space between an outer peripheral surface of the central boss portion 66a of the piston 66 and an inner peripheral surface of the sleeve portion 22a or 30a of the clutch gear 22 or 30 surrounding the central boss portion 66a. The canceller 68 is disposed in this space so as to have a cup-like shape closed at its outward end and open at its inward end.

The open inward end of the canceller 68 is disposed so as to face the piston 66. The closed outward end of the canceller 68 is disposed outward (closer to the clutch gear 22 or 30) from the outward end of the central boss portion 66a of the piston 66, and its inner peripheral edge is fixed on the outer peripheral surface of the central boss portion 61a of the clutch case 61.

Further, a lubricating fluid guide plate 69 is fixed to the central boss portion 61a of the clutch case 61 outward from the closed outward end of the canceller 68 so as to be able to abut against the closed outward end of the canceller 68.

A spring 67 is interposed between the piston 66 and the canceller 68. The spring 67 is arranged in an inner space 68a of the cup-shaped canceller 68. The spring 67 abuts at an outward end thereof the spring 67 against the closed outward end of the canceller 68, and abuts at an inward end thereof against the piston 66 disposed inward from the open inward end of the canceller 68.

The spring 67 biases the piston 66 inward in the clutch-disengaging direction (against the hydraulic pressure in the hydraulic fluid chamber 60). Due to the biasing force of the spring 67, the closed outward end of the canceller 68 is constantly pressed against the lubricating fluid guide plate 69. The inner space 68a of the canceller 68 is defined as a back pressure chamber 68a. The hydraulic pressure of fluid introduced into the back pressure chamber 68a is applied to the piston 66 as a back pressure against the hydraulic pressure in the hydraulic fluid chamber 60.

Normally, while hydraulic fluid is released from the hydraulic fluid chamber 60, the disengagement state of the clutch is held by the biasing force of the spring 67. However, during fast rotation, a centrifugal hydraulic pressure is generated by a slight amount of fluid remaining in the hydraulic fluid chamber 60, and this centrifugal hydraulic pressure is applied to the piston 66 in the direction to press the clutch plates 62 and 63 (outward in the inner space of the clutch case 61) against the biasing force of the spring 67, so that the clutch may be engaged unexpectedly.

Therefore, the canceller 68 is provided to prevent the hydraulic fluid chamber 60 from having a centrifugal hydraulic pressure causing unexpected engagement of the corresponding clutch.

In this regard, the canceller 68 has the back pressure chamber 68a in the inner space of the clutch case 61, and fluid introduced into the back pressure chamber 68a applies the back pressure to the piston 66 so as to appropriately release fluid from the hydraulic fluid chamber 60 during the disengagement of the clutch. Therefore, during the disengagement of the clutch, the amount of fluid left in the hydraulic fluid chamber 60 is less than that causing the centrifugal fluid pressure during fast rotation.

The lubricating fluid supplied to each of the first and second clutches C1 and C2 from the fluid hole 11k in the dual clutch shaft 11 is used as fluid introduced into the back pressure chamber 68a.

Therefore, the dual clutch shaft 11 is bored with radial fluid holes 11m and 11n branched from the axial fluid hole 11k. The radial fluid holes 11m and 11n have respective ends open on the outer peripheral surface of the dual clutch shaft 11.

On the other hand, the central boss portion 61a of each of the first and second clutches C1 and C2 is formed through a longitudinally intermediate portion thereof with a radial lubricating fluid hole 61d between inner and outer peripheral surfaces thereof. An open end of the lubricating fluid hole 61d on the inner peripheral surface of the central boss portion 61a is joined to the open end of each of the radial fluid holes 11m and 11n in the dual clutch shaft 11.

The outer end opening of the lubricating fluid hole 61d confronts the inner peripheral surface of the central boss portion 66a of the piston 66 so as to introduce the lubricating fluid overflowing from the lubricating fluid passage 61d into the back pressure chamber 68 via either the lubricating fluid hole 66b of the canceling fluid hole 66c formed through the central boss portion 66a between the inner and outer peripheral surfaces of the central boss portion 66a.

The lubricating fluid hole 66b is disposed so as to communicate with the lubricating fluid hole 61d of the clutch case 61 when the piston 66 is disposed its clutch-engagement position. A caliber of the lubricating fluid hole 66b is set so that a sufficient amount of fluid is introduced as lubricating fluid for the clutch plates 62 and 63.

The cancelling fluid hole 66c is disposed so as to communicate with the lubrication fluid hole 61d when the piston 66 is disposed at its clutch-disengagement position. A caliber of the cancelling fluid hole 61c is small so that fluid introduced into the back pressure chamber 68a has the only amount of fluid that resists in cooperation with the spring 67 against the centrifugal hydraulic pressure in the hydraulic fluid chamber 60.

In other words, these fluid holes 66b and 66c are configured so that the back pressure chamber 68a is supplied with fluid having only an amount of fluid resisting the centrifugal fluid pressure during the disengagement of the clutch, and with fluid having the amount for resisting the centrifugal fluid pressure plus fluid having the amount for lubricating the clutch plates 62 and 63 during the engagement of the clutch.

The clutch plates 62 and 63 are arranged radially outward of the canceller 68 so as to surround the outer peripheral surface of the canceller 68. The lubricating fluid hole 66b in the piston 66 is disposed so that fluid overflowing from the lubricating fluid hole 66b can be supplied as lubricating fluid to the clutch plates 62 and 63 disposed radially outward from the central boss portion 66a of the piston 66 through the internal space of the clutch case 61.

In the inner space of the clutch case 61, the canceller 68 is disposed so as to shield the clutch plates 62 and 63 from the lubricating fluid hole 66b, thereby ensuring the back pressure chamber 68a in the canceller 68. Fluid overflowing from the lubrication fluid hole 66b or the cancelling fluid hole 66c is introduced into the back pressure chamber 68a so as to resist the centrifugal fluid pressure of the hydraulic fluid in the hydraulic fluid chamber 60.

In addition, a structure for sending lubricating fluid from the back pressure chamber 68a to the clutch plates 62 and 63 shielded by the canceller 68 from the lubricating fluid hole 66b is required.

To provide such a structure, it is conceivable that the inner peripheral edge of the canceller 68 contacting the outer peripheral surface of the central boss portion 61a of the clutch case 61 is partly cutout, and a radial fluid groove is formed in the lubricating fluid guide plate 69, so that the cutout and the radial fluid groove guide fluid from the inner space of the canceller 68 to the portion of the inner space of the clutch case 61 incorporating the clutch plates 62 and 63 radially outward from the canceller 68.

A hydraulic circuit system, including the hydraulic pump unit 70, configured to supply hydraulic fluid to the first and second clutches C1 and C2 serving as dual clutches of the multi-speed transmission mechanism 6, and to supply lubricating fluid to the clutches and gears of the multi-speed transmission mechanism 6 will now be described with reference to FIGS. 5, 6, 10 to 16, and so on.

First, a schematic configuration of the hydraulic circuit will be described with reference to the hydraulic circuit diagram of FIG. 11. The hydraulic pump unit 70 includes a first hydraulic pump 70a and a second hydraulic pump 70b that are tandem pumps driven by the engine output shaft Ea (via the gears 71 and 72, etc.).

The hydraulic pump unit 70 is disposed in the speed-change gear chamber 2a of the transaxle casing 2. Both of the first and second hydraulic pumps (charge pumps) 70a and 70b are driven by the engine E so as to suck fluid from a fluid sump T in the speed-change gear chamber 2a via a filter 73a and their respective fluid suction ports of the pumps 70a and 70b, and so as to deliver fluid from their respective fluid delivery ports.

Here, fluid delivered from the first hydraulic pump 70a is always supplied to a clutch fluid supply passage L1. On the other hand, when an unloader valve V4, which is an on-off valve, is closed, fluid delivered from the second hydraulic pump 70b is joined via a check valve V5 to the fluid delivered from the first hydraulic pump 70a, and the merged fluid from the first and second hydraulic pumps 70 and 70b is supplied to the clutch fluid supply passage L1. On the other hand, when the unloader valve V4 is opened, the fluid delivered from the second hydraulic pump 70b is returned to the primary side (upstream side) of the first and second hydraulic pumps 70a and 70b.

The unloader valve V4 is an electromagnetic switching valve and is automatically switched between a valve open state and a closed valve state by a controller (not shown) based on detection of the rotational speed of the engine E. When the detected engine speed is within a range from an idle speed to a predetermined speed, the controller closes the unloader valve V4. When the detected engine speed is in a range above the predetermined speed and to a maximum speed, the unloader valve V4 is opened.

In this manner, when the engine speed is less than a predetermined value, the hydraulic pump unit 70 closes the unloader valve V4 and supplies only the fluid delivered from the first hydraulic pump 70a to the clutch fluid supply passage L1. When the engine speed exceeds the predetermined value, the unloader valve V4 is opened to supply fluid delivered from both the first and second hydraulic pumps 70a and 70b to the clutch fluid supply passage L1.

As described in detail later, the clutch fluid supply passage L1 is formed in a wall of the main housing 3 of the transaxle casing 2, and a hydraulic pressure in the clutch fluid supply passage L1 is regulated to a certain value by a relief valve V3. IN ports of the electromagnetic proportional valves V1 and V2 attached to the main housing 3 as described above are always fluidly connected to the clutch fluid supply passage L1.

In addition to the IN ports, the electromagnetic proportional valves V1 and V2 have respective OUT ports fluidly connected to the fluid sump and the like in the speed-change gear chamber 2a, and have respective valve ports fluidly connected to the respective hydraulic fluid chambers 60 of the first and second clutches C1 and C2.

The valve ports of the electromagnetic proportional valve V1 is always fluidly connected to the hydraulic fluid chamber 60 of the first clutch C1 via a first clutch operation fluid passage L2. The valve port of the electromagnetic proportional valve V2 is always fluidly connected to the hydraulic fluid chamber 60 of the second clutch C2 via a second clutch operation fluid passage L3.

The first clutch operation fluid passage L2 and the second clutch operation fluid passage L3 are constituted by fluid passages formed in a wall of the main housing 3, fluid passages formed in the dual clutch shaft 11, and so on.

By vibrationally connecting the supply/discharge port to the IN port, each of the electromagnetic proportional valves V1 and V2 supplies fluid from the clutch fluid supply passage L1 to the hydraulic fluid chamber 60 of the corresponding first or second clutch C1 or C2 so as to increase the engagement pressure of the clutch plates 62 and 63 of the clutch C1 or C2 (that is, it actuates the clutch C1 or C2 in the engagement direction).

On the other hand, by vibrationally connecting the supply/discharge port to the OUT port, each of the electromagnetic proportional valves V1 and V2 supplies fluid in the hydraulic fluid chamber 60 of the corresponding first or second clutch C1 or C2 to the fluid sump T or the like via the supply/discharge port and the tank port so as to reduce the engagement pressure of the clutch plates 62 and 63 of the corresponding first or second clutch C1 or C2 (that is, it actuates the clutch C1 or C2 in the disengagement direction).

When the pressure of fluid in the clutch fluid supply passage L1 exceeds the predetermined pressure, excessive fluid is released from the relief valve V3 to a lubricating fluid passage L4 formed in a wall of the main housing 3 as described later. The lubricating fluid passage L4 is divided into a clutch lubricating fluid passage L5 for lubricating the clutch plates 62 and 63 and the like in the first and second clutches C1 and C2 serving as the dual clutches, and a gear lubricating fluid passage L6 for lubricating needle bearings via which gears are fitted on respective gear shafts of the multi-speed transmission mechanism 6 rotatably relative to the respective gear shafts.

The clutch lubricating fluid passage L5 is bifurcated into the clutch lubricating fluid passage L5a to the first clutch C1 and the clutch lubricating fluid passage L5b to the second clutch C2.

Gears lubricated by fluid via the gear lubricating fluid passage L6 includes the fifth speed drive gear 26 relatively rotatably fitted on the odd-numbered speed drive gear shaft 12, the first, second, third and fourth speed drive gears 27, 35, 28, and 36 relatively rotatably fitted on the speed-change driven gear shaft 14, and the reverse driven gear 39 relatively rotatably fitted on the output shaft 15.

Figure 11:
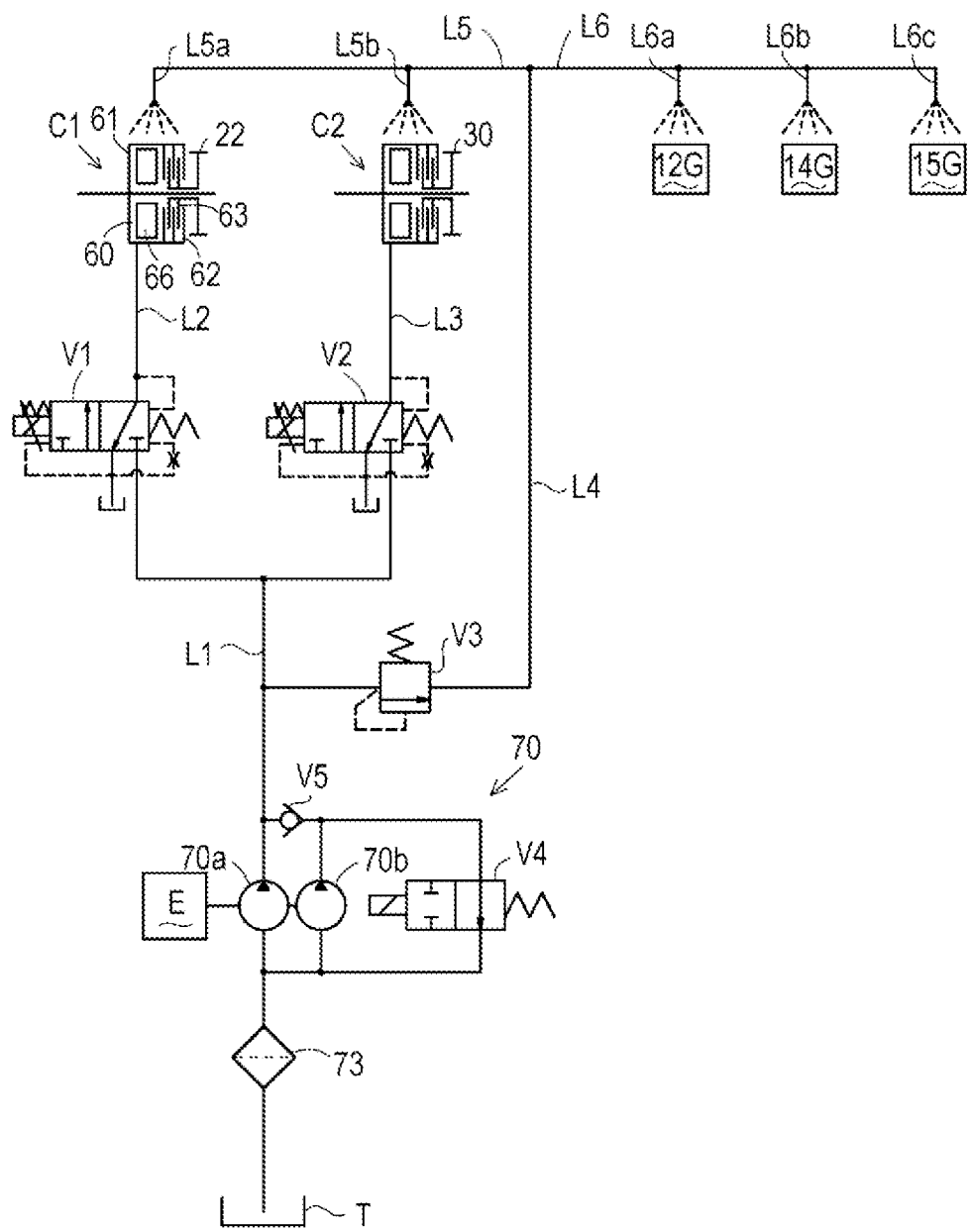
FIG. 11 is a hydraulic circuit diagram of a system for supplying dual clutch hydraulic fluid and clutch/gear lubricating fluid using a hydraulic pump unit 70 employed in the transaxle 1.

A reference numeral "12G" in FIG. 11 indicates a lubrication target group provided on the odd-numbered speed drive gear shaft 12, including the fifth speed drive gear 26. Similarly, a reference numeral "14G" indicates a lubrication target group provided on the speed-change driven gear shaft 14, including the gears 27, 28, 35 and 36, and a reference numeral "15 G" indicates a lubrication target group provided on the output shaft 15, including the reverse driven gear 39.

The gear lubricating fluid passage L6 is branched into gear lubricating fluid passages L6a, L6b and L6c to the respective lubrication target groups 12G, 14G and 15G.

Next, a concrete structure of the transaxle 1 configured to realize the hydraulic circuit system shown in FIG. 11 will be described with reference to FIGS. 5 to 8, 10 to 16, and so on.

As described above with reference to FIG. 7, the clutch and gear shafts constituting the multi-speed transmission mechanism 6 are disposed in the portion of the speed-change gear chamber 2a leftward (rightward in FIG. 7) from the input shaft 10, while the hydraulic pump unit 70 and the filter 73 are disposed rightward (leftward in FIG. 7) from the input shaft 10 (in FIG. 7, the filter 73 is not shown and only the hole 3j through which the filter 73 is inserted is shown).

The portion of the speed-change gear chamber 2a rightward from the input shaft 10 is mainly covered with the right portion of the front cover 4 and has a rear end portion defined by the wall portion 3a3 formed of the first housing part 3a of the main housing 3 adjacent to the flange-shaped peripheral edge portion 3d.

A lower portion of the speed-change gear chamber 2a is provided with the fluid sump T shown in FIG. 11. At a low position below a fluid level of the fluid sump T, as shown in FIG. 12 and so on, the longitudinally extended tubular filter 73 is submerged in the fluid sump T.

Figure 12:
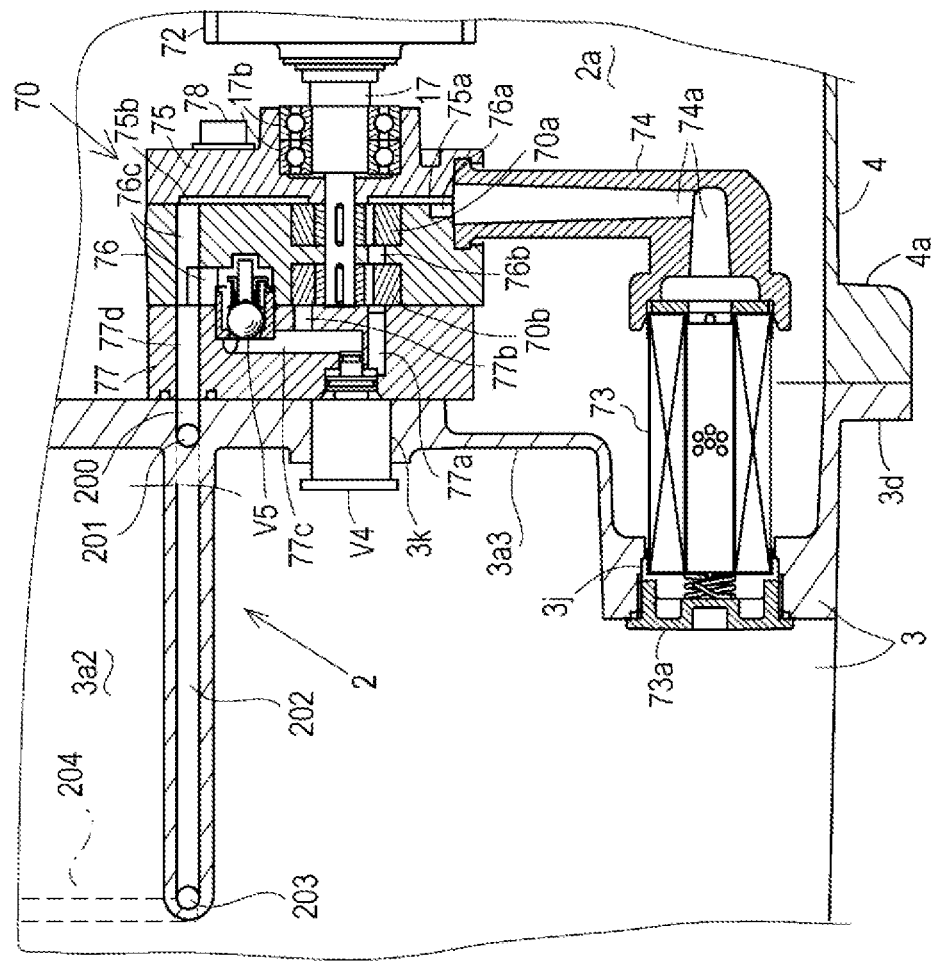
FIG. 12 is a partial side sectional view of the transaxle 1 showing the hydraulic pump unit 70.

In order to facilitate removal of the filter 73 for maintenance, as shown in FIG. 12 and so on, a longitudinal penetrating hole 3j for extracting the filter 73 therefrom is provided in a lower part of the wall portion 3a3 of the main housing 3 and is closed by a detachable cap 73a.

As shown in FIG. 12, a fluid pipe member 74 bent in an L-shape as seen from the front is extended from the front end portion of the filter 73 in the speed-change gear chamber 2a, and its upper end is connected to a bottom portion of the hydraulic pump unit 70.

As shown in FIG. 12 and so on, the hydraulic pump unit 70 has a housing formed by joining a bearing block 75, a pump block 76, and a valve block 77 to one another. In the pump block 76, constant displacement type oil pumps of internal gear type serving as the first and second hydraulic pumps 70a and 70b and the check valve V5 are installed. The unloader valve V4 is incorporated in the valve block 77.

A rear surface of the bearing block 75 and a front surface of the pump block 76 are brought into contact with each other, a rear surface of the pump block 76 and a front surface of the valve block 77 are brought into contact with each other, and the bearing block 75, the pump block 76, and the valve block 77 are fastened together by bolts 78 so as to constitute the housing.

Further, a rear surface of the valve block 77 abuts against the wall portion 3a3 of the main housing 3, and rear end portions of the bolts 78 penetrating the bearing block 75, the pump block 76, and the valve block 77 are brought into contact with the wall portion 3a3, whereby the hydraulic pump unit 70 is fixed to the main housing 3. The unloader valve V4 is fitted into the valve block 77 in the speed-change gear chamber 2a via a longitudinal through hole 3k formed in an upper portion of the wall portion 3a3.

The valve block 77 has a left portion that is extended leftward to have the rear end portion of the input shaft 10 journalled therein via the bearing 10b as described above (see FIGS. 5 and 10).

The pump drive shaft 17 is journaled by the bearing block 75 via a bearing 17b, and is disposed at a rear end portion thereof in the pump block 76. The inner rotors of the first and second hydraulic pumps 70a and 70b are fixed on the rear end portion of the pump drive shaft 17.

The fluid pipe member 74 is penetrated by a fluid passage 74a extended between its lower end connected to the filter 73 and its upper end connected to the hydraulic pump unit 70. The upper end of the fluid pipe member 74 is connected to a bottom end junction portion between the bearing block 75 and the pump block 76.

The bearing block 75 is formed with a fluid suction passage 75a along the front surface thereof. The fluid suction passage 75a is extended vertically upward from the lower end to a vertically middle portion of the bearing block 75. A lower end of the fluid suction passage 75a is joined to the fluid passage 74a in the fluid pipe member 74. An upper end portion of the fluid supply passage 75 is joined to the fluid suction port of the first hydraulic pump 70*a* along the front surface of the pump block 76.

To facilitate flow of fluid into the fluid suction passage 75*a*, the pump block 76 is formed in a lower end portion thereof with a fluid guide passage 76*a* joined to the upper end portion of the fluid passage 74*a* and a lower portion of the fluid suction passage 75*a*, and an pump portion of the fluid suction passage 75*a* is expanded.

Further, the bearing block 75 is formed on the rear surface thereof with a fluid delivery passage 75*b* extended vertically upward from a position slightly upward from the fluid suction passage 75*a*. The fluid delivery passage 75*b* is joined at a lower end portion thereof to a delivery port of the first fluid pressure pump 70*a*.

The pump block 76 is formed therein with a longitudinally extended secondary feed suction passage 76*b* for connecting the suction port of the front first hydraulic pump 70*a* and the suction port of the rear second fluid pressure pump 70*b*.

Further, the pump block 76 is formed through a portion thereof above the first and second hydraulic pumps 70*a* and 70*b* with a longitudinally extended horizontal hydraulic fluid supply passage 76*c*. The hydraulic fluid supply passage 76*c* is joined at a front end thereof an upper end portion of the fluid delivery passage 75*b* formed along the rear surface of the bearing block 75.

In correspondence to the hydraulic fluid supply passage 76*c* in the pump block 76, the valve block 77 is also formed through an upper portion thereof with a longitudinally extended horizontal hydraulic fluid supply passage 77*d*. The hydraulic fluid supply passage 77*d* is joined at a front end thereof to a rear end of the hydraulic fluid supply passage 76*c* in the pump block 76.

The first housing part 3*a* of the main housing 3 is formed with a longitudinally extended wall portion having the right side surface 3*a*2 (hereinafter, this wall portion is referred to as "wall portion 3*a*2") which extends rearward from the right end of the wall portion 3*a*3. As described in detail later, the clutch operation fluid supply passage L1 is formed within the wall portion 3*a*3 and the wall portion 3*a*2. A starting end of the clutch operation fluid supply passage L1 is joined to a rear end of the hydraulic fluid supply passage 77*d* open at the rear end surface of the valve block 77 contacting the wall portion 3*a*3.

The check valve V5 is provided in the pump block 76 and the valve block 77 so as to penetrate mutually joint surfaces of the pump block 76 and the valve block 77. The check block V5 is joined at a front end portion thereof to the hydraulic fluid supply passage 76*c* in the pump block 76, and at a rear end portion thereof to a connection fluid passage 77*c* formed in the valve block 77. The check valve V5 allows only flow of fluid from the connection fluid passage 77*c* to the hydraulic fluid supply passage 76*c*.

The connection fluid passage 77*c* is joined to an pump port of the unloader valve V4 fitted in the valve block 77. The valve block 77 is formed therein with a fluid return passage 77*a* fluidly connecting the suction port of the second hydraulic pump 70*b* to an outlet port of the unloader valve V4, and with a fluid delivery passage 77*b* fluidly connecting the delivery port of the second hydraulic pump 70*b* to the connection fluid passage 77*c*.

The second hydraulic pump 70*b* is driven synchronously with the first hydraulic pump 70*a* by the pump drive shaft 17 so as to suck fluid into its suction port from the fluid passage 74*a* and the fluid suction passage 75*a* via the suction port of the first hydraulic pump 70*a* and the secondary fluid suction port 76*b*, and so as to deliver the fluid to the connection fluid passage 77*c* via the fluid delivery passage 77*b*.

At this time, if the unloader valve V4 is closed, the flow of fluid into the connection fluid passage 77*c* from the fluid delivery passage 77*b* opens the check valve V5 so as to enter the hydraulic fluid supply passage 76*c* in the pump block 76, and is joined in the hydraulic fluid supply passage 76*c* to the flow of fluid delivered from the first hydraulic pump 70*a* via the fluid delivery passage 75*b*. The combined fluid flows through the hydraulic fluid supply passage 77*d* to the clutch operation fluid supply passage L1.

On the other hand, if the unloader valve V4 is open, the fluid flowing into the connection fluid passage 77*c* from the fluid delivery passage 77*b* is returned by the open unloader valve V4 into the suction port of the second hydraulic pump 70*b* via the fluid return passage 77*a*, and is further returned to the suction port of the first hydraulic pump 70*a* via the secondary fluid supply passage 76*b*.

The clutch operation fluid supply passage L1 is formed in the wall of the main housing 3 to supply the pump ports of the electromagnetic proportional valves V1 and V2 with fluid delivered from the hydraulic fluid supply passage 77*d* in the hydraulic pump unit 70. A concrete structure of the clutch operation fluid supply passage L1 will now be described with reference to FIGS. 12, 13 and so on.

A longitudinally extended fluid hole 200 is bored in the wall portion 3*a*3 of the main housing 3, and is joined at a front end thereof to the rear end of the hydraulic fluid supply passage 77*d* open at the rear surface of the valve block 77 of the hydraulic pump unit 70 contacting the wall portion 3*a*3.

A laterally extended fluid hole 201 is bored in the wall portion 3*a*3 so as to extend leftward from a rear end of the fluid hole 200. A left end of the fluid hole 201 reaches the inside of the wall portion 3*a*2, and a longitudinally extended fluid hole 202 is bored in the wall portion 3*a*2 so as to extend rearward from the left end of the fluid hole 201.

In the wall portion 3*a*2, the fluid hole 202 is joined at a rear end thereof to a laterally extended fluid hole 203, and a vertical fluid hole 204 is extended upward from a left end of the fluid hole 203. Incidentally, a right end of the fluid hole 203 open on an outer surface of the wall portion 3*a*2 is plugged. An upper end of the vertical fluid hole 204 reaches a IN port V3*a* of the relief valve V3 fitted into the upper right end portion of the main housing 3.

The electromagnetic proportional valve V1 for controlling the first clutch C1 and the electromagnetic proportional valve V2 for controlling the second clutch C2 are fitted into the wall portion 3*a*2 so as to extend laterally. The electromagnetic proportional valve V2 is disposed at a position higher than the electromagnetic proportional valve V1, and the relief valve V3 is disposed at a position higher than the electromagnetic proportional valve V2.

Further, the electromagnetic proportional valve V1 is disposed so as to overlap a front portion of the vertical fluid hole 204, and an IN port V1*a* of the electromagnetic proportional valve V1 is disposed on a vertically intermediate portion of the vertical fluid hole 204. On the other hand, the electromagnetic proportional valve V2 disposed higher than the electromagnetic proportional valve V1 is disposed rearward from the vertical fluid hole 204. A longitudinally extended fluid hole 205 (see FIG. 13) is bored in the wall portion 3*a*2 to extend rearward from the fluid hole 204 to the pump port V2*a* of the electromagnetic proportional valve V2.

As described above, the fluid holes 200, 201, 202, 203, 204, and 205 are formed inside the wall portion 3*a*3 and the wall portion 3a2 of the first housing part 3a of the main housing 3 so as to constitute the clutch operation fluid supply passage L1 shown in FIG. 11.

The clutch hydraulic fluid supply passage L1 configured as described above fluidly connects the rear end of the hydraulic fluid supply passage 77d serving as a delivery port of the hydraulic pump unit 70 to the IN ports V1a and V2a of the electromagnetic proportional valves V1 and V2, and has a hydraulic pressure that is limited by the relief valve V3 to be less than the predetermined pressure.

Figure 14:
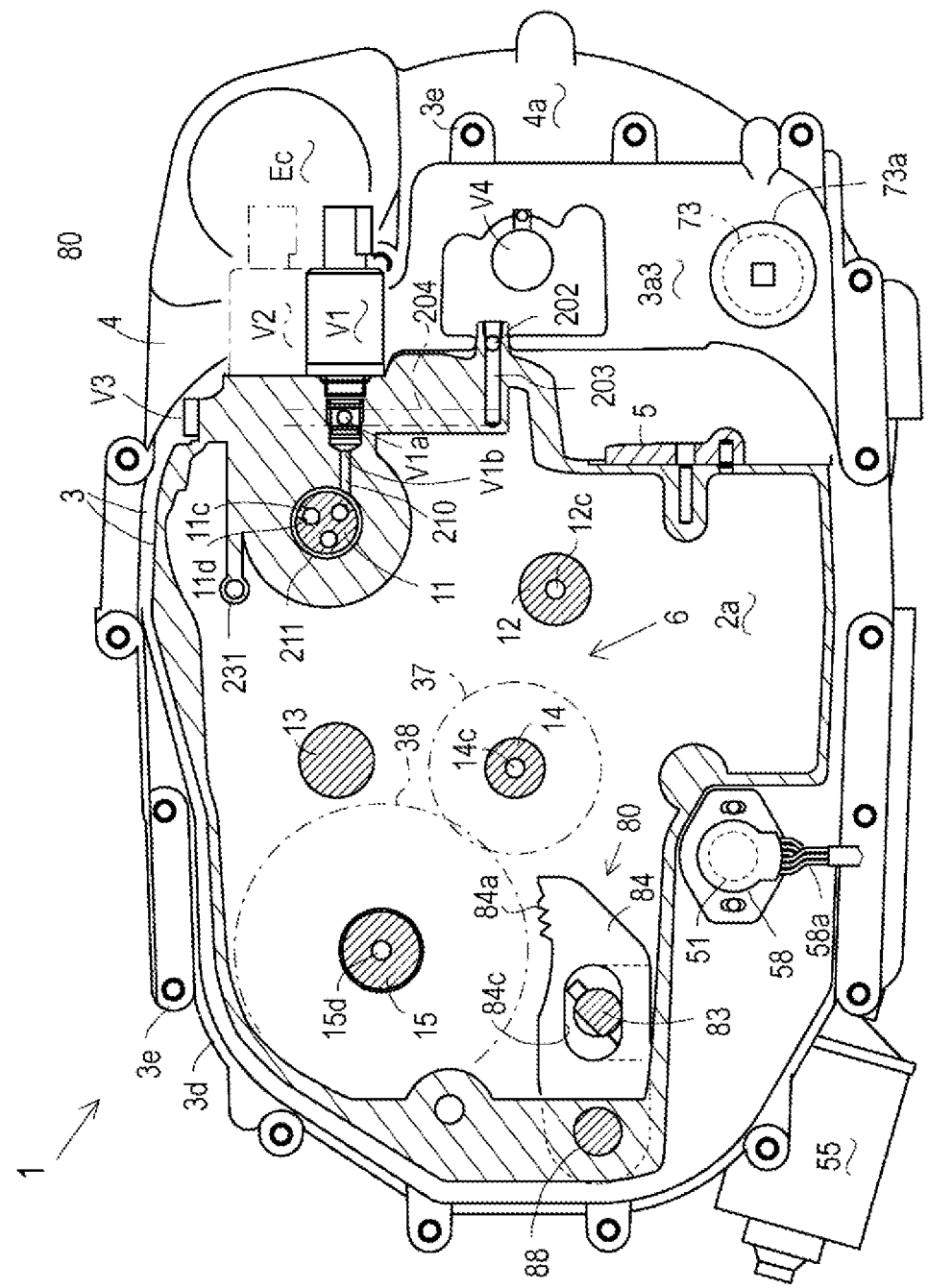
FIG. 14 is a sectional rear view of the transaxle 1 taken along the line XIV-XIV in FIG. 4, showing the hydraulic fluid passage to an electromagnetic proportional valve V1 for a first clutch.
Figure 15:
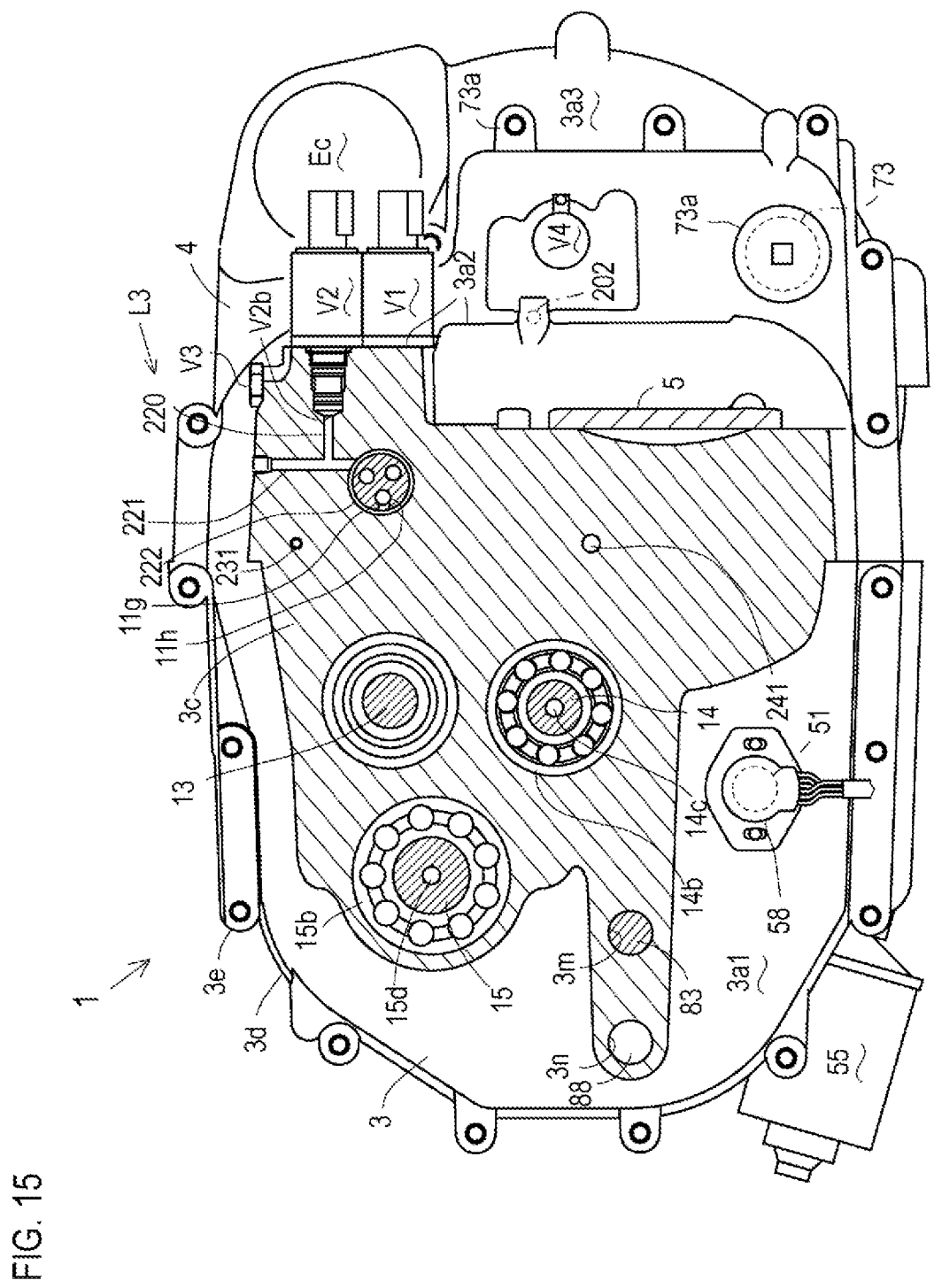
FIG. 15 is a sectional rear view of the transaxle 1 taken along the line XV-XV in FIG. 4 showing the hydraulic fluid passage to an electromagnetic proportional valve V2 for a second clutch.

A concrete configuration of the first clutch operation fluid passage L2 extending from a fluid supply/discharge port V1b of the electromagnetic proportional valve V1 to the hydraulic fluid chamber 60 of the first clutch C1 will now be described with reference to FIGS. 5, 6, 14 and so on.

The main housing 3 is bored by a laterally extended fluid hole 210 in the wall portion 3a2 and the partition wall 3c extended leftward from the wall portion 3a2. The fluid hole 210 is extended leftward from the fluid supply/discharge port V1b of the electromagnetic proportional valve V1. The rear portion of the dual clutch shaft 11 fitted in a shaft hole formed in the partition wall 3c is formed on an outer peripheral surface thereof with an annular groove 211 joined to a right end of the fluid hole 210.

The dual clutch shaft 11 is bored by a fluid hole 11c extended radially inward from the annular groove 211. The radial fluid hole 11c is joined to a rear portion of the axial fluid hole 11d. Further, a fluid hole 11e is bored in the dual clutch shaft 11 so as to extend radially outward from a front end portion of the fluid hole 11d. The radial fluid hole 11e is open at an outer end thereof on the outer peripheral surface of the dual clutch shaft 11 and is joined at the open outer end thereof to the fluid hole 61c formed in the central boss portion 61a of the clutch case 61 of the first clutch C1.

Therefore, the fluid hole 210 in the wall of the main housing 3, the annular groove 211, the radial fluid hole 11c, the axial fluid hole 11d, and the radial fluid hole 11e formed in the dual clutch shaft 11, and the fluid hole 61c formed in the clutch case 61 of the first clutch C1 constitute the first clutch operation fluid passage L2 extending from the fluid supply/discharge port V1b of the electromagnetic proportional valve V1 to the hydraulic fluid chamber 60 of the first clutch C1.

The main housing 3 is bored by a laterally extended fluid hole 220 in the wall portion 3a2 and the partition wall 3c extended leftward from the wall portion 3a2. The fluid hole 220 is extended leftward from the fluid supply/discharge port V2b of the electromagnetic proportional valve V2. A vertical fluid hole 221 is bored in the partition wall 3c. The laterally extended fluid hole 220 is joined at a left end thereof to the vertical fluid hole 221.

The rear portion of the dual clutch shaft 11 fitted in the shaft hole in the partition wall 3c is formed on the outer peripheral surface thereof with an annular groove 222 aligned front and rear with the annular groove 211. The vertical fluid hole 221 is plugged at an upper end thereof, and is joined at a lower end thereof to the annular groove 222.

The dual clutch shaft 11 is bored by a fluid hole 11g extended radially inward from the annular groove 222. The radial fluid hole 11g is joined to a rear portion of the axial fluid hole 11h. Further, a fluid hole 11i is bored in the dual clutch shaft 11 so as to extend radially outward from a front end portion of the fluid hole 11h. The radial fluid hole 11i is open at an outer end thereof on the outer peripheral surface of the dual clutch shaft 11 and is joined at the open outer end thereof to the fluid hole 61c formed in the central boss portion 61a of the clutch case 61 of the second clutch C2.

Therefore, the fluid holes 220 and 221 in the wall of the main housing 3, the annular groove 222, the radial fluid hole 11g, the axial fluid hole 11h, and the radial fluid hole 11i formed in the dual clutch shaft 11, and the fluid hole 61c formed in the clutch case 61 of the second clutch C2 constitute the second clutch operation fluid passage L3 extending from the fluid supply/discharge port V2b of the electromagnetic proportional valve V2 to the hydraulic fluid chamber 60 of the second clutch C2.

As shown in FIGS. 5 and 6, the partition wall 3c is formed therein with recesses into which respective rear end portions of the dual clutch shaft 11, the odd-numbered speed drive gear shaft 12 and the speed-change driven gear shaft 14 are fitted. The recesses have respective closed rear end surfaces spaced rearward from the respective rear end surfaces of the shafts 11, 12 and 14. In other words, there are spaces in the respective recesses in the axial direction of the respective shafts. These spaces are defined as lubricating fluid galleries 251, 242 and 262.

As understood from FIG. 6, a rear end of the axial fluid hole 11k is open at the rear end of the dual clutch shaft 11 and is joined to the lubricating fluid gallery 251.

Figure 16:
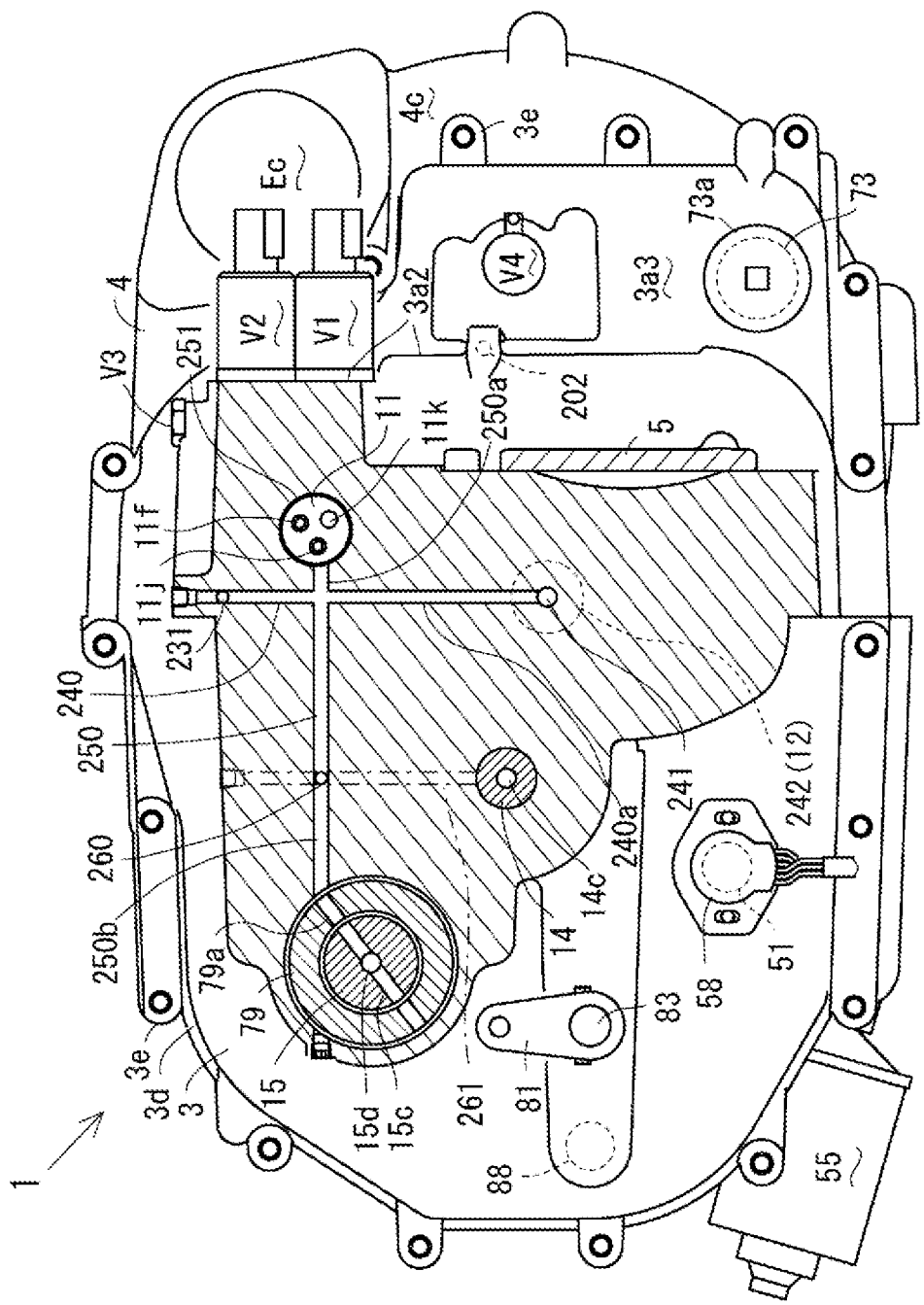
FIG. 16 is a sectional rear view of the transaxle 1 taken along the line XVI-XVI in FIG. 4, showing a lubricating fluid path.

Incidentally, as shown in FIGS. 6 and 16, the rear ends of the axial fluid holes 11d and 11h are closed by respective plugs 11f and 11j, so that the clutch operating fluid passages to the hydraulic fluid chambers 60 of the first and second clutches C1 and C2 are prevented from being fluidly communicating with the lubricating fluid gallery 251.

As described above, in the dual clutch shaft 11, the radial fluid holes 11m and 11n are diverged from the axial fluid holes 11k, and each of the fluid holes 11m and 11n is fluidly communicated with the lubricating fluid hole 61d formed in the clutch case 61 of each of the first and second clutches C1 and C2, and with the back pressure chamber 68a defined by the canceller 68 via the lubricating fluid hole 66b and the cancelling fluid hole 66c formed in the piston 66.

Due to the above configuration, the fluid introduced into the fluid hole 11k from the lubricating fluid gallery 251 is supplied as lubricating fluid to the clutch plates 62 and 63 of the first and second clutches C1 and C2 via the fluid holes 11m and 11n, the fluid holes 61d, 66 b and 66c in the first and second clutches C1 and C2, and the back pressure chamber 68a in the first and second clutches C1 and C2.

As shown in FIG. 5, an axial fluid hole 12c is formed in the odd-numbered speed drive gear shaft 12. The fluid hole 12c is open at a rear end thereof on a rear end of the odd-numbered speed drive gear shaft 12 and is joined at the open rear end thereof to the lubricating fluid gallery 242.

The odd-numbered speed drive gear shaft 12 is bored by a radial fluid hole 12d extended radially outward from a front end portion of the fluid hole 12c. An open end of the radial fluid hole 12d at an outer peripheral surface of the odd-numbered speed drive gear shaft 12 faces a needle bearing interposed between an inner peripheral surface of the fifth speed drive gear 26 and an outer peripheral surface of the odd-numbered speed drive gear shaft 12.

Due to the above configuration, the fluid introduced into the fluid hole 12c from the lubricating fluid gallery 242 is supplied as lubricating fluid to (the needle bearing on) the inner peripheral portion of the fifth speed drive gear 26 via the radial fluid hole 12d.

As shown in FIG. 6, an axial fluid hole 14c is bored in the speed-change driven gear shaft 14. A rear end of the fluid hole 14c is open at the rear end of the speed change driven gear shaft 14 so as to be joined to the lubricant fluid gallery 262.

A plurality of radial fluid holes 14d, 14e, 14f and 14g are bored in the speed-change driven gear shaft 14 so as to be aligned in the longitudinal direction and so as to be extended radially outward from the axial fluid hole 14c. An open end of each of the radial fluid holes 14d, 14e, 14f and 14g at the outer peripheral surface of the speed-change driven gear shaft 14 faces a needle bearing interposed between the outer peripheral surface of the speed-change driven gear shaft 14 and an inner peripheral surface of each of the first, third, fourth and second speed driven gears 27, 28, 36 and 35.

Due to the above configuration, the fluid introduced into the fluid hole 14c from the lubricating fluid gallery 262 is supplied as lubricating fluid to (the needle bearings on) the inner peripheral portions of the drive gears 27, 28, 36 and 35 via the respective radial fluid holes 14d, 14e, 14f and 14g.

The output shaft 15 cannot be provided with a fluid gallery in the partition wall 3c in the axial direction from the output shaft 15 (i.e., rearward from a rear end of the output shaft 15) because the rear end portion of the output shaft 15 protrudes rearward from the partition wall 3c via the shaft hole 3h formed in the partition wall 3c into the speed-reduction/differential gear chamber 2b rearward from the partition wall 3c.

Therefore, a lubricating fluid receptacle ring 79 provided annularly on the output shaft 15 is disposed in the shaft hole 3h in the vicinity of the bearing 15b in the partition wall 3c. A radial fluid hole 79a is bored in the lubricating fluid receptacle ring 79. There is a gap between an outer peripheral surface of the lubricating fluid receiving ring 79 and an inner peripheral surface of the shaft hole 3h, and this gap functions as a lubricating fluid gallery.

This gap is joined to a left end of a later-described gear lubricating fluid hole portion 250b formed in the partition wall 3c, and to an outer end of the fluid hole 79a open at the outer peripheral surface of the lubricating fluid receptacle ring 79.

A radial fluid hole 15c is bored in the output shaft 15 and an outer end of the fluid hole 15c open at the outer peripheral surface of the output shaft 15 is joined to the fluid hole 79a open at the inner peripheral surface of the lubricating fluid receptacle ring 79. Further, the output shaft 15 is bored by an axial (longitudinal) fluid hole 15d extended forward from a radial inner end of the radial fluid hole 15c.

A radial fluid hole 15e is bored in the output shaft 15 extended radially from a front end portion of the axial fluid hole 15d. An outer end of the radial fluid hole 15e is open at the outer peripheral surface of the output shaft 15 faces a needle bearing interposed between an inner peripheral surface of the reverse driven gear 39 and the outer peripheral surface of the output shaft 15.

Therefore, the fluid introduced into the fluid hole 79a in the lubricating fluid receptacle ring 79 from the lubricating fluid gallery formed on the outer peripheral surface of the lubricating fluid receptacle ring 79 is supplied as lubricating fluid to (the needle bearing on) the inner peripheral surface of the reverse driven gear 39 via the fluid holes 15c, 15d, and 15e in the output shaft 15.

Figure 13:
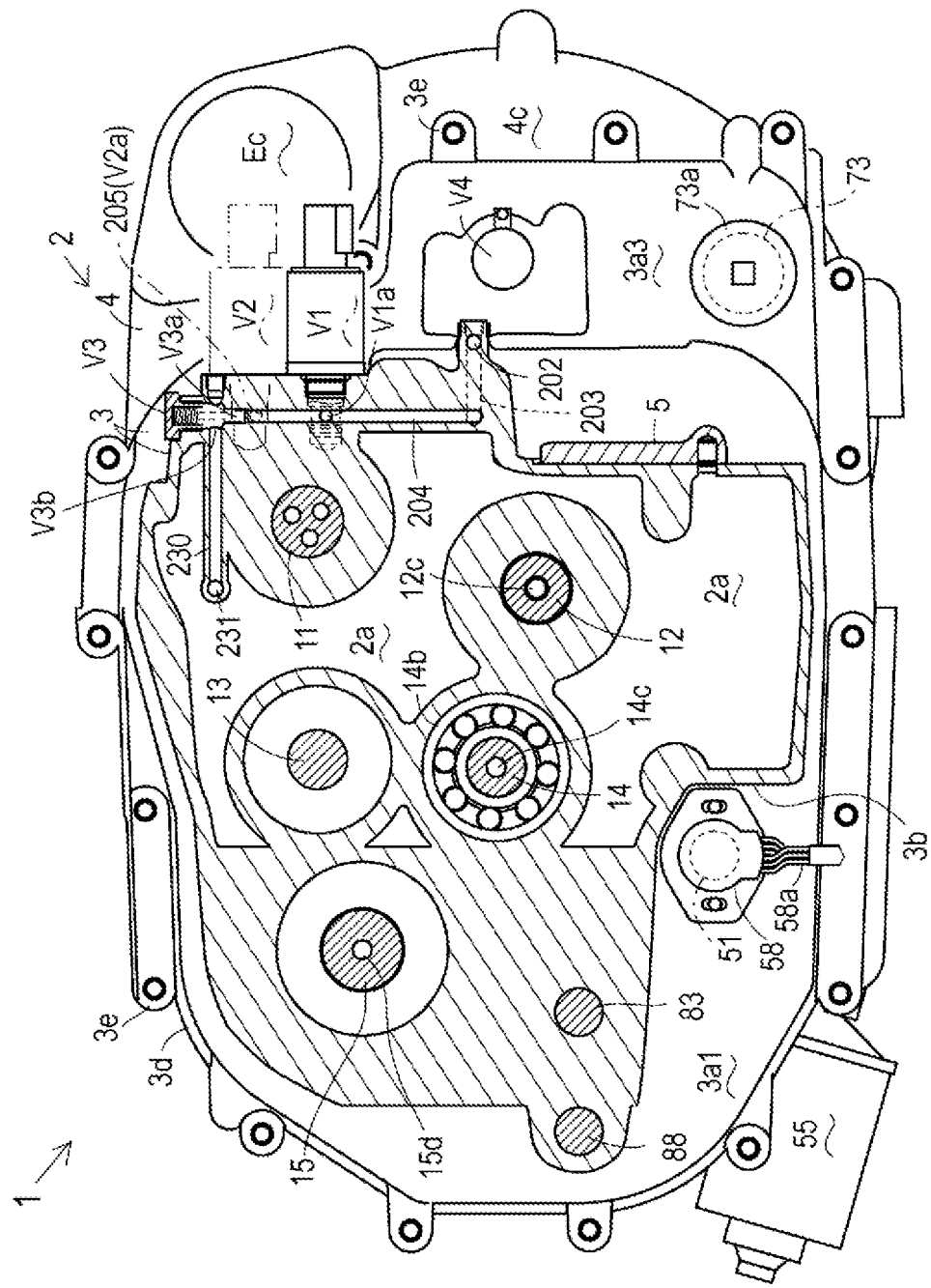
FIG. 13 is a rear sectional view of the transaxle 1 taken along the line XIII-XIII in FIG. 4, showing fluid passages to a relief valve V 3.

On the other hand, as shown in FIG. 13, the main housing 3 is bored by a laterally extended fluid hole 230 in the wall portion 3a2 and the partition wall 3c. The fluid hole 230 is extended leftward from the tank port V3b of the relief valve V3. As shown in FIGS. 13 to 16, the main housing 3 is bored by a longitudinally extended fluid hole 231 in the partition wall 3c. The fluid hole 231 is extended rearward from a left end of the fluid hole 230.

Further, as shown in FIG. 16, a vertical fluid hole 240 and a laterally extended fluid hole 250 are bored in the partition wall 3c, so that the fluid hole 250 intersects a vertically intermediate portion of the fluid hole 240.

The vertical fluid hole 240 is plugged at an upper end thereof, and is joined to a rear end of the longitudinally extended fluid hole 231 at a portion thereof immediately below the upper end thereof. The fluid holes 240 and 250 cross each other below the junction of the fluid holes 240 and 231.

The portion of the laterally extended fluid hole 250 extended rightward from its intersection with the fluid hole 240 is defined as the dual clutch lubricating fluid hole portion 250a whose right end is joined to the lubricating fluid gallery 251.

As shown in FIGS. 5 and 16, a portion of the vertical fluid hole 240 extending downward from its intersection with the fluid hole 250 is defined as a gear lubrication fluid hole portion 240a. A longitudinally extended fluid hole 241 is bored in the partition wall 3c so as to extend forward from a lower end of the gear lubricating fluid hole portion 240a. The fluid hole 241 is joined at a front end thereof to the lubricating fluid gallery 242.

Further, as shown in FIGS. 6 and 16, on the left side of the vertical fluid hole 240, a longitudinally extended fluid hole 260 is bored in the partition wall 3c so as to extend forward from the laterally extended fluid hole 250. The fluid hole 260 is joined at a front end thereof to a vertical fluid hole 260 bored in the partition wall 3c. The fluid hole 261 is joined at a lower end thereof to the lubricating fluid gallery 262.

A portion of the laterally extended fluid hole 250 extended leftward from its intersection with the longitudinally extended fluid hole 260 is defined as a gear lubricating fluid hole portion 250b. The gear lubricating fluid hole 250b is open at a left end thereof on the inner peripheral surface of the shaft hole 3h so as to be joined to the lubricating fluid gallery formed along the outer peripheral surface of the lubricating fluid receptacle ring 79.

As described above, the lubricating fluid passages L4, L5, L6 shown in FIG. 11 are constituted by the fluid holes formed in the wall of the main housing 3, the respective shafts, and so on.

In other words, the fluid holes 230, 231 and 240 in the wall of the main housing 3 extending from the OUT port of the relief valve V3 constitute the common lubricating fluid passage L4. The vertical fluid hole 240 intersects the laterally extended fluid hole 250. The clutch lubricating fluid passage L5 including the dual clutch lubricating fluid hole portion 250a is configured so as to extend rightward from the intersection of the fluid holes 240 and 250. The gear lubricating fluid passage L6 is configured so as to extend downward and leftward from the intersection of the fluid holes 240 and 250.

The dual clutch lubricating fluid hole portion 250a and the lubricating fluid gallery 251 formed in the partition wall 3c of the main housing 3 and the fluid hole 11k formed in the dual clutch shaft 11 are branched from the common lubricating fluid passage L4 so as to constitute the clutch lubricating fluid passage L5 for supplying lubricating fluid to the first and second clutches C1 and C2 serving as dual clutches.

The clutch lubricating fluid passage L5 is bifurcated into a clutch lubricating fluid passage L5a to the first clutch C1 and a clutch lubricating fluid passage L5b to the second clutch C2. The clutch lubricating fluid passage L5a includes the fluid hole 11*m* formed in the dual clutch shaft 11 and the fluid holes 61*d*, 66*b* and 66*c* formed in the first clutch C1. The clutch lubricating fluid passage L5*b* includes the fluid hole 11*n* formed in the dual clutch shaft 11 and the fluid holes 61*d*, 66*b* and 66*c* formed in the second clutch C2.

Further, the gear lubricating fluid passage L6 is bifurcated into a gear lubricating fluid passage L6*a* to the lubrication target group 12G on the odd-numbered speed drive gear shaft 12, a gear lubricating fluid passage L6*b* to the lubrication target group 14G on the speed-change driven gear shaft 14, and a gear lubricating fluid passage L6*c* to the lubrication target group 15G on the output shaft 15.

The laterally extended gear lubricating fluid hole portion 240*a* and the longitudinally extended fluid holes 241, which are formed in the partition wall 3*c*, the lubricating fluid gallery 242, and the fluid holes 12*c* and 12*d* formed in the odd-numbered speed driving gear shaft 12 constitute the gear lubricating fluid passage L6*a*.

The left portion of the fluid hole 250 formed in the partition wall 3*c* and extended leftward from the intersection of the fluid holes 240 and 250, the fluid holes 260 and 261, the lubricating fluid gallery 262, and the fluid holes 14*c*, 14*d*, 14*e*, 14*f* and 14*g* formed in the speed change driven gear shaft 14 constitute the gear lubricating fluid passage L6*b*.

The gear lubricating fluid hole portion 250*b* formed in the partition wall 3*c*, the fluid hole 79*a* in the lubricating fluid receptacle ring 79, and the fluid holes 15*c*, 15*d* and 15*e* in the output shaft 15 constitute the gear lubricating fluid passage L6*c*.

Referring to FIGS. 17 to 22, a structure of a brake unit 80 used for parking of a working vehicle equipped with the transaxle 1 and its effects will now be described.

Figure 17:
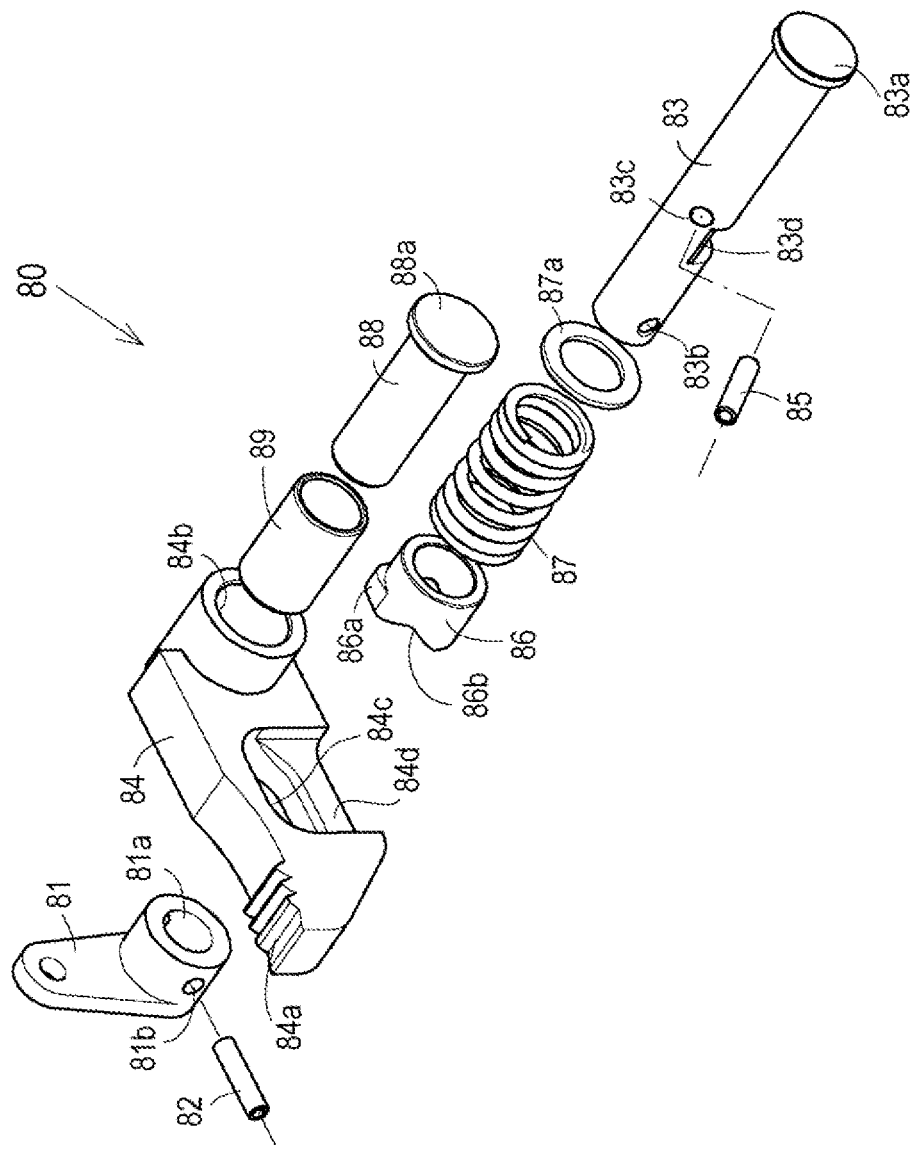
FIG. 17 is an exploded perspective view of a brake unit 80.
Figure 18:
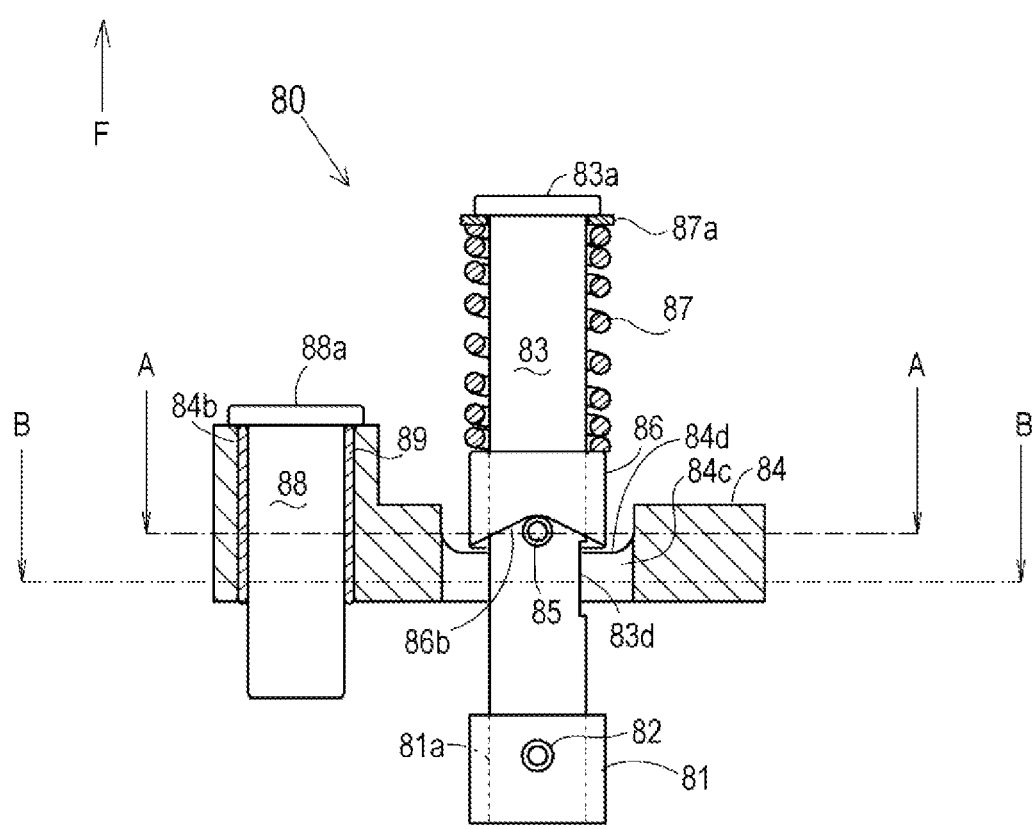
FIG. 18 is a sectional plan view of the brake unit 80.

As shown in FIGS. 17 and 18, the brake unit 80 includes a brake arm 81, a lock pin 82, a brake arm shaft 83, a pawl block 84, a cam pushpin 85, a cam ring 86, a coil spring 87, a washer 87*a*, a pawl block fulcrum shaft 88, and a collar 89.

The brake arm 81 is formed in a basal end portion thereof with a shaft hole 81*a* and a pin hole 81*b* extended radially from the shaft hole 81*a*. The brake arm shaft 83 is formed with a radial pin hole 83*b* in a portion thereof adjacent to its rear end so as to correspond to the pin hole 81*b* in the brake arm 81.

A latch pawl 84*a* is formed on an upper end of a right end portion of the pawl block 84. On the other hand, a shaft hole 84*b* is formed in a left end portion of the pawl block 84.

A through hole 84*c* is formed in a laterally intermediate portion of the pawl block 84. The through hole 84*c* has a substantially horizontally elongated elliptic shape when viewed in the longitudinal direction, so that ceiling and bottom surfaces of the through hole 84*c* are flat.

The ceiling surface of the through hole 84*c* is formed between front and rear ends of the pawl block 84, whereas a front half of a lower portion of the through hole 84*c* is formed as a notch 84*d*, and the bottom surface of the through hole 84*c* is formed in only the rear half of the pawl block 84.

A flange 83*a* is formed on a front end of the brake arm shaft 83, and a flange 88*a* is formed on a front end of the pawl block fulcrum shaft 88.

The brake arm shaft 83 is formed in a longitudinally middle portion thereof with a radial pin hole 83*c*. Also, the brake arm shaft 83 is cutout at a portion thereof slightly rearward from the pin hole 83*c* so as to form a cam surface 83*d* that looks like a chord with respect to a circular shape of the brake arm shaft 83 in section when viewed in the axial (longitudinal) direction.

A part of a rear end surface of the cam ring 86 projects radially to be formed as a cam projection 86*a*. V-shaped valley-like cam recesses 86*b* are formed on the rear end surface of the cam ring 86 on both circumferential sides from the cam projection 86*a*.

The brake arm 81 is disposed outside the transaxle casing 2 and rearward from the wall portion 3*a*1. A rear end portion of the brake arm shaft 83 is fitted into the shaft hole 81*a* of the brake arm 81, and the brake arm shaft 83 is fixed to the brake arm 81 by the lock pin 82 passed through the pin hole 81*b* and the pin hole 83*b*.

Figure 10:
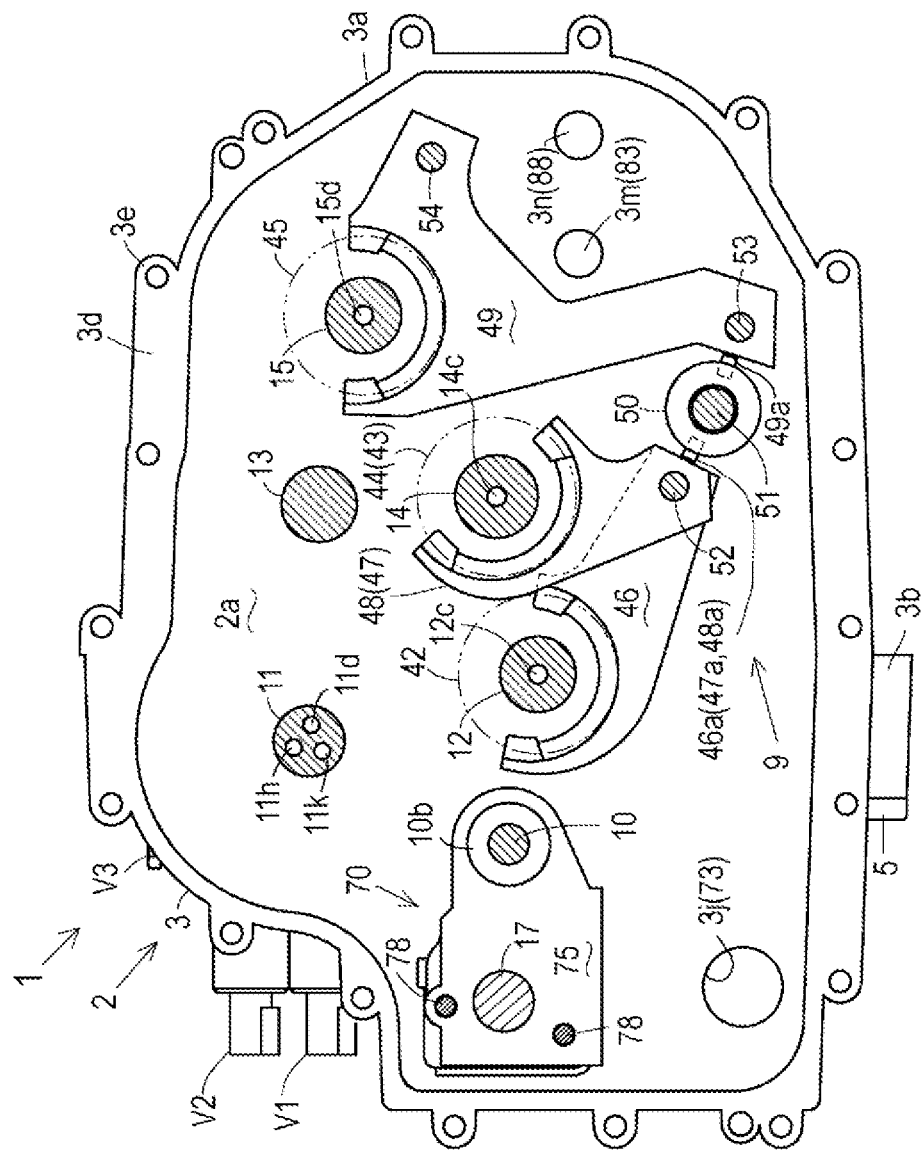
FIG. 10 is a cross-sectional front view of the transaxle 1 taken along the line VII-VII in FIG. 4, showing the shifter control mechanism 9 of the multi-speed transmission mechanism 6.

As shown in FIGS. 5, 10, and so on, a longitudinally (inner and outer) penetrating shaft hole 3*m* is formed in the wall portion 3*a*1 of the first housing part 3*a* of the main housing 3. The brake arm shaft 83 is passed through the shaft hole 3*m* and extends forward from the basal end portion of the brake arm 81 into the speed change gear chamber 2*a*.

As shown in FIGS. 5 and 10, the wall 3*a*1 of the first housing part 3*a* of the main housing 3 is provided with a recess 3*n* at the substantially same height as the axial hole 3*m* at the left side of the axial hole 3*m*. The recess 3*n* has a front end open to the speed-change gear chamber 2*a*, and has a rear end closed. The longitudinally extended pawl block fulcrum shaft 88 is arranged parallel to the brake arm shaft 83 and is fitted at a rear end thereof into the recess 3*n*.

In the speed-change gear chamber 2*a*, the pawl block 84 is disposed along the wall portion 3*a*1 of the main housing 3. The latch pawl 84*a* of the pawl block 84 is formed to correspond to the tooth profile of the gear 38, and the latch pawl 84*a* is disposed directly under the gear 38.

The pawl block fulcrum shaft 88 is passed through the shaft hole 84*b* of the pawl block 84 via the collar 89. A front end flange 88*a* of the pawl block fulcrum shaft 88 prevents the collar 89 from escaping from the shaft hole 84*b*.

The brake arm shaft 83 is passed through the through hole 84*c* of the pawl block 84. A longitudinally intermediate portion of the brake arm shaft 83 disposed in the through hole 84*c* is formed with the cam surface 83*d*. The cam surface 83*d* is directed downward so as to face the bottom surface of the through hole 84*c*.

The cam pushpin 85 is inserted into the pin hole 83*c* arranged slightly forward from the cam surface 83*d* of the brake arm shaft 83. Thus, the cam pushpin 85 planted into the brake arm shaft 83 is arranged in the front half portion of the through hole 84*c*.

The cam ring 86 is annularly provided on the brake arm shaft 83 rotatably relative to the brake arm shaft 83, and abuts at a rear end surface thereof against the cam pushpin 85. Therefore, the rear end portion of the cam ring 86 is disposed in the front half portion of the through hole 84*c*. The cam projection 86*a* of the cam ring 86 is directed upward so as to be able to contact the ceiling surface of the front half portion of the through hole 84*c*.

Here, a vertical width of the through hole 84*c* between its ceiling and bottom surfaces is substantially equal to the maximum diameter (diameter without intersecting the cam surface 83*d*) of the brake arm shaft 83 and the minimum radial thickness of the cam ring 86 (radial thickness of a portion of the cam ring 86 other than the cam projection 86*a*).

Figure 19A:
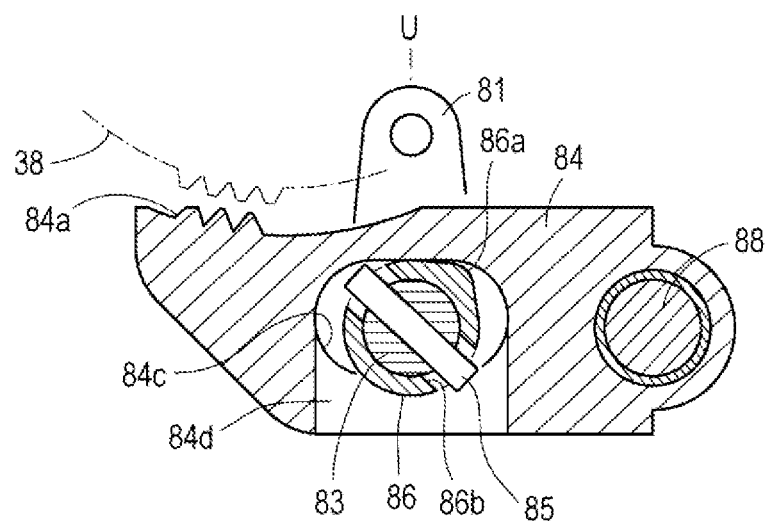
FIG. 19A is a cross-sectional front view of the brake unit 80 taken along the line A-A in FIG. 18 when the brake arm 81 is disposed in an unbraking position U.
Figure 19B:
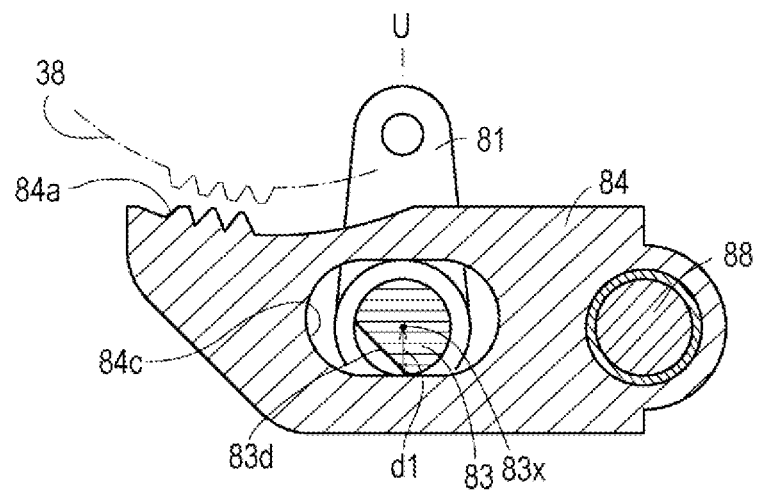
FIG. 19B is a cross-sectional front view of the brake unit 80 taken along the line B-B in FIG. 18 when the brake arm 81 is disposed in the unbraking position U.

Therefore, as described in detail later, it is possible to realize such a state that, when the minimum thickness portion of the cam ring 86 contacts the ceiling surface of the front half portion of the through hole 84*c* as shown in FIGS. 19A and 19B, in the front half portion of the through hole 84*c*, the lower end portion of the cam ring 86 is disposed in the space formed by the lower cutout 84*d*, and in the rear half portion of the through hole 84*c*, the minimum thickness of the cam ring 86 ensures a gap between an upper end of the maximum diameter portion of the brake arm shaft 83 (that does not intersect the cam surface 83d) and the ceiling surface of the through hole 84c while the lower end of the brake arm shaft 83 contacts the bottom surface of the through hole 84c.

The coil spring 87 is wound around the brake arm shaft 83 between the front end surface of the cam ring 86 and the flange 83a on the front end of the brake arm shaft 83. The washer 87a is interposed between a front end of the coil spring 87 and the flange 83a.

The coil spring 87 biases the cam ring 86 rearward. Due to this biasing force, the cam pushpin 85 is held at the deepest portion of the V-shaped cam recess 86b formed in the rear end face of the cam ring 86.

An operation of the brake unit 80 configured as described above will be described with reference to FIGS. 19 to 22. First, the brake arm 81 is rotated by an operator's operation so as to be switched between two positions, i.e., an unbraking position U shown in FIGS. 19A and 19B and a braking position L shown in FIGS. 20A and 20B.

When the brake arm 81 is set at the unbraking position U, as shown in FIG. 19A, in the front half portion of the through hole 84c, an apex portion of the cam projection 86a of the cam ring 86 deviates from the ceiling surface of the through hole 84c so that a slant surface extending from the apex portion of the cam projection 86a to the minimum thickness portion of the cam ring 86 is arranged along the ceiling surface of the through hole 84c.

At this time, as shown in FIG. 19B, in the rear half portion of the through hole 84c, the cam surface 83d of the brake arm shaft 83 is inclined so that an end edge of the cam surface 83d on the outer periphery of the brake arm shaft 83 contacts the bottom surface of the through hole 84c.

Therefore, the axis 83x of the brake arm shaft 83 and the bottom surface of the through hole 84c are provided therebetween with a distance d1 that is substantially equal to a radius of the brake arm shaft 83, so that the pawl block 84 is pressed downward by the brake arm shaft 83, and the latch pawl 84a is disposed at a position lower than the lower end of the gear 38. As a result, the latch claw 84a and the gear 38 are separated from each other, and the gear 38 is rotatably free from the brake unit 80.

Figure 20A:
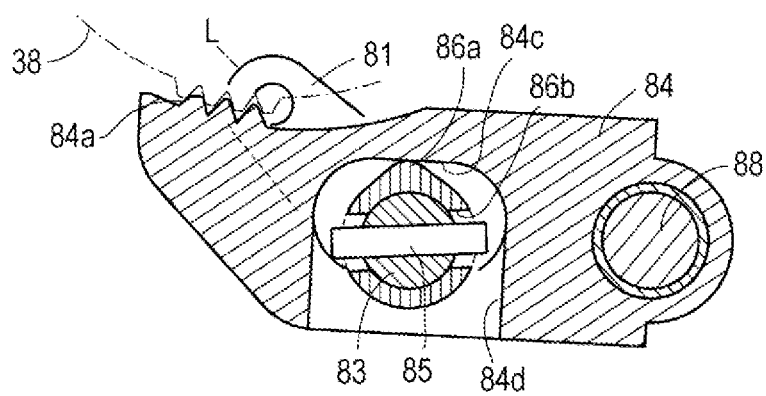
FIG. 20A is a cross-sectional front view of the brake unit 80 taken along the line A-A in FIG. 18 when the brake arm 81 is disposed at a braking position L.
Figure 20B:
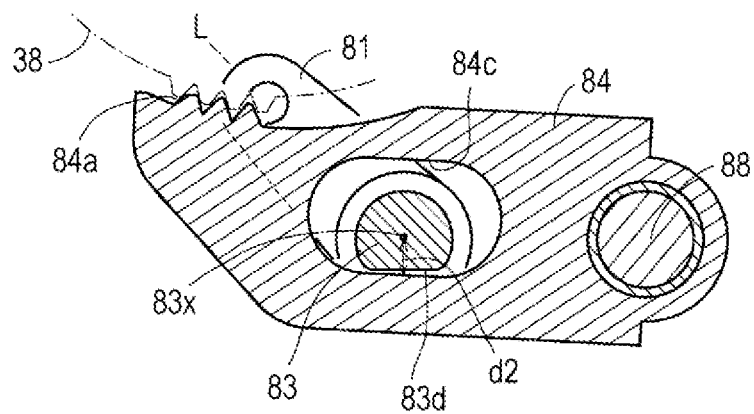
FIG. 20B is a cross-sectional front view of the brake unit 80 taken along the line B-B in FIG. 18 when the brake arm 81 is disposed at the braking position L.

When the brake arm 81 is rotated to the braking position L, as shown in FIG. 20A, in the front half portion of the through hole 84c, the apex portion of the cam projection 86a of the cam ring 86 pushes up the ceiling surface of the through hole 84c. At this time, as shown in FIG. 20B, in the rear half portion of the through hole 84c, the cam surface 83d of the brake arm shaft 83 is disposed parallel to the bottom surface of the through hole 84c. As the ceiling surface of the through hole 84c pushed up by the apex portion of the cam projection 86a rises, the distance between the cam surface 83d and the bottom surface of the through hole 84c is reduced.

In other words, the distance (i.e., a distance d2 shown in FIG. 20B) between the axis 83x and the bottom surface of the through hole 84c is reduced, while the axis 83x of the brake arm shaft 83 is kept at a constant position regardless of whether the brake arm 81 is disposed at the unbraking position U or the braking position L. As a result, the rise of the pawl block 84 pushed up by the apex portion of the cam projection 86a is equal to the reduction of the distance between the axis 83x and the bottom surface of the through hole 84c.

Therefore, the pawl block 84 whose left end portion is pivoted on the pawl block fulcrum shaft 88 is rotated at a right end portion thereof upward centered on the pawl block fulcrum shaft 88, so that the latch pawl 84a formed on the right end portion of the pawl block 84 meshes with the gear 38. As a result, the gear 38 and the output shaft 15 to which the gear 38 is fixed are braked, and the rear wheels 110 and the front wheels 120 are braked.

Figure 21:
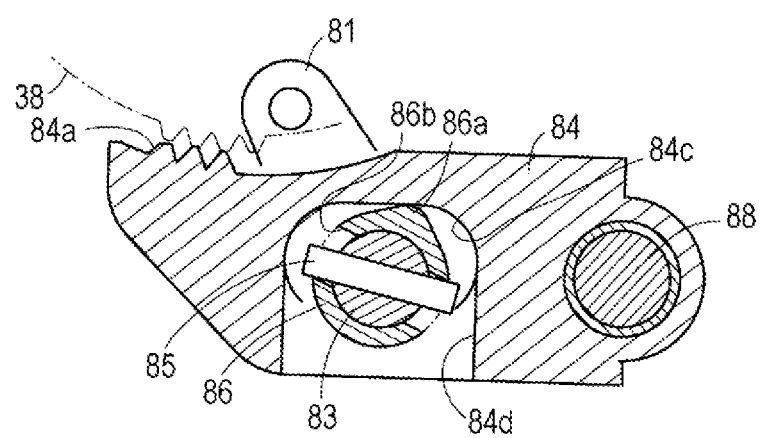
FIG. 21 is a sectional front view of the brake unit 80 taken along the A-A line in FIG. 18 at the moment when meshing of a latch pawl with gear teeth is inhibited on the way of rotation of the brake arm 81 from the unbraking position U to the braking position L.

Here, as shown in FIG. 21, during the rotation of the brake arm 81 to the braking position L, the latch pawl 84a on the right end portion of the rising pawl block 84 may be slow in meshing with teeth of the gear 38 (i.e., the latch pawl 84a and the gear 38 may be slow in matching in phase with each other). At this time, the rising of the latch pawl 84a is restrained, the rotation of the pawl block 84 is stopped, and the rotation of the cam ring 86 in the direction to push up the pawl block 84 is also stopped here.

However, since the brake arm shaft 83 is rotatable relative to the cam ring 86, by further rotating the brake arm 81 toward the braking position L, opposite end portions of the cam pushpin 85 rotatably integral with the brake arm 81 and the brake arm shaft 83 push the cam ring 86 forward against the coil spring 87, and meanwhile the opposite end portions of the cam pushpin 85 are rotated centered on the axis 83x of the brake arm shaft 83 so as to move along the slant surface of the cam recess 86b from the deepest portion of the cam recess 86b to a shallow portion of the cam recess 86b, thereby moving a rotational position of the cam pushpin 85 relative to the cam ring 86.

Figure 22:
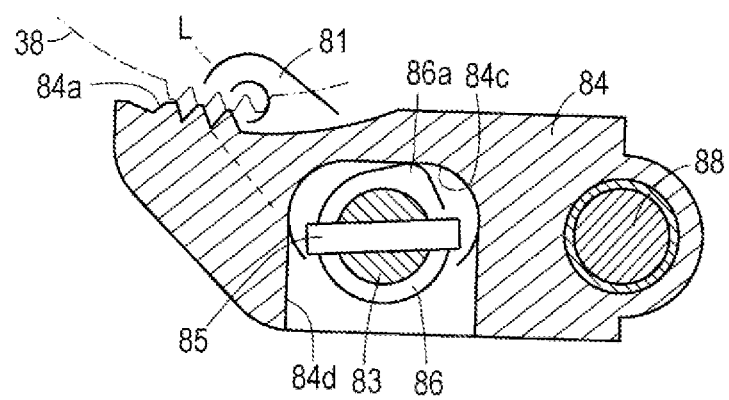
FIG. 22 is a sectional view of the brake unit 80 taken along the line A-A in FIG. 18 when the brake arm 81 is rotated to reach the braking position L from the state of FIG. 21.

The brake arm 81 is rotated by the rotation of the cam pushing pin 85 relative to the cam ring 86. As shown in FIG. 22, even when the pawl block 84 is stopped on the halfway of its rotation, the brake arm 81 can be rotated to reach the braking position L.

While the pawl block 84 is stopped (i.e., the pawl block 84 is waiting before the latch pawl 84a comes to mesh with the gear 38), the pawl block 84 is kept to receive a pressure from the cam ring 86 caused by the biasing force of the coil spring 87 so that the right end portion of the pawl block 84 formed with the latch pawl 84a is kept to receive an upward force. Therefore, as soon as the latch pawl 84a comes to coincide to a gap between teeth of the rotating gear 38 (the gear 38 and the latch pawl 84a match in phase with each other), the latch pawl 84a rises and meshes with the teeth of the gear 38 so as to brake the gear 38.

Conversely, when the brake arm 81 having been at the braking position L in the state where the latch pawl 84a meshes with the gear 38 is rotated to the unbraking position U, the brake arm shaft 83 rotates together with the brake arm 81 so that the cam surface 83d having been parallel to the bottom surface of the through hole 84c is inclined with respect to the bottom surface of the through hole 84c until the end edge of the cam surface 83d abuts against the bottom surface of the through hole 84c.

Further, as the brake arm 81 is rotated to the unbraking position U, the apex portion of the cam projection 86a of the cam ring 86 having contacted the ceiling surface of the through hole 84c moves and deviates from the ceiling surface of the through hole 84c, thereby reducing the distance between the axis 83x of the brake arm shaft 83 and the ceiling surface of the through hole 84c. Accordingly, the end edge of the cam surface 83d rotates to push down the bottom surface of the through hole 84c so as to increase the distance between the axis 83x and the bottom surface of the through hole 84c. The increase of the distance between the axis 83x and the bottom surface of the through hole 84c causes the pawl block 84 to rotate downward centered on the pawl block fulcrum shaft 88, so that the latch pawl 84a moves downward to be separated from the gear 38.

Finally, the brake arm 81 reaches the non-braking position U, and the brake unit 80 is returned to the state shown in FIGS. 19A and 19B.

As described above, when the brake arm 81 is rotated from the braking position L to the unbraking position U, even if a torque is confined between the latch claw 84a and the gear 38, the cam surface 83d of the brake arm shaft 83 rotatably integrated with the brake arm 81 rigidly pushes down the pawl block 84 to forcedly separate the latch pawl 84a from the gear 38 so as to surely release the brake.

Description of the transaxle 1 shown in FIGS. 3 to 22 is as described above. Finally, an alternative transaxle 1A shown in FIG. 23, which is a modification of the transaxle 1, will be described.

Figure 23:
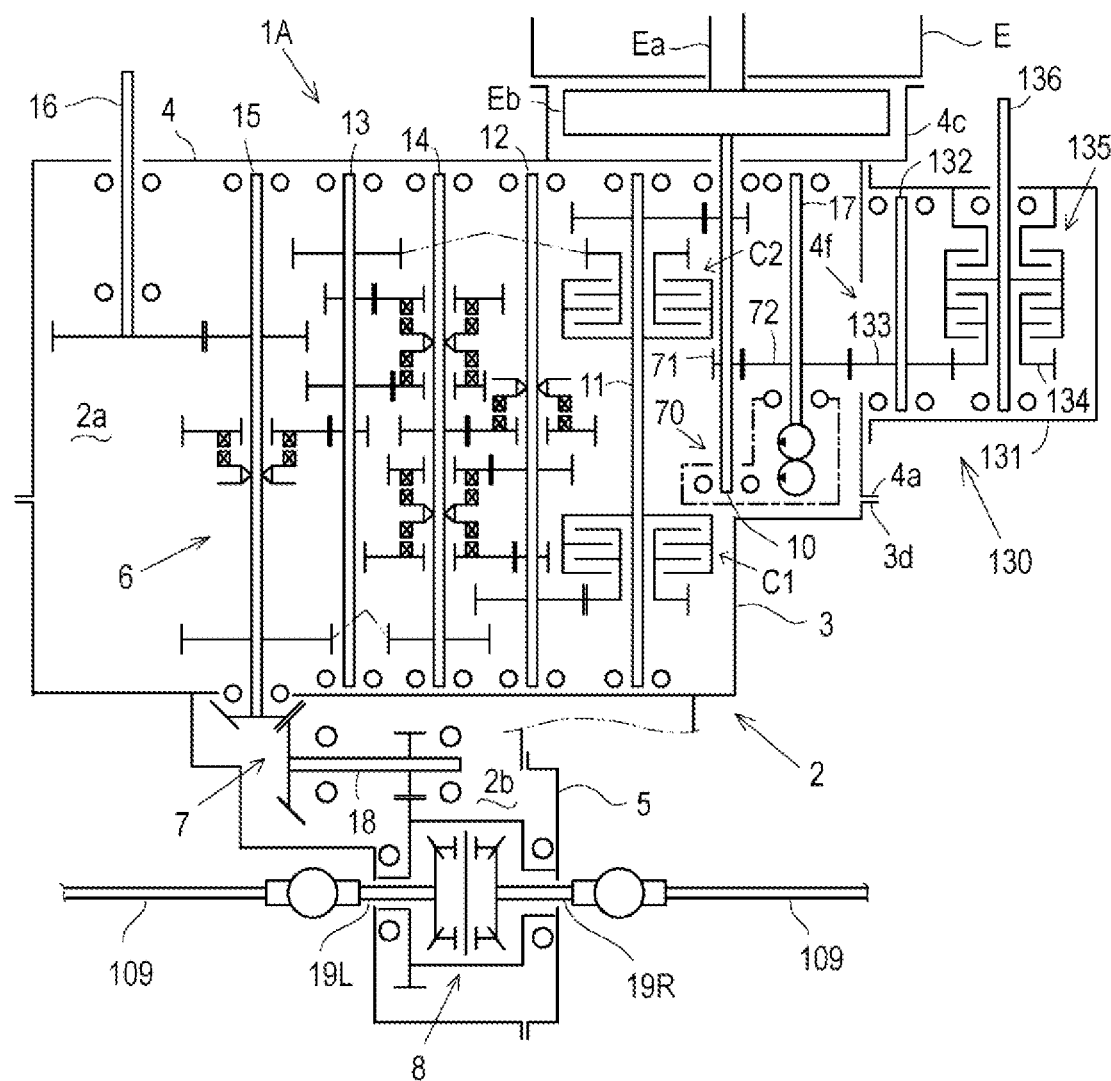
FIG. 23 is a skeleton diagram of a transaxle 1A according to another embodiment, in which a PTO unit 130 is detachably attached to a transaxle casing 2.

In FIG. 23, the same reference numerals as those used in the description of the transaxle 1 designate the same structural elements as those of the transaxle 1, and description of them is omitted.

In this regard, the transaxle 1A also includes the transaxle casing 2 formed by combining the main housing 3, the front cover 4 and the rear side cover 5. The multi-speed transmission mechanism 6 serving as the dual clutch type speed-change gear mechanism is disposed in the speed-change gear chamber 2a in the transaxle casing 2, and the speed-reduction mechanism 7 and the differential mechanism 8 in the speed-reduction/differential gear chamber 2b in the transaxle casing 2. The transmission shafts 10, 11, 12 13, 14, 15 and so on are extended in the same longitudinal direction as the engine output shaft Ea, and the speed-reduction intermediate shaft 18 of the speed-reduction mechanism 7 and the differential yoke shafts 19L and 19R of the differential mechanism 8 are extended in the lateral direction that is perpendicular to the engine output shaft Ea.

The difference of the transaxle 1A from the transaxle 1 is that the transaxle 1A includes a PTO unit 130. The PTO unit 130 is an assembly including a PTO casing 131, an intermediate shaft 132, an intermediate gear 133, a PTO clutch gear 134, a PTO clutch 135, and a PTO shaft 136.

Inside the PTO casing 131, the intermediate shaft 132 and the PTO shaft 136 are disposed parallel to each other, and are journalled by the PTO case 131 via respective bearings. The PTO shaft 136 protrudes at one end thereof outward from the PTO casing 131.

In the PTO casing 131, the intermediate gear 133 is fixed on the intermediate shaft 132, and the PTO clutch gear 134 is fitted on the PTO shaft 136 rotatably relative to the PTO shaft 136. The intermediate gear 133 and the PTO clutch gear 134 mesh with each other.

Further, in the PTO casing 131, the PTO clutch 135 is provided around the PTO shaft 136. By engaging the PTO clutch 135, power is transmitted from the PTO clutch gear 134 to the PTO shaft 136. By disengaging the PTO clutch 135, the PTO shaft 136 is isolated from the rotational power of the PTO clutch gear 134.

The transaxle 1A is provided with an inside-outside penetrating opening 4f in either a left or right side wall (preferably, right side wall) of the front cover 4 of the transaxle casing 2. The PTO casing 131 is attached to the front cover 4 so as to cover the opening 4f, whereby the PTO casing 131 is attached to the transaxle casing 2 of the transaxle 1A.

In the PTO unit 130 attached to the transaxle casing 2 as described above, the intermediate shaft 132 and the PTO shaft 136 are longitudinally extended parallel to the pump drive shaft 17, and the intermediate gear 133 on the intermediate shaft 132 meshes with a gear 72 fixed on the pump drive shaft 17 in the speed-change gear chamber 2a. Therefore, the PTO shaft 136 protrudes at the front end portion thereof forward from the PTO casing 131.

A friction plate type clutch is used as the PTO clutch 135, for example. By engaging the PTO clutch 135, power is transmitted from the pump drive shaft 17 to the PTO shaft 136 via the gears 72, 133, and 134 and the engaged PTO clutch 135. By disengaging the PTO clutch 135, the PTO shaft 136 is not driven even when the pump drive shaft 17 is rotated by power from the engine E.

In comparison with the above-mentioned front-wheel driving PTO shaft 16 that receives power from the input shaft 10 via the output shaft 15 of the multi-speed transmission mechanism 6, the PTO shaft 136 receives power from the input shaft 10 without passing through the multi-speed transmission mechanism 6, simultaneously with the pump drive shaft 17. Therefore, a working machine or the like driven by the PTO shaft 136 can be driven at a rotational speed proportional to the rotational speed of the engine E regardless of a gearshift state of traveling speed of a vehicle (such as UTV 100) equipped with the transaxle 1A.

By removing the PTO casing 131 from the front cover 4, the transaxle 1A can be changed to another typed transaxle that does not have the PTO unit 130 (that is, the same as the transaxle 1). Incidentally, it is preferable that the opening 4f of the front cover 4 after removing the PTO case 131 therefrom is covered with a cover (not shown).

The transaxle of the present application is configured by accommodating a multi-speed transmission mechanism, a speed-reduction mechanism, and a differential mechanism in a single transaxle casing. The transaxle is adaptable to various vehicles each of which is equipped with an engine having a crankshaft whose axis is extended in the longitudinal direction of the vehicle, i.e., a vertical engine.

It is further understood by those skilled in the art that the foregoing description is given to preferred embodiments of the disclosed apparatus and that various changes and modifications may be made in the invention without departing from the scope thereof defined by the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A transaxle comprising:
    a multi-speed transmission mechanism including a plurality of transmission shafts, having respective axes extending in a longitudinal direction of an applicable vehicle, and an output member;
    a differential mechanism including a pair of differential yoke shafts having respective axes extending in a lateral direction of the applied vehicle;
    a speed-reduction mechanism configured to transmit power from the output member of the multi-speed transmission mechanism to an input member of the differential mechanism,
    wherein the plurality of transmission shafts is disposed in parallel to one another and is perpendicular to the yoke shafts, the output member of the multi-speed transmission mechanism is a first bevel gear disposed on a transmission shaft of the plurality of transmission shafts, and the speed-reduction mechanism includes a speed-reduction intermediate shaft parallel to the pair of differential yoke shafts, and includes a second bevel gear provided on the speed-reduction intermediate shaft to mesh with the first bevel gear; and a single transaxle casing incorporating the multi-speed transmission mechanism, the differential mechanism and the speed-reduction mechanism.

2. The transaxle according to claim 1,
wherein an axis of the speed-reduction intermediate shaft is disposed at a position higher than axes of the pair of differential yoke shafts in a height direction of the applied vehicle.

3. The transaxle according to claim 1,
wherein the transaxle casing includes a main housing, a first cover, and a second cover,
wherein the main housing is formed integrally with a first housing part and a second housing part adjacent to each other,
wherein the first cover has a joint surface along a first phantom plane perpendicularly intersecting with the plurality of transmission shafts,
wherein the joint surface of the first cover is detachably joined to an end surface of the first housing part so that the first cover and the first housing part joined to each other define a first chamber therein,
wherein the multi-speed transmission mechanism is disposed in the first chamber,
wherein the second cover has a joint surface along a second phantom plane perpendicularly intersecting with one of the pair of differential yoke shafts,
wherein the joint surface of the second cover is detachably joined to an end surface of the second housing part so that the second cover and the second housing part joined to each other define a second chamber therein, and
wherein the speed-reduction mechanism and the differential mechanism are disposed in the second chamber.

* * * * *